US010983312B2

(12) United States Patent
Rose et al.

(10) Patent No.: US 10,983,312 B2
(45) Date of Patent: Apr. 20, 2021

(54) PANORAMIC STEREOSCOPIC IMAGING SYSTEMS

(71) Applicant: ARKIVE CORPORATION, Washington, DC (US)

(72) Inventors: Michael Harry Rose, Washington, DC (US); Jonathan Emanuel Rose, Washington, DC (US); Brian Zeyar Kobler, Washington, DC (US)

(73) Assignee: ARKIVE CORPORATION, Washington, DC (US)

( * ) Notice: Subject to any disclaimer, the term of this patent is extended or adjusted under 35 U.S.C. 154(b) by 631 days.

(21) Appl. No.: 15/554,989

(22) PCT Filed: Feb. 29, 2016

(86) PCT No.: PCT/US2016/020125
§ 371 (c)(1),
(2) Date: Aug. 31, 2017

(87) PCT Pub. No.: WO2016/140928
PCT Pub. Date: Sep. 9, 2016

(65) Prior Publication Data
US 2018/0039050 A1 Feb. 8, 2018

Related U.S. Application Data

(60) Provisional application No. 62/126,660, filed on Mar. 1, 2015.

(51) Int. Cl.
*G02B 17/00* (2006.01)
*G02B 13/06* (2006.01)
(Continued)

(52) U.S. Cl.
CPC ......... *G02B 13/06* (2013.01); *G02B 27/1066* (2013.01); *G02B 27/143* (2013.01);
(Continued)

(58) Field of Classification Search
CPC .......................... G02B 13/06; G02B 27/1066; G02B 26/0816; G02B 27/18; G02B 27/143;
(Continued)

(56) References Cited

U.S. PATENT DOCUMENTS 6,449,103 B1 * 9/2002 Charles .................. G02B 13/06
359/366

* cited by examiner

*Primary Examiner* — Alicia M Harrington
(74) *Attorney, Agent, or Firm* — Graeser Associates International Inc; D'vorah Graeser

(57) ABSTRACT

An optical system for panoramic stereoscopic imaging can include an outer reflector and an inner reflector, which can both be configured to reflect light to a camera. The outer reflector can include striations or other reflection elements to turn the light that is reflected to the camera such that first and second light rays that are parallel and offset from each other (e.g., suitable for stereoscopic 3D viewing) can be reflected by the respective outer and inner reflectors to the camera. The outer reflector can be partially reflective and partially transmissive so that some light can pass through the outer reflector to be reflected by the inner reflector to the camera. The camera can capture a single image having a first portion that corresponds to a view generated by the inner reflector, and a second portion that corresponds to a stereoscopically offset view generated by the outer reflector.

48 Claims, 27 Drawing Sheets

(51) Int. Cl.
  *G03B 17/17* (2021.01)
  *G03B 35/10* (2021.01)
  *G03B 37/06* (2021.01)
  *H04N 13/189* (2018.01)
  *H04N 13/139* (2018.01)
  *G02B 30/27* (2020.01)
  *H04N 13/218* (2018.01)
  *H04N 13/243* (2018.01)
  *G02B 27/10* (2006.01)
  *G02B 27/14* (2006.01)

(52) U.S. Cl.
  CPC .............. *G02B 30/27* (2020.01); *G03B 17/17* (2013.01); *G03B 35/10* (2013.01); *G03B 37/06* (2013.01); *H04N 13/139* (2018.05); *H04N 13/189* (2018.05); *H04N 13/218* (2018.05); *H04N 13/243* (2018.05)

(58) Field of Classification Search
  CPC .. H04N 13/204; H04N 13/207; H04N 13/243; G03B 17/17; G03B 35/10
  See application file for complete search history.

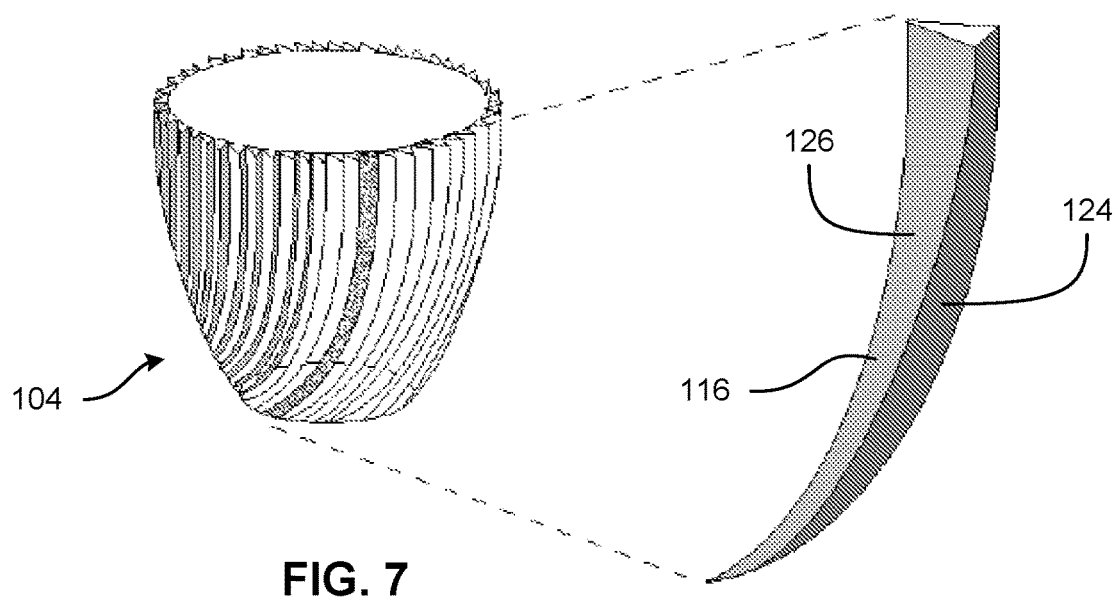
FIG. 7
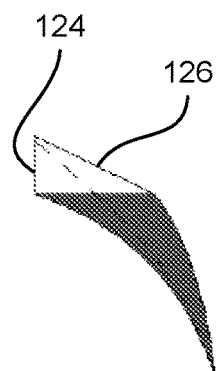
FIG. 8A
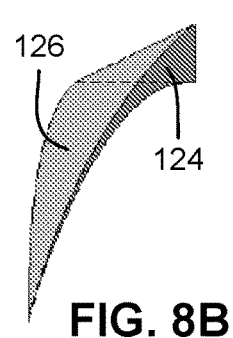
FIG. 8B
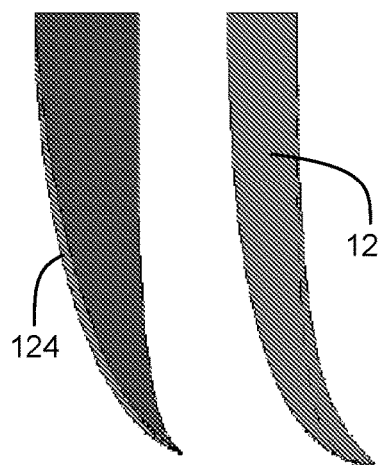
FIG. 8C
FIG. 8D
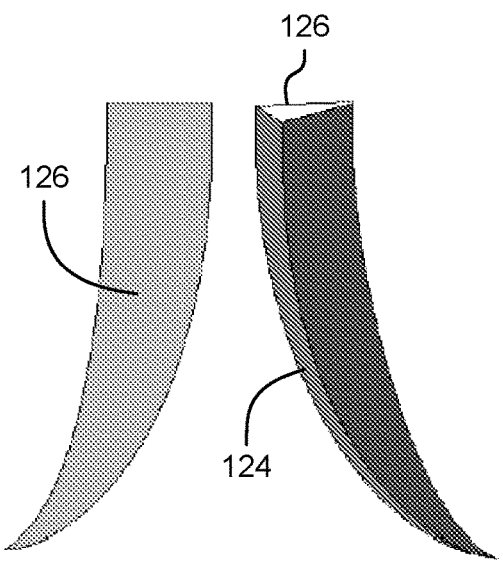
FIG. 8E
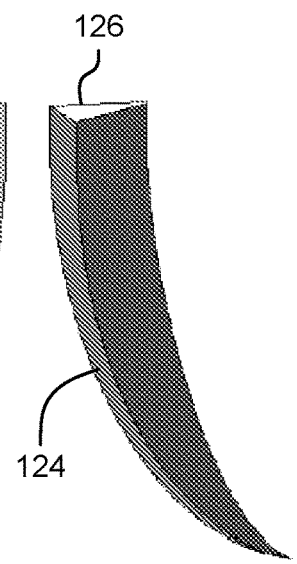
FIG. 8F

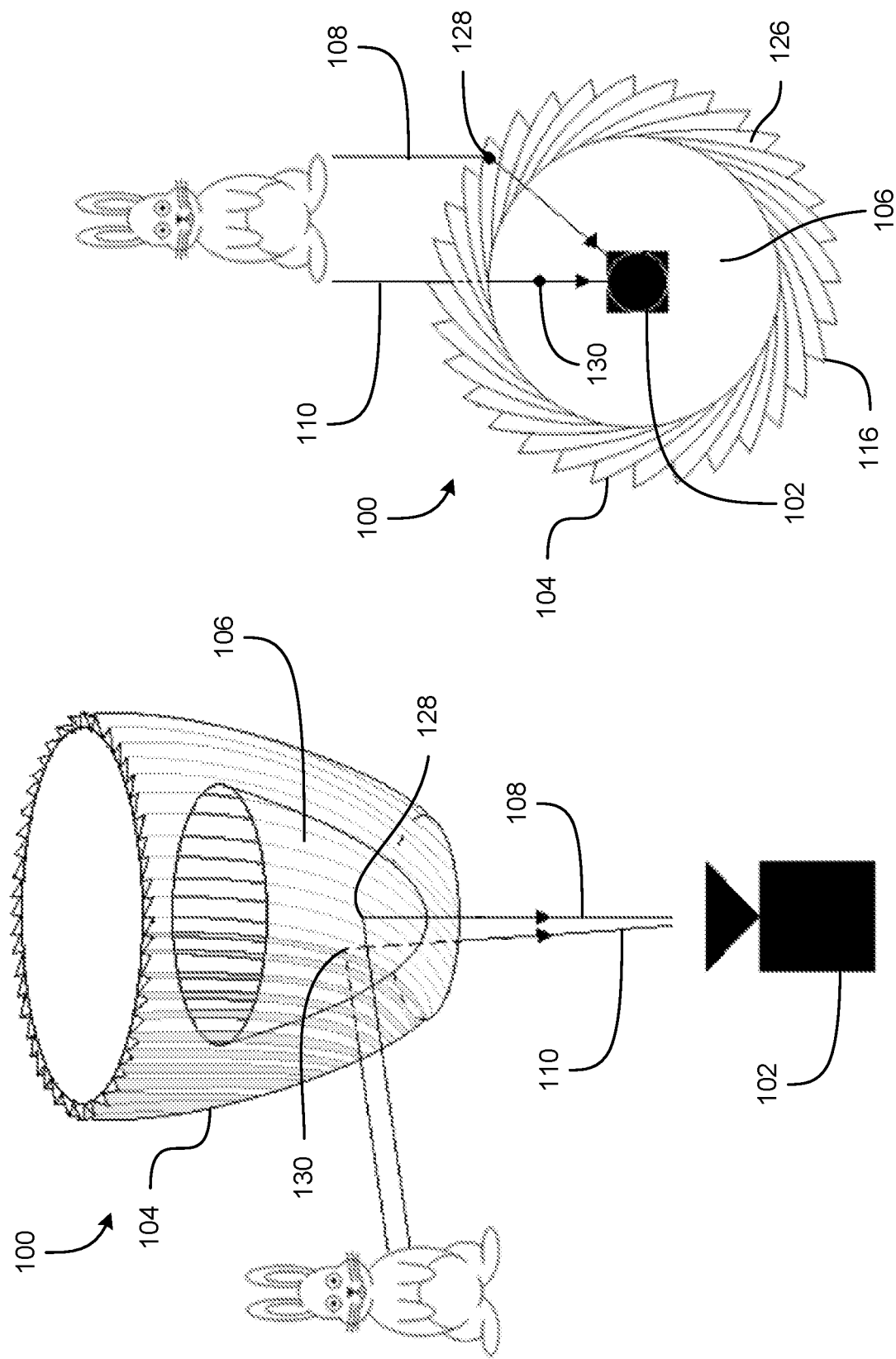

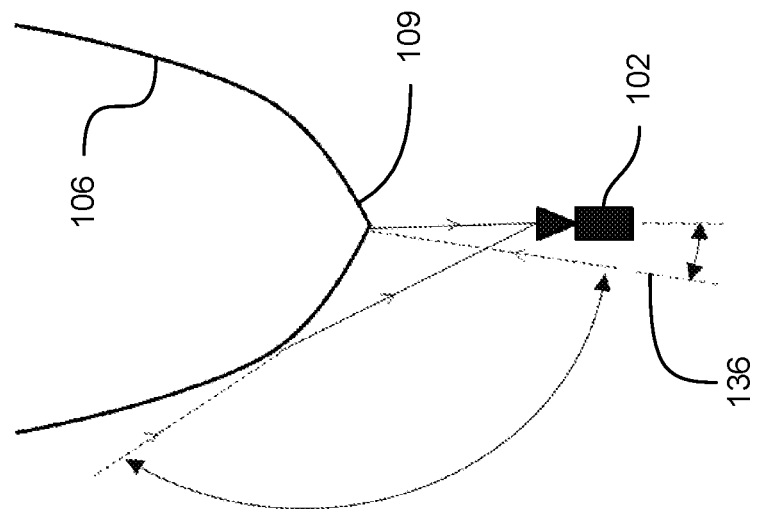
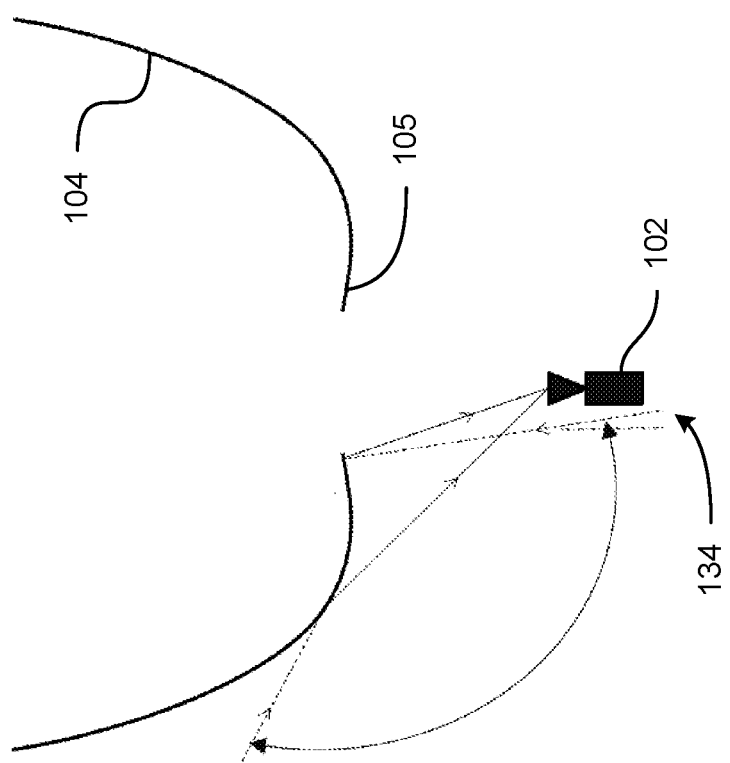

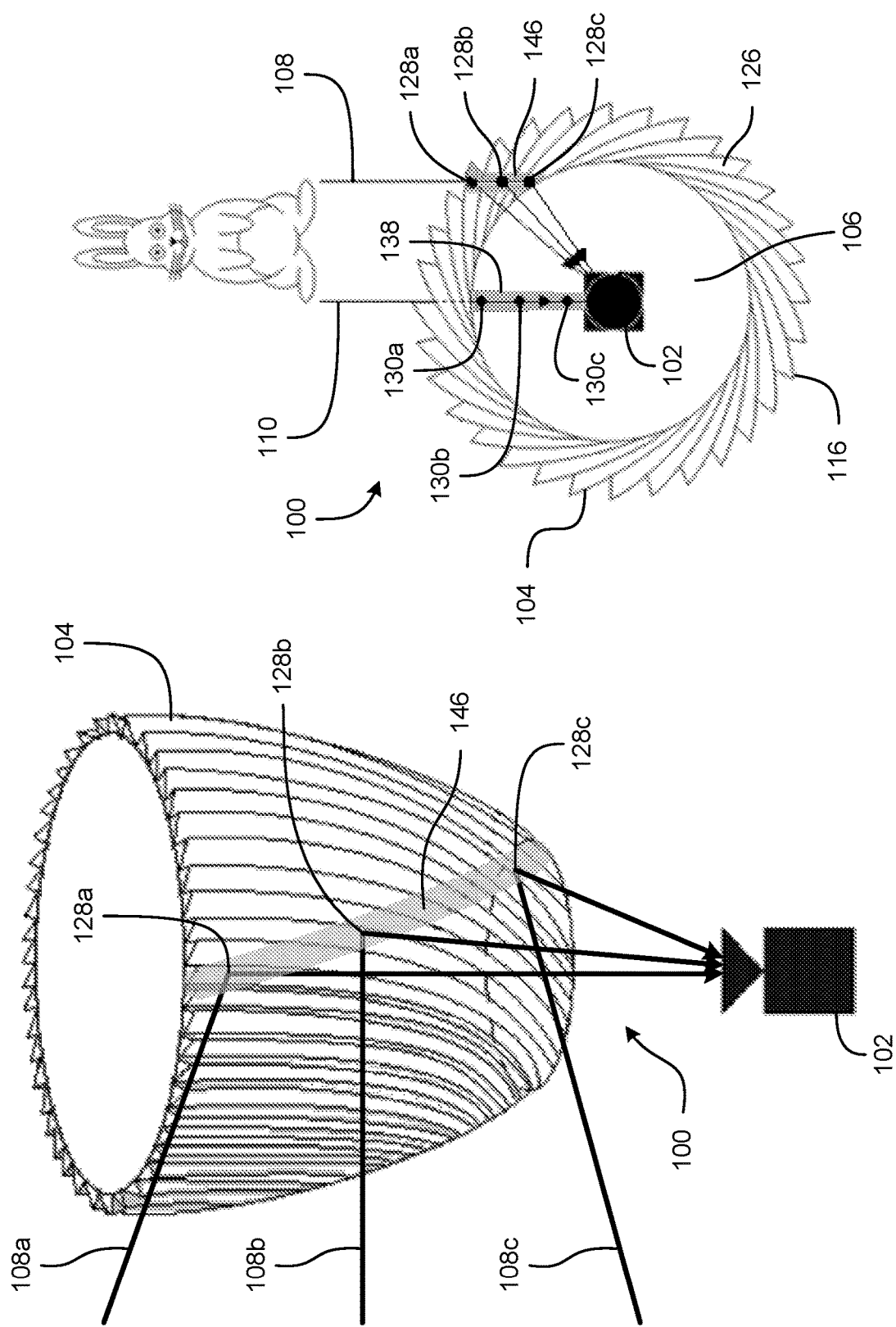

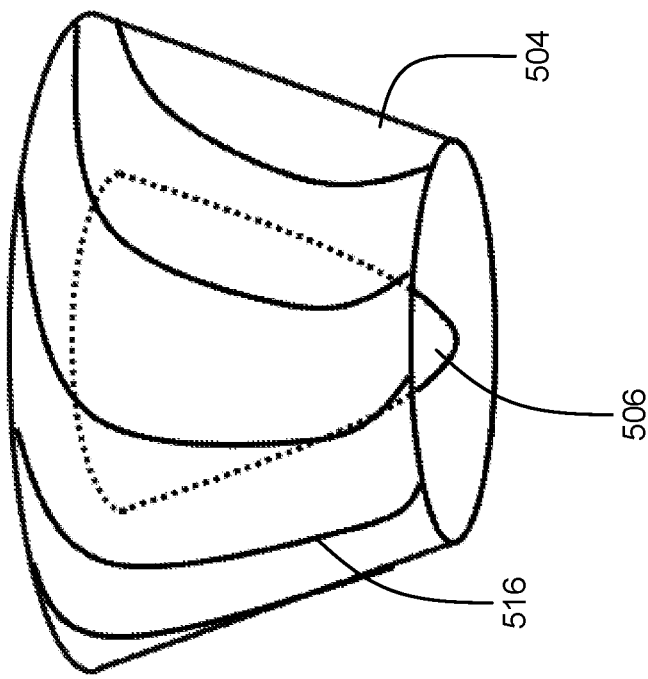
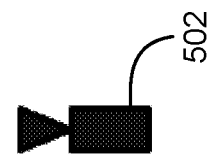
FIG. 41
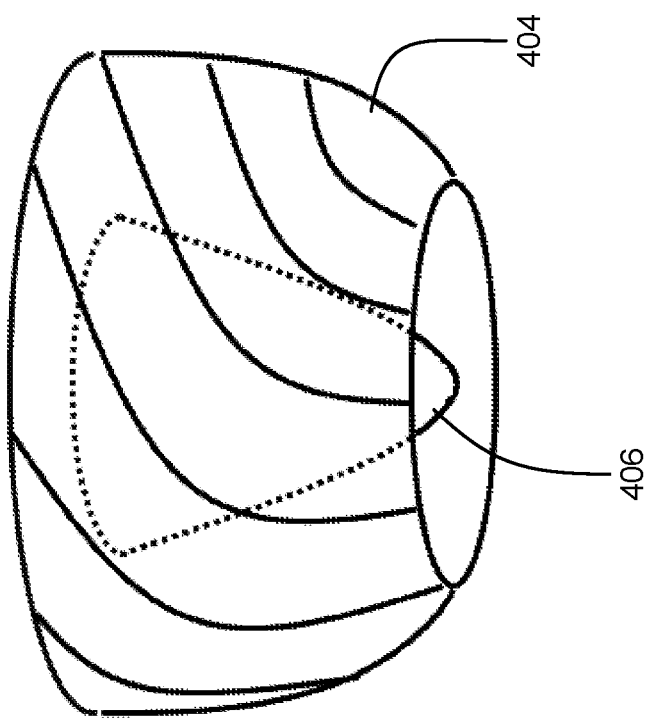
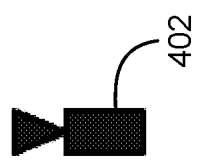
FIG. 40

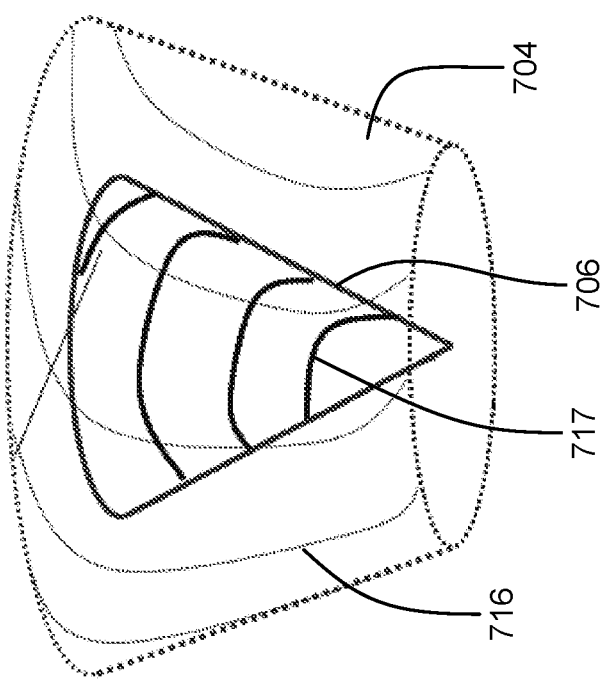
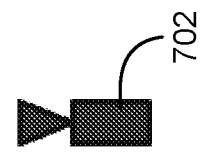
FIG. 43
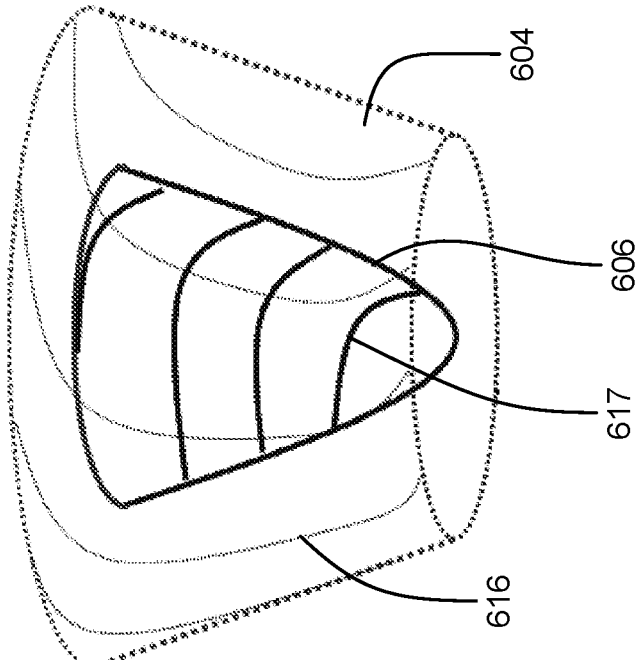
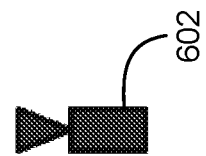
FIG. 42

PANORAMIC STEREOSCOPIC IMAGING SYSTEMS

CROSS-REFERENCE TO RELATED APPLICATIONS

This application claims the benefit under 35 U.S.C. § 119(e) of U.S. Provisional Patent Application No. 62/126,660, titled GLOBAL PANORAMIC STEREOSCOPIC 3D PHOTOGRAPHY, and filed Mar. 1, 2015, the entirety of which is hereby incorporated by reference.

BACKGROUND

Field of the Disclosure

Some embodiments disclosed herein relate to image capture systems, such as stereoscopic panoramic image capture systems.

Description of the Related Art

Although various image capture systems are available, there remains a need for improved image capture systems, especially for stereoscopic panoramic image capture systems.

SUMMARY

Certain example embodiments are summarized below. Additional embodiments are disclosed elsewhere herein.

Various embodiments disclosed herein can relate to n optical system for panoramic stereoscopic imaging. The optical system can include a camera, an outer reflector, an inner reflector. The outer reflector can include a generally paraboloidal major structure having a wide end and a narrow end, and the narrow end can be facing toward the camera. The outer reflector can include a hole at the narrow end. The outer reflector can include a plurality of striations extending from the wide end to the narrow end. The outer reflector can be partially reflective and partially transmissive, and the outer reflector can be configured to reflect light to the camera. The inner reflector can include a generally paraboloidal reflective surface having a wide end and a narrow end. The narrow end can be facing towards the camera. The inner reflector can be inside the outer reflector. The inner reflector can be configured to reflect light that is transmitted through the outer reflector. The inner reflector can be configured to reflect the light through the hole at the narrow end of the outer reflector to the camera.

The inner reflector can be configured to reflect light to provide a circular inner image portion to the camera, and the outer reflector can be configured to reflect light to provide an outer image portion to the camera as a ring around the inner image portion. The striations can include visible faces that are configured to reflect the light to the camera and hidden faces that are not visible to the camera. The striations can be twisted around the outer reflector as a spiral. The striations can be configured to receive off-axis light traveling along a path that does not intersect a longitudinal axis of the optical system, and to turn the light by reflection to have an on-axis path to the camera that intersects the longitudinal axis.

The inner reflector can be configure to receive first light traveling along a first light path, and to reflect the first light to the camera. The outer reflector can be configured to receive second light traveling along a second light path that is parallel to the first light path and spaced apart from the first light path by an offset distance, and the outer reflector can be configured to reflect the second light to the camera. The inner reflector can be configured to receive third light traveling along a third light path that is lower than the first light path, and to reflect the third light to the camera. The outer reflector can be configured to receive fourth light traveling along a fourth light path that is lower than the second light path, and the fourth light path can be parallel to the third light path and spaced apart from the third path by the same offset distance. The outer reflector can be configured to reflect the fourth light to the camera. The light path length of the first light from an object, to the inner reflector, and to the camera can be the same distance as the light path length of the second light from the object, to the outer reflector, and to the camera.

The optical system can include an outer substrate material on an outer side of the outer reflector, and the outer substrate material ca be configured to refract light transmitted through the outer reflector. The outer substrate material can be configured to refract the light in a first direction. The optical system can include an inner substrate material on an inner side of the outer reflector, and the inner substrate material can be configured to refract the light transmitted through the outer reflector. The inner substrate material can be configured to refract the light in a second direction that is opposite the first direction.

The optical system can include a substrate on an outer or inner side of the outer reflector, and the substrate can have an inner surface and an outer surface that both follow the shape of the striations. The substrate can be configured to refract light traveling through the outer reflector, wherein the outer surface of the substrate can refract the light in a first direction, and wherein the inner surface of the substrate can refract the light in a second direction that is opposite the first direction.

The optical system can include a housing configured to support the outer reflector, the inner reflector, and the camera. The outer reflector can be rotatable relative to the camera, and the outer reflector can be configured to rotate about a longitudinal axis. The optical system can include a motor or actuator for driving rotation of the outer reflector.

The inner reflector can include a hole at the center of the inner reflector, and the optical system can include a primary reflector configured to receive light that is reflected from the inner reflector and the outer reflector, and to reflect the received light through the hole in the outer reflector, and through the hole in the inner reflector, to the camera.

Various embodiments disclosed herein can relate to an optical system that can include a camera, an outer reflector, and an inner reflector. The outer reflector can be configured to reflect light to the camera. The inner reflector can be disposed inside the outer reflector and can be configured to reflect light to the camera. One or both of the outer reflector and the inner reflector can be configured to receive off-axis light traveling along a path that does not intersect a longitudinal axis of the optical system, and to turn the light by reflection to have an on-axis path to the camera that intersects the longitudinal axis.

The outer reflector can include a plurality of striations that are angled to turn the light reflected by the outer reflector in a first direction to have an on-axis path to the camera. The inner reflector can include plurality of striations that are angled to turn the light reflected by the inner reflector in a second direction to have an on-axis path to the camera.

The inner reflector can be configure to receive first light traveling along a first light path, and to reflect the first light to the camera. The outer reflector can be configured to receive second light traveling along a second light path that is parallel to the first light path and spaced apart from the first light path by an offset distance. The outer reflector can be configured to reflect the second light to the camera. The inner reflector can be configured to receive third light traveling along a third light path that is lower than the first light path, and to reflect the third light to the camera. The outer reflector can be configured to receive fourth light traveling along a fourth light path that is lower than the second light path. The fourth light path can be parallel to the third light path and spaced apart from the third path by the same offset distance. The outer reflector can be configured to reflect the fourth light to the camera. The light path length of the first light from an object, to the inner reflector, and to the camera is the same distance as the light path length of the second light from the object, to the outer reflector, and to the camera.

The outer reflector can include a plurality of reflective panels that are spaced apart from each other with gaps between the reflective panels. The outer reflector can be rotatable relative to the camera, and the outer reflector can be configured to rotate about a longitudinal axis. The optical system can include a motor or actuator to for driving rotation of the outer reflector. The reflective panels can have dark back sides configured to absorb light reflected from the inner reflector.

The outer reflector can have a generally paraboloidal major structure. The inner reflector can have a generally paraboloidal major structure. The outer reflector can have a frustoconical major structure. The inner reflector can have a conical major structure.

The outer reflector can include a hole at the center. The inner reflector can include a hole at the center. The optical system can include a primary reflector configured to receive light that is reflected from the inner reflector and the outer reflector, and to reflect the received light through the hole in the outer reflector, and through the hole in the inner reflector, to the camera.

One or both of the outer reflector and the inner reflector can include a grid of discontinuous reflection elements that are configured to turn the reflected light. The inner reflector can be configured to reflect light to provide a circular inner image portion to the camera, and the outer reflector can be configured to reflect light to provide an outer image portion to the camera as a ring around the inner image portion. The outer reflector can be partially reflective and partially transmissive.

The optical system can include an outer substrate material on an outer side of the outer reflector, and the outer substrate material can be configured to refract light transmitted through the outer reflector. The outer substrate material can be configured to refract the light in a first direction. The optical system can include an inner substrate material on an inner side of the outer reflector. The inner substrate material can be configured to refract the light transmitted through the outer reflector, and the inner substrate material can be configured to refract the light in a second direction that is opposite the first direction.

The optical system can include a substrate on an outer or inner side of the outer reflector. The substrate can have an inner surface and an outer surface that both follow the shape of striations on the outer reflector. The substrate can be configured to refract light traveling through the outer reflector. The outer surface of the substrate can refract the light in a first direction, and the inner surface of the substrate can refract the light in a second direction that is opposite the first direction.

The optical system can include an array of cameras each configured to receive light reflected by the inner reflector and the outer reflector to capture images from multiple positions. The optical system can include an array of synthetic cameras each configured to receive light reflected by the inner reflector and the outer reflector to capture images from multiple positions. The synthetic cameras can include a plurality of apertures for a single image sensor.

A narrow end of the inner reflector can be configured to omit the camera from images produced by the camera. A narrow end of the inner reflector can have a shallow tip to prevent light from the camera from being reflected back to the camera. An inner rim of the outer reflector can be curved inward to extend back into an interior of the outer reflector. An inner rim of the outer reflector can be curved inward to reflect light from the camera back to the camera for imaging. An inner rim of the outer reflector can be curved inward to reflect light from behind the camera to the camera for imaging.

Various embodiments disclosed herein can relate to an optical system for panoramic stereoscopic imaging. The optical system can include a camera and a reflector having striations that include right-side faces and left-side faces. The right-side faces can be configured to receive first off-axis light traveling along a first path that does not intersect a longitudinal axis of the optical system, and to turn the first light in a first direction, as viewed from the longitudinal axis, by reflection to have an on-axis path to the camera that intersects the longitudinal axis. The left-side faces can be configured to receive second off-axis light traveling along a second path that does not intersect a longitudinal axis of the optical system, and to turn the second light in a second direction opposite the first direction, as viewed from the longitudinal axis, by reflection to have an on-axis path to the camera that intersects the longitudinal axis.

The reflector can have a generally paraboloidal major structure. The reflector can have a hole in the center thereof, and the optical system can include a primary reflector for receiving light reflected from the reflector and for reflecting the received light to the camera. The right-side faces and left-side faces can be symmetrical to each other across respective planes extending along respective centers of the striations.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

FIG. 7 shows an example embodiment of an outer reflector having striations, where one striation is shown separated from the outer reflector for illustrative purposes.

FIGS. 8A-8F show various view of an example embodiment of a striation.

FIG. 10 shows an example embodiment of light being reflected by an outer reflector and an inner reflector to a camera.

FIG. 11 shows a view from behind the camera of an example embodiment of light being reflected by an outer reflector and an inner reflector to a camera.

FIG. 17 shows an example embodiment of an outer reflector.

FIG. 18 shows an example embodiment of an inner reflector.

FIG. 23 shows an example of light being reflected from different vertical locations on an outer reflector to a camera.

FIG. 24 shows an example of light being reflected from different vertical locations on an outer reflector and an inner reflector to a camera with consistent stereoscopic offset.

FIG. 40 shows an example embodiment of an optical system for stereoscopic panoramic imaging.

FIG. 41 shows an example embodiment of an optical system for stereoscopic panoramic imaging having a frustoconical outer reflector.

FIG. 42 shows an example embodiment of an optical system for stereoscopic panoramic imaging where both the outer reflector and the inner reflector have striations.

FIG. 43 shows an example embodiment of an optical system for stereoscopic panoramic imaging where both the frustoconical outer reflector and the conical inner reflector have striations.

DETAILED DESCRIPTION OF CERTAIN EMBODIMENTS

Figure 2:
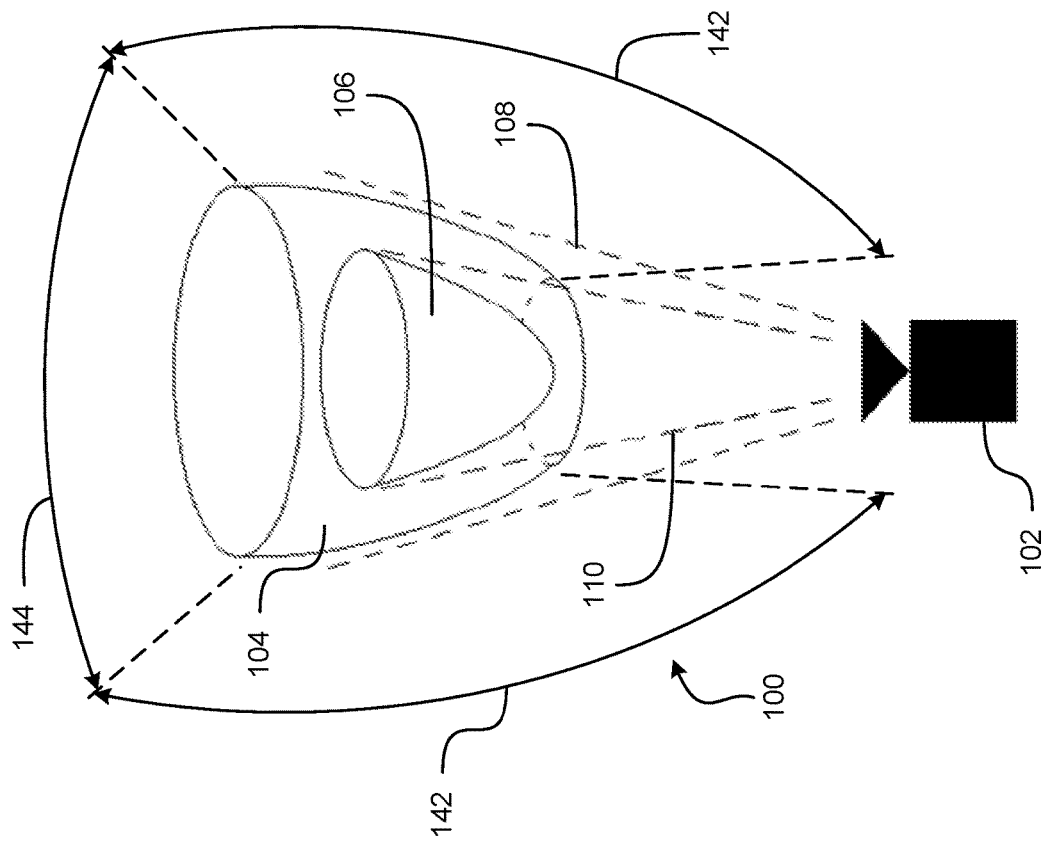
FIG. 2 shows and example embodiment of an optical system for panoramic stereoscopic imaging.

Various systems and methods disclosed herein relate to the use of optics in combination with a camera to capture a spatially offset combination of images of a given environment. Systems disclosed herein can be used to simultaneously capture and reconstruct two different circular global panoramic views of an environment (e.g., with an extended range of pitch angles and a complete 360 degree range of yaw angles), that contain distinct stereoscopic information offset in the horizontal plane. A viewer of the reconstructed images can view an environment in stereoscopic 3D, and in some embodiments the viewer can look in almost any direction e.g., every direction horizontally (across yaw angles) and a wide range of directions vertically (across pitch angles)). In some embodiments computational image processing can be used to capture and/or reconstruct the images.

The optical system can be designed to allow for the image capture of environments in such a way as to provide two discreet viewpoints that are stereoscopically separated in space, and yet each provide complete or near complete global panoramic imaging in both the pitch and yaw planes.

When using an appropriate display device such as a virtual-reality head-mounted-display with appropriate motion tracking, the pair of captured images can be correspondingly displayed independently to each of a user's eyes such that they can look in various different horizontal or vertical directions and see the appropriate portion of the view recreated as they would if they were looking in the original environment. This recreated view would also display the correct stereoscopic displacement for each of the user's eyes as they would if looking in the original real scene, thus allowing the user's brain to accurately recreate a sense of depth from the user's viewpoint using stereoscopic triangulation as the brain naturally would.

The system can allow for the realistic capture of images of the environment, which can be displayed using a head-mounted display, or other appropriate global or pseudo-global stereoscopic display. In some embodiments, the system can be designed such that both the right-eye image and the left-eye image can be captured with a single camera (e.g., on a single image sensor), and such that all of the necessary data can be captured at once in a single image. Thus, a static 3D panoramic scene may be captured using a single image, and a moving or animated 3D panoramic scene capturing an event over time may be captured using a video or series of images in which each individual image corresponds to a different time for the moving or animated scene.

Therefore, the captured data can enable a user to view or revisit a recorded scene remotely with an optically true-to life perspective, or even with an intentionally warped perspective, while giving the user some freedom to arbitrarily look around without breaking the accuracy of the perspective. The captured data may be stored to let a user revisit a prior time. The captured data can be transmitted to let a user virtually visit another location (e.g., in real time or also stored over time). The system can enable a person to inhabit another person's viewpoint, or to view an environment from a shifted viewpoint.

Major Structures

Figure 1:
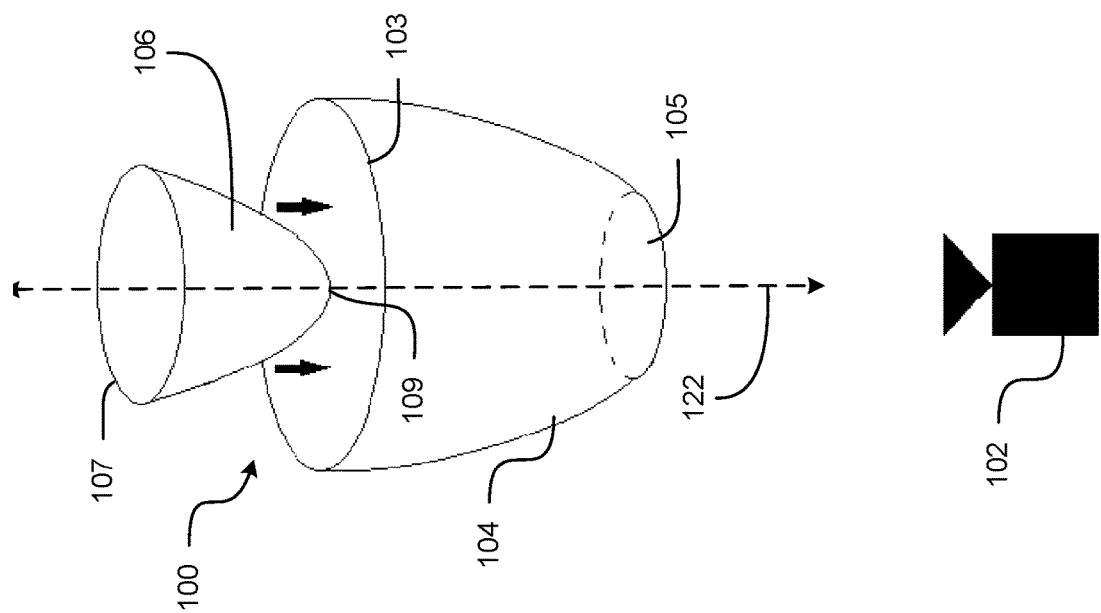
FIG. 1 is an exploded view of an example embodiment of an optical system for panoramic stereoscopic imaging.

FIG. 1 is an exploded view of an example embodiment of an optical system 100 for panoramic stereoscopic imaging. The system 100 can include a camera 102, a first reflector 104 (e.g., an outer reflector), and a second reflector 106 (e.g., an inner reflector). The camera 102 can include an image sensor (e.g., a CMOS, a CCD, or any other suitable type of image sensor). The camera 102 can optionally include various other features, such as a shutter, one or more lenses, one or more reflectors, a light input aperture, a memory device for storing images, etc. The image sensor can be positioned to receive light that is reflected from the first reflector 104 (e.g., to provide a view for the right or left eye) and/or the second reflector 106 (e.g., to provide a view for the other of the right or left eye).

In some embodiments, the system does not include any moving parts, although in other embodiments, some components can move, as described herein. In some implementations, the first reflector 104 and/or the second reflector 106 can be attached to the end of the camera 102, or can otherwise be coupled to the camera 102 so that the first reflector 104 and/or second reflector 106 do not move relative to the camera 102. The optical system 100 can be reflective, and can reflect views of the surrounding environment into the camera 102. The system can have at least two major reflective surfaces (e.g., the first reflector 104 and the second reflector 106) that can reflect two different views of the environment into the camera 102. The first reflector 104 and the second reflector 106 can be arranged in such a way that the camera 102 can see both reflectors 104 and 106 at the same time. The camera 102 can capture reflected images from both the first reflector 104 and the second reflector 106 at the same time.

FIG. 2 shows an example embodiment of the optical system 100, in which the inner reflector 106 is positioned physically inside of the outer reflector 104 (e.g., similar to a Russian nesting doll). The outer reflector 104 can define an interior cavity, and some or all of the inner reflector 106 can be disposed inside the interior cavity of the outer reflector 104. The first e.g., outer) reflector can have a reflective surface that is partially reflective and partially transmissive (e.g., made of a half-silvered material). The second (e.g., inner) reflector can have a reflective surface made of a fully reflective material. The term "fully reflective material" refers to a material that is designed to maximize reflection of light (e.g., within acceptable manufacturing and budget conditions), and is not intended to mean that every bit of light that contacts the material is reflected. Rather, those of skill in the art will understand that some small amounts of light can be absorbed or otherwise not be reflected by the fully reflective material. A first portion of the incoming light 108 can be reflected off of the outer reflector 104 into the camera 102. The path of light reflected from the outer reflector 104 to the camera 102 is sometimes referred to as a complex light path. A second portion of the incoming light 110 can penetrate through the outer reflector 104, and can reflect off of the inner reflector 106 and into the camera 102. The path of light reflected from the inner reflector 106 is sometime referred to as a simple light path.

Figure 4:
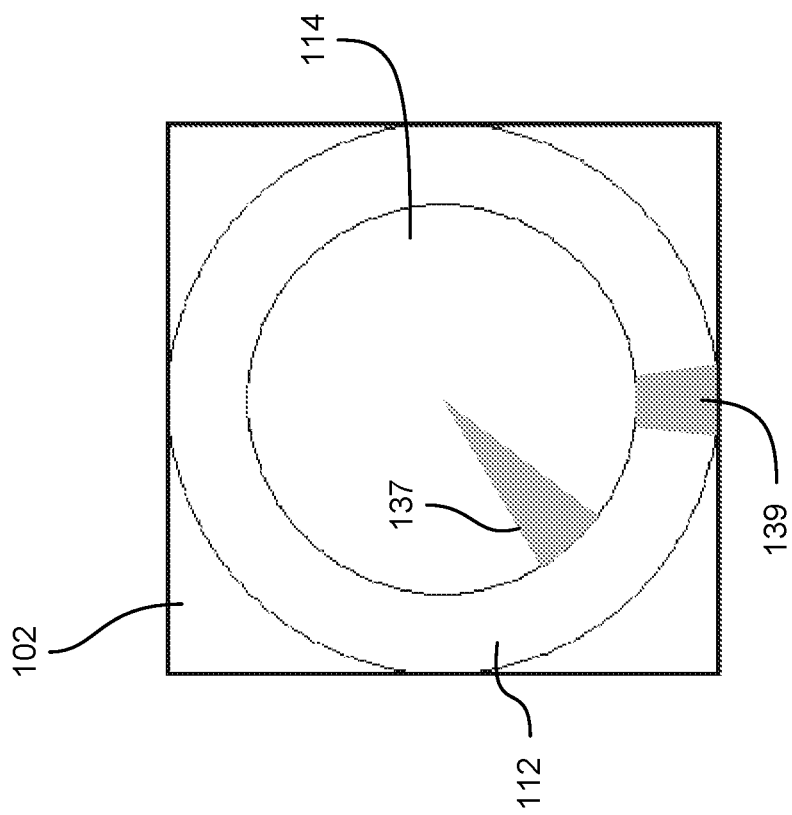
FIG. 4 shows an example embodiment of an image generated by an inner reflector and an outer reflector.
Figure 3:
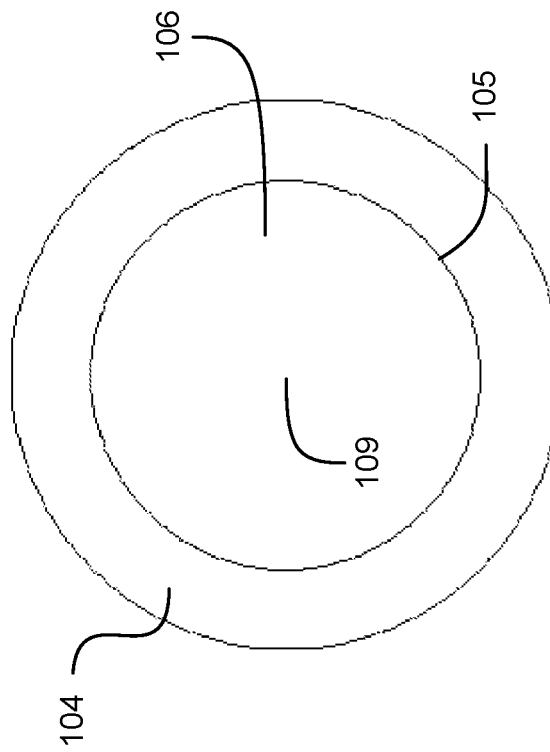
FIG. 3 shows an outer reflector and an inner reflector from a perspective of a camera.

FIG. 3 is a view of the first reflector 104 and the second reflector 106 from the perspective of the camera 102. FIG. 4 shows an example embodiment of an image sensor of the camera 102 having a first image portion 112 and a second image portion 114. The image on the image sensor can include a circular second image portion 114 in the centre (from the light reflected by the second reflector 106), and a first image portion 112 in the shape of a thick ring around that circular second image portion 114 (from the light reflected by the first reflector 104).

When the system 100 is operated vertically, with the camera 102 looking upward into the device along the y-axis the fish-eye-like curvature and placement of the first and second reflectors 104 and 106 are designed to each reflect a wide, nearly global view point of the environment surrounding the system 100. The system 100 can compress a wide angular range in the pitch plane into the radial direction of both image portions (vertical plane from the perspective of a user). The system can compress the complete, 360 degree, circular, panoramic range of the yaw plane into the circumferential direction of both image portions (horizontal plane from the perspective of the user). In some embodiments, a single image sensor can be used to capture both the first image portion 112 and the second image portion 114. In some embodiments, two separate image sensors can be used for the first image portion 112 and the second image portion 114.

FIGS. 1 and 2, as well as many of the other Figures, shows the optical system 100 oriented with the camera 102 at the bottom, below the first and second reflectors 104 and 106 disposed directly above the camera 102. Much of the specification describes the structure of the system 100 having this particular orientation. However, it should be understood that the optical system 100 can be oriented in any particular direction, as desired. It is often desirable to direct most of the viewing range in the pitch direction downward, instead of upward because in many applications the upward direction is less noteworthy (e.g., imaging the sky or a ceiling). Generally, as used herein the terms up, down, top, bottom, upward, downward, etc. can relate to the optical system 100 in the orientation described above (see FIGS. 2 and 10, etc.). Generally, a horizontal plane, as referenced herein, can be a plane that is normal to the longitudinal axis 122 (e.g., even if the system 100 were turned on its side so that the horizontal plane for the system were to actually extend vertically in world coordinates). Generally, a vertical plane, as referenced herein, can be a plane that is perpendicular to a horizontal plane (e.g., a plane on which the longitudinal axis 122 lies). The terms yaw, yaw direction, yaw angles, horizontal angles, horizontal direction, and the like can refer to movement across a horizontal plane (e.g., similar to a person shaking their head from side to side), relative to the optical system 100. For example, even if the optical system were turned on its side, the yaw direction can extend vertically in world coordinates. The terms pitch, pitch direction, pitch angles, vertical angles, vertical direction, and the like can refer to movement across a vertical plane (e.g., similar to a person nodding their head up and down), relative to the optical system 100. For example, even if the optical system 100 were turned on its side, the pitch direction could extend horizontally in world coordinates.

Striations and Other Minor Structures

The outer reflector 104 can have minor structures that do not change the general shape of the major structure of the outer reflector 104, but that do change the direction of reflection for light the is reflected by the minor structure as compared to being reflected by the major structure only. The minor structures are sometimes referred to herein as a reflection elements, and the minor structures can have various different shapes and configurations, such as striations, a micro-mirror array, etc.

In some embodiments, the outer reflector 104 can include striations 116, which can be connected continuously, running from the inner rim 118 to the outer rim 120 of the outer reflector 104. The striations 116 can extend directly from inner rim 118 to the outer rim 120, as shown for example, in FIG. 5. One or more or all of the striations 116 can extend along respective paths that lie on respective planes that intersects a longitudinal axis 122. In some implementations, each striation 116 can extend along a path that is coplanar with the longitudinal axis 122 (e.g., as show in FIG. 5). In some embodiments, the striations 116 can twist around the circumference forming spiral patterns (e.g., as shown in FIG. 6). The striations 116 can have twists in their substructure, as can be seen for example in FIGS. 8A to 8F. The striations 116 can have continuous surfaces that extend from the inner rim 118 to the outer rim 120, or the striations 116 may be fragmented into distinct sections of various sizes, as desired. Different embodiments can include different amounts of twist for the striations 116. For example, the bottom of a striation 116 (e.g., at the second end 105 or inner rim 118) can be angularly offset from the top of the same striation 116 (e.g., at the first end 103 or outer rim 120) by an angle of between about 10 degrees and about 135 degrees. For example, the angular offset can be about 10 degrees, about 15 degrees, about 30 degrees, about 45 degrees, about 60 degrees, about 90 degrees, about 120 degrees, about 135 degrees, or any value therebetween or within any range bounded by any combination of these values. In some embodiments, the striations 116 can twist more near the bottom (e.g., at the second end 105 or inner rim 118) than at the top (e.g., at the first end 103 or outer rim 120) of the outer reflector 104, FIG. 6 shows an example embodiment of a first reflector 104 having twisted striations 116. FIG. 7 shows an example embodiment of a first reflector 104 with a single twisted striation 116 shown in exploded view and enlarged. FIGS. 8A to 8F show various view of an example embodiment of a twisted striation 116. FIG. 8A shows a top view thereof. FIG. 8B shows a bottom view thereof. FIG. 8C shows a rear view thereof. FIG. 8D shows a side view thereof. FIG. 8E shows a front view thereof. FIG. 8F shows an isometric view thereof.

Figure 5:
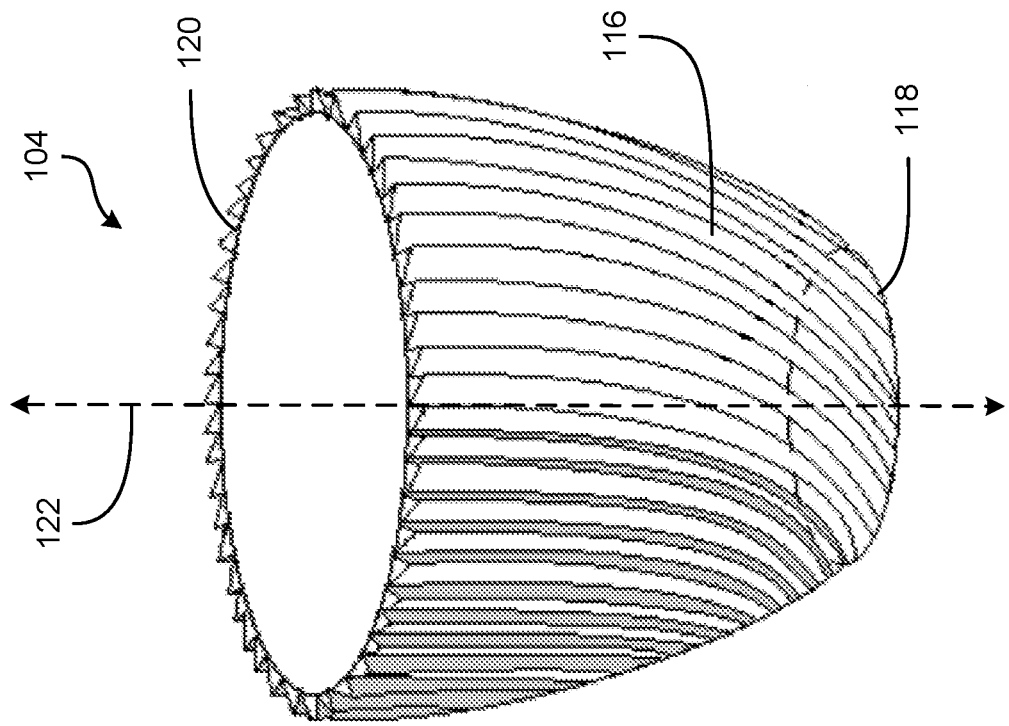
FIG. 5 shows an example embodiment of an outer reflector.
Figure 6:
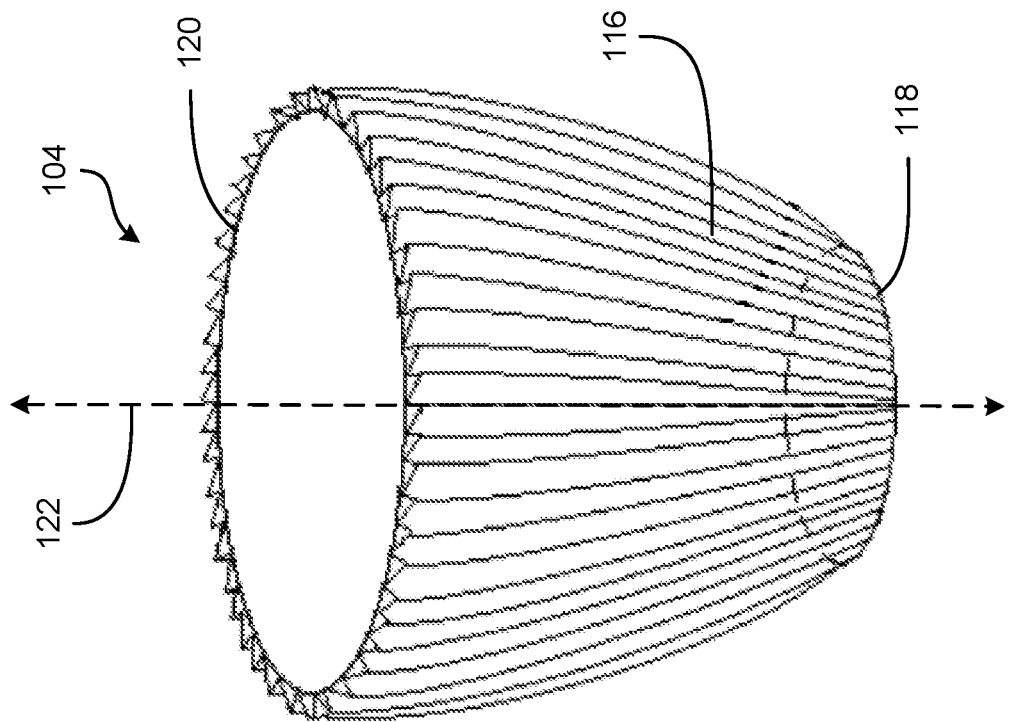
FIG. 6 shows another example embodiment of an outer reflector.

The array of striations 116 can form a wrapped saw-tooth structure, which can be twisted (e.g., FIG. 6) or not twisted (e.g., FIG. 5). The striations 116 can form small-scale valley structures embedded into the underlying large-scale structure of the overall outer reflector 104. Each valley can have at least two sides, which can be asymmetric in some embodiments. Similarly, each peak of a striation 116 can have at least two sides, which can be asymmetric in some embodiments. A first side 124 (sometimes referred to as a hidden face) can form a relatively steep angle relative to the tangent of the larger underlying curved structure at the location of the striation 116. In some embodiments, the first side 124 can be a hidden face, and can be hidden behind the second side 126 when viewed straight on (e.g., along a direction that is perpendicular to the tangent of the larger underlying curved structure). A second side 126 (sometimes referred to as a slant face or visible face) can form a shallower angle relative to the tangent of the larger underlying curved structure at the location of the striation 116. The second (e.g., shallow) side 126 can connect the first (e.g., steep) side 124 to a first (e.g., steep) side of the neighboring valley or ridge. The second sides 126 of the striations 116 can take up substantially more, or all, of the solid angle of the macroscopic structure of the outer reflector 104 than the first sides 124 as observed from the center, or as observed from the outside (e.g., along directions intersect the longitudinal axis 122).

Figure 9A:
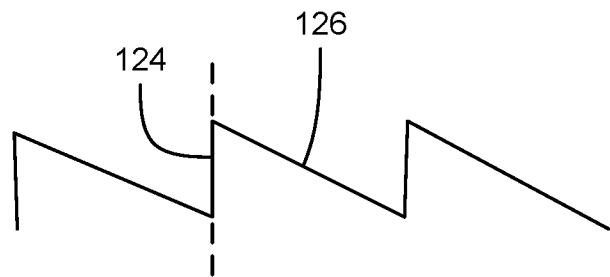
FIG. 9A-9C show example embodiments of striations.
Figure 9B:
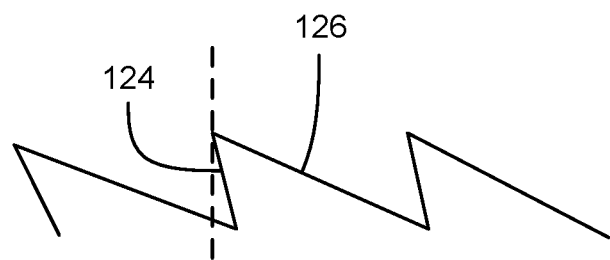
Figure 9C:
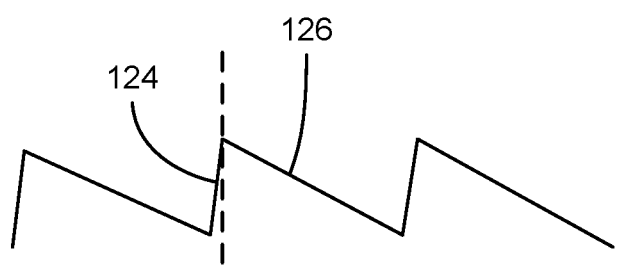

In some implementations, the steep angle of the first side 124 may be aligned to be perpendicular to the larger curved structure's tangent (e.g., to point directly at the longitudinal axis 122), for example as shown in FIG. 9A. The intersection of the first and second sides 124 and 126 can form alternating reflex angles. In some implementations, the steep angle can be even steeper than shown in FIG. 9A. For example, FIG. 9B shows an example embodiment in which the first side 124 can be recessed under the second side 126 (e.g., in the direction perpendicular to the tangent). The outer end of the second side 126 can overhang over the first side 124 (e.g., see FIG. 9B). In some implementations, the first side 124 is not recessed under the second side 126 (e.g., in the direction perpendicular to the tangent), and the first side 124 can be angled to extend circumferentially beyond the corresponding second side 126, as shown for example in FIG. 9C. In some embodiments, because the light reflected from the second sides 126 of the striations 116 to the camera 102 to form the image is offset from the line perpendicular to the tangent, the first sides 124 can extend circumferentially beyond the end of the corresponding second side 126 (e.g., see FIG. 9C) without the side 124 reflecting substantial light to the camera 102. In some instances, the embodiment of FIG. 9C can have manufacturing advantages.

The striations 116 can be used to provide the stereoscopic offset between the right-eye image and the left-eye image. From the perspective of the camera (e.g., upward), if the outer reflector 104 had a smooth contour without the striations 116 (e.g., like the inner reflector 106), then points on the surface of the first reflector 104 that the camera views would reflect objects in the scene on the same radial line from the center as the second reflector 106. In that example, the image portion corresponding to the light reflected by the first reflector 104 would not be offset from the image portion corresponding to the light reflected by the second reflector 106.

With the striations, the shallow angle of the second sides 126 relative to the tangent of the overall outer reflector 104 curvature means that when the camera 102 observes a point on one of these second sides 126, the reflected view and thus the objects seen are no longer on that axial line and are instead rotated to a new reflection angle. Thus, the viewpoint becomes "rotated" about the axis, with the camera's view observing objects in the scene with viewing lines that are rotated clockwise or counter-clockwise relative to the direction of the part of the outer reflector 104 that the camera 102 is viewing. In some embodiments, the first side 124 of each striation 116 can be only ever seen on face from the camera's perspective (if it's perpendicular to the superstructure tangent), for example if it lies on the axial line (e.g., see FIG. 9A) and therefore presents no viewable cross section. At even steeper angles (e.g., see FIG. 9B), each first side 124 (e.g., hidden face) can be fully hidden behind each second side 126 (e.g., slant face) (which can be larger) from the perspective of the camera 102.

FIGS. 10 and 11 show light portion 108 and light portion 110 entering the system 100 along paths that are offset from each other (e.g., sufficient to provide a stereoscopic effect). FIG. 10 is an isometric view, and FIG. 11 is a view looking (e.g., upward) at the first and second reflectors 104 and 106 from behind the camera 102. Light portion 110 can travel along a path that intersects the longitudinal axis 122. Light portion 110 can pass through the first reflector 104 (which can be partially transmissive), and can be reflected by the second reflector 106 at location 130 to the camera 102. The reflection at location 130 by the second reflector 106 can turn the light toward the camera 102 while permitting the light to remain on a path that intersects the longitudinal axis 122, as can be seen for example in FIG. 11. In some cases, the second reflector 106 reflects the light (e.g., toward the camera 102) without turning the light in the yaw direction (e.g., horizontal plane). Light portion 108 can enter the system 100 along a path that does not intersect the longitudinal axis 122 (e.g., along a path that is parallel to and offset from the path of light portion 110). Light portion 108 can be reflected at location 128 by the first reflector 104 (e.g., by the second side 126 of a striation 116) to the camera 102. The first reflector 104 can be configured to turn the light in the yaw direction (e.g., horizontal plane), for example so that it intersects the longitudinal axis 122 (as can be seen for example in FIG. 11), which can enable the off-axis light to be captured by the camera 102 to produce the stereoscopically offset image portion. The first reflector 104 can also turn the light in the pitch direction (e.g., downward) toward the camera 102 (which can be seen for example in FIG. 10).

In some implementations, the striations 116 can produce an obvious visible striation artifact as the reflected image becomes disjointed and discontinuous. However, with an increased number of striations 116, meaning also a decreased size for individual striations 116, the reflected angles approach continuity and the artifact scale reduces. As the striation density approaches the camera's angular resolution from the perspective of the camera 12, such artifacts naturally disappear. Different numbers (and sizes) of striations can be used in different systems. For example, a system having a higher resolution camera 102, a larger size of outer reflector 104, and/or a higher demand for imaging accuracy, etc. could have a larger number of striations 116 and/or smaller sized striations 116 than a system having a lower resolution camera 102, a smaller sized outer reflector 104, and/or a lower demand for imaging accuracy (which could use fewer striations 116 and/or striations of larger size). In some embodiments, the system 100 can use at least about 10 striations, at least about 25 striations, at least about 50 striations, at least about 75 striations, at least about 100 striations, at least about 150 striations, at least about 200 striations, at least about 300 striations, at least about 500 striations, at least about 1000 striations, at least about 2000 striations, at least about 3000 striations, at least about 4000 striations, at least about 5000 striations at least about 7500 striations, at least about 10,000 striations, or more, or any other values between the above-listed values, or any ranges bounded by any combination of the above-listed values.

The striation artifacts may also be mitigated by averaging techniques. For example, rotating the first reflector 104 about the axis 122 can create a time-average of many striations 116 over the duration of the camera's exposure. The first reflector 104 can be rotated (e.g., relative to the camera 102 and/or relative to the inner connector 106) using a motor or any other suitable actuator. In some embodiments, the inner reflector 106 can rotate with the outer reflector 104, and the inner reflector 106 can be rotationally symmetrical about the axis 122, so that rotation of the inner reflector 106 does not materially affect the image. In some embodiments, digital image processing can be used to interpolate or warp image portions from the reflection of neighboring striations 116 such that they match at their faces or average.

Curvature Optimization

The major curvature of both the inner and outer reflectors 104 and 106 (as well as other features in the system 100) can be selected to balance the optimization of one or more of multiple factors, simultaneously in some cases. For example, the system 100 can be configured to provide a sensible allotment of resolution along the determined desirable viewing plane. In some embodiments, the system can provide an image with an even distribution of pixels per degree across the full viewing range in the pitch and/or yaw directions. The number of pixels per degree can vary (e.g., in the yaw and/or pitch directions) by about 30% or less, by about 20% or less, by about 10% or less, about 5% or less, about 2% or less, about 1% or less, or less, or any values therebetween, or any ranges bounded by the above-identified values. In some embodiments, the system can provide more uneven pixel distribution in the pitch direction. For example, the pixel density for pitch directions near the horizontal plane can be higher than the pixel density for pitch directions near the upper and lower ends of the pitch range. In some example embodiments, the system 100 can be configured to have about 11.5% of the angular resolution allocated from 0 to 30 degrees from the axis, 77% of the angular resolution allocated from 30 degrees to 130 degrees from the axis, and 11.5% of the angular resolution allocated from 130 degrees to 160 degrees from the axis. The angular resolution or pixel density for the pitch direction at the horizontal plane can be higher than the angular resolution or pixel density for the pitch direction at the upper and/or lower end of the pitch range by at least about 10%, at least about 25%, at least about 50%, at least about 75%, at least about 100%, at least about 125%, at least about 150%, or more, or less than or equal to about 200%, less than or equal to about 150%, less than or equal to about 100%, less than or equal to about 75%, less than or equal to about 50%, less than or equal to about 25%, or less, or any values there between, or any ranges bounded by any combination of the above-identified values.

The systems can be configured to provide a similar or matching 2-dimensional angular resolution for the image portions from the inner and outer reflectors 104 and 106 from the perspective of the camera 102. For example, the image can be divided evenly between the inner image portion 114 and the outer image portion 112. The thickness of the radius of the inner image portion 114 can be larger than the thickness of the radius of the outer image portion 112 (e.g., because the outer image portion has a longer circumference). The area of the inner image portion 114 can be larger, or smaller, than the area of the outer image portion 112 by less than about 50%, less than about 40%, less than about 30%, less than about 20%, less than about 10%, less than about 5%, less than about 2%, or less, or any values therebetween, or any ranges bounded by any combination of the values identified above.

Figure 14:
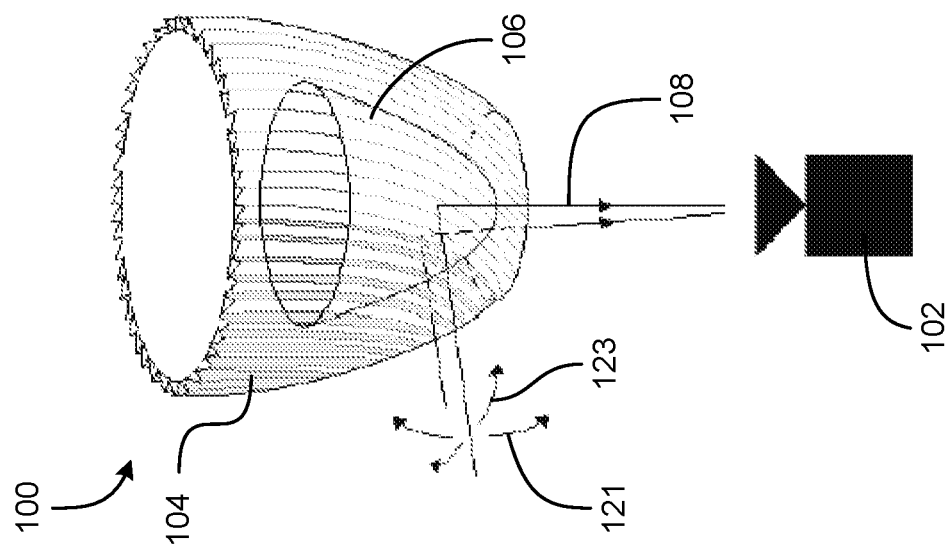
FIG. 14 shows an example of light being reflected to the camera in an example embodiment of an optical system.
Figure 13:
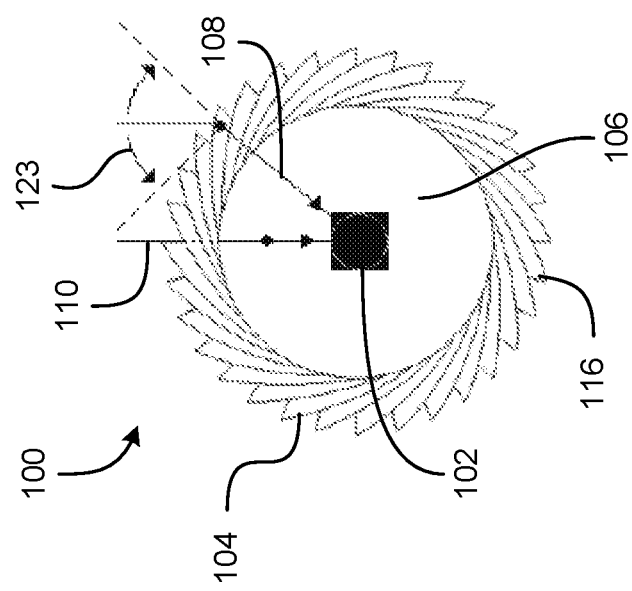
FIG. 13 shows an example of light being reflected to the camera in an example embodiment of an optical system.
Figure 12:
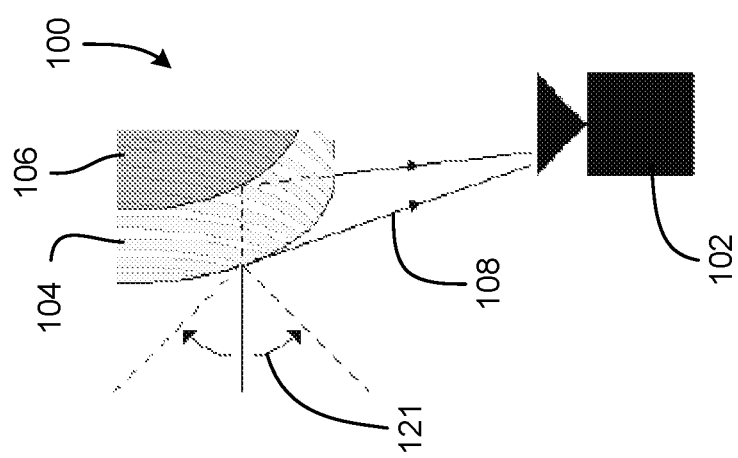
FIG. 12 shows an example of light being reflected to the camera in an example embodiment of an optical system.

The system can be configured to provide a consistent stereoscopic correlation and angular rotation introduced by the outer reflector 104 across the vertical/pitch range. For example, the offset distance between the two images can be consistent across the pitch range (e.g., and across the yaw direction as well). Adjusting the slant of the striation 116 angles can control the yaw angle 123 of the reflection (as can be seen for example in FIG. 13). Adjusting the combined twist of the striation 116 together with the slant of the striation 116 can control the pitch angle 121 of the reflection (as can be seen for example in FIG. 12). Configuring the striations 116 can enable control of the reflected beam (e.g., in the pitch angle 121 and the yaw angle 123, as shown for example in FIG. 14) from the outer reflector 104 so that reflection location on the outer reflector 104 has the desired parallax offset compared to the corresponding beam and reflection location on the inner reflector 106, and/or so that the total distance for the corresponding light paths reflected by the outer reflector 104 and the inner reflector 106 have the same total light path distance.

Figure 16:
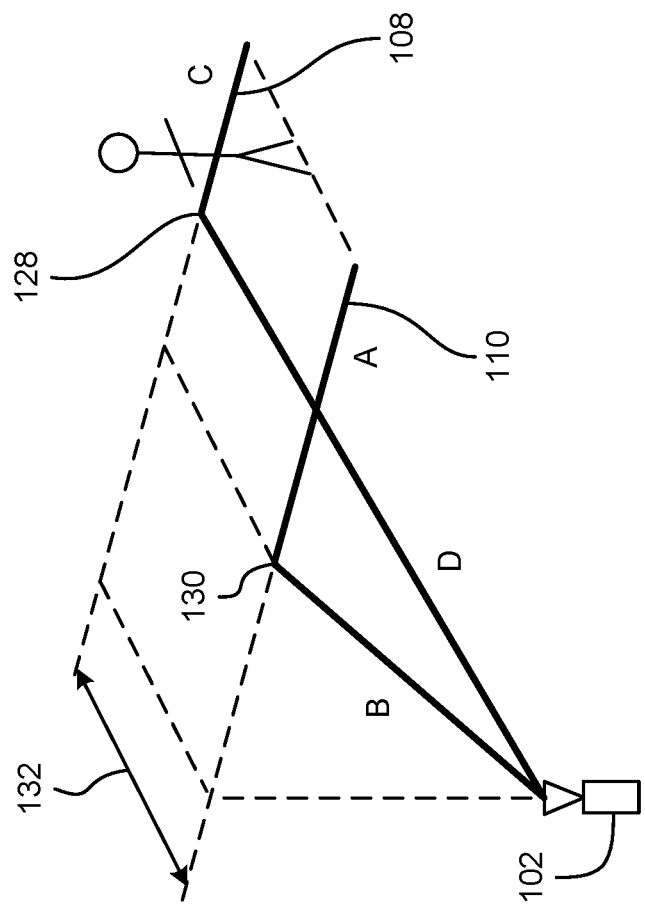
FIG. 16 shows the path lengths for light reflected by an outer reflector to a camera and for light reflected by an inner reflector to the camera.
Figure 15:
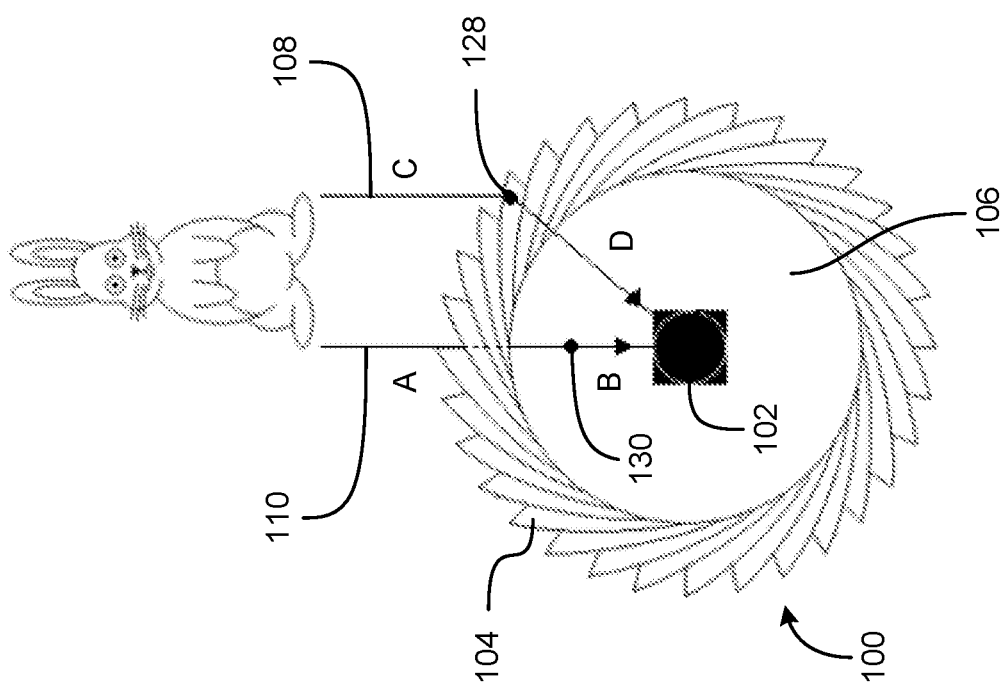
FIG. 15 shows a view from behind the camera of an example embodiment of light being reflected by an outer reflector and light being reflected by an inner reflector to a camera with consistent path lengths.

The system can be configured to provide a consistent distance to the subject space in the environment from the camera's position taking into account both the angular rotation that is caused by the reflections and the radial distance from the center. With reference to FIGS. 15 and 16, the on-axis light 110 can have a light path A from the subject to the reflection location 130 where the light 110 is reflected by the second reflector 106, and a light path B from the reflection location 130 to the camera 102. The off-axis light 108 can have a light path C from the subject to the reflection location 128 where the light 108 is reflected by the first reflector 104, and a light path D from the reflection location 128 to the camera 102. In some embodiments, the distance of light path A plus light path B can be substantially equal to the distance of light path C plus light path D. The system 100 can be designed such that the distance of light path A plus light path B is equal to the distance of light path C plus light path D, and manufacturing tolerances and the like can result in small variations in the distance of light path A plus light path B as compared to the distance of light path C plus light path D. For example, the difference between the distance of light path A plus light path B and the distance of light path C plus light path D can be less than about 10% or less than about 5% of the offset distance 132 between the light paths, and/or less than about 10% or less than about 5% of the radius of the inner reflector 106, although values outside these ranges can be used in some implementations. In some embodiments, the difference between the distance of light path A plus light path B and the distance of light path C plus light path D can be less than about 100 mm, less than about 75 mm, less than about 50 mm, less than about 40 mm, less than about 30 mm, less than about 20 mm, less than about 10 mm, less than about 5 mm, less than about 2 mm, or less, or any values therebetween, or any ranges bounded by any combination of the above-identified values.

The system 100 can be configured to provide an offset distance 132 of different sizes, for example depending on the application. In some embodiments, the system 100 can be configured to provide an offset distance 132 between about 20 mm and about 100 mm, or between about 50 mm and about 80 mm, or any value or range contained therein. The offset distance 132 can be configured to simulate the distance between the eyes of a human user. Other values for the offset distance 132 can be used, which can be well below or above the values listed above, for example to intentionally distort the three dimensional affect of the images.

The inner reflector 106 can be spaced from the outer reflector 104 (e.g., in the horizontal direction) by a distance that corresponds to the stereoscopic offset produced by the system. For example, inner reflector 106 can be spaced from the outer reflector 104 (e.g., in the horizontal direction) by a distance of between about 10 mm to about 100 mm, such as by about 10 mm, about 25 mm, about 30 mm, about 40 mm, about 50 mm, about 75 mm, about 100 mm, or any values therebetween, or any ranges bounded by any combination of the above-identified values. The system 100 can be configured to provide a consistent distance between the inner reflector 106 and the outer reflector 104 (e.g., as measured in the horizontal direction). The system 100 can be configured to provide a human-interpretable reflection of the image-plane. In some embodiments, the system 100 can be designed to have a uniform distance between the inner reflector 106 and the outer reflector 104 (e.g., as measured in the horizontal direction) across part of, a majority of, or all of, the surface of the inner reflector 106, and in some implementations manufacturing tolerances and the like can produce small variations. In some embodiments, some variations in the spacing between the inner reflector 106 and the outer reflector 104 can be designed into the system. In some embodiments, the distance between the inner reflector 106 and the outer reflector 104 varies (e.g., as measured in the horizontal direction) across part of, a majority of, or all of, the surface of the inner reflector 106 by less than about 50%, less than about 40%, less than about 30%, less than about 20%, less than about 10%, less than about 5%, less than about 2%, or less of the radius of the inner reflector 106, or any values therebetween, or any ranges bounded by the above-identified values.

The allocation of angular range and angular resolution density can be adjusted to various different values through design of the major curvature of the second reflector 106 and/or the first reflector 104. In some embodiments, the relative distance separations can be controlled by the similarity of the two curvatures of the first and second reflectors 104 and 106.

As can be seen for example in FIG. 1, the second (e.g., inner) reflector 106 can have a dome shape, or a paraboloid-like or generally paraboloidal curved shape. In some implementations, the shape of the second reflector 106 can be a true geometric paraboloid, while in other implementations, the shape can be generally paraboloidal or merely paraboloid-like. For example, the second reflector 106 can have a wide circular first end 107 and an apex or a narrow circular second end 109 on the opposite side. The side walls can be curved and can taper from the wider first end 107 toward the second end 109. The cross-sections of the second reflector 106 taken along the direction from the wider first end 107 toward the second end 109 can be circular and continuously decreasing in diameter, and the rate at which the diameter decreases can increase closer to the second end 109. The second reflector 106 can be open or closed on the top side by the wider first end 107. By way of example, the second reflector 106 can be constructed of a solid or hollow material that can be reflective or can be covered with a reflective material.

The first (e.g., outer) reflector 104 can be formed of a dome or generally paraboloidal shape, similar to the second reflector 106, described above. The first reflector 104 can have a wide circular first end 103 and a narrower circular second end 105 at the opposite side. The second end 105 can have a hole through the longitudinal axis 122. The hole can be sized such that enough such that from the camera's perspective the inner reflector 106 fills the available angular view through the hole leaving little to no angular resolution between the inner reflector 106 and outer reflector 104 not being used. For example, FIG. 3 is a view from the camera 102 towards (e.g., upward towards) the first and second reflectors 104 and 106, and the inner reflector 106 can fill the hole at the second end 105 of the outer reflector 104 from the perspective of the camera 102. In some embodiments, the first reflector 104 can have the shape of a true geometric paraboloid with the apex end removed to form the hole. In some embodiments, the shape of the first reflector 104 can be generally paraboloidal or merely paraboloid-like. The side walls of the first reflector 104 can be curved and can taper from the wider first end 103 toward the second end 105. The cross-sections of the first reflector 104 taken along the direction from the wider first end 103 toward the second end 105 can be circular and continuously decreasing in diameter, and the rate at which the diameter decreases can increase closer to the second end 105. The first reflector 104 can be open or closed on the top side by the wider first end 103.

The size and placement of the first and second reflectors 104 and 106 relative to the camera 102 can be designed to maximize use of the angular range of the camera 102, depending on its lenses for example, in order to not waste resolution. In some embodiments, since the inner reflector 106 forms a continuous surface across the center of the axis 122, it can reflect downward angles including towards the camera 102. With reference to FIG. 17, in some embodiments, the inner rim (e.g., second end 105) of the outer reflector 104 can be curved inward, forming a lip that reflects not only viewlines down to the vertical, but extends beyond, giving viewlines all the way to the camera 102 (such that the camera 102 can potentially see itself in both the inner reflector 106 and the outer reflector 104. As shown in FIG. 17, in some embodiments, the second end 105 of the outer reflector 104 can be curved inward (e.g., having an overhang). In some implementations, reflected viewlines projected from the camera at and very close to the second end 105 (e.g., the inner rim) may be reflected back inwards, such that they may point behind the camera 102 enabling the camera to observe an area 134 behind itself. This observed range is also controlled by the curvature of the striations on the outer reflector 104. In some implementations, a portion of the image from the outer reflector 104 (e.g., the image of the area behind the camera 102) does not have a corresponding image portion from the inner reflector 106, and that portion of the image would not have the stereoscopic 3D effect.

The presence of the camera 102 in the image can produces an occlusion that wastes resolution. Accordingly, it can be desirable to configure first reflector 104 and/or the second reflector 106 so that the camera 102 does not capture itself in the image. In some embodiments, the hole at the second end 105 and/or the curvature of the outer reflector 104 near the second end 105 can be configured to image in the downward direction while excluding the camera 102 from the image. Forming the end of the inner reflector 106 into a shallow tip, as shown for example in FIG. 18, can limit the available viewlines to those outside of the camera 102. Accordingly, the camera 102 can be hidden in a cone 136 that the camera 102 cannot observe. Excluding the camera 102 from the image can maximize use of the image resolution for the rest of the imagespace. The shape of the second end 105 of the outer reflector 104 and the shape of the end 109 of the inner reflector 106 can be configured so that the range of the image portions produced by the first and second reflectors 104 and 106 omit the same area around the camera 102.

Simple Light Path

The simple light path can depict an incoming light ray 110) from the surrounding environment, reflected off the inner reflector 106, and onto the image plane captured by the camera 102. Each point reflected off the surface of the inner reflector 106 can have a corresponding point captured from the reflection off the outer reflector 104, and together the two points can produce two paired pixels in the image plane that provide similar perspectives of the environment. In some instances, if the outer reflector 104 did not have the striations 116 (or similar features) and were smooth like the inner reflector 106 then both pixels would resolve the same single reflection line out into the surrounding environment. Thus, the two paired pixels would not represent offset viewing positions and would not produce the desired stereoscopic 3D effect. As discussed herein, the outer reflector 104 can be configured to turn off-axis light 108 (e.g., in the yaw direction) to provide offset viewing positions for the two paired pixels, so as the enable stereoscopic 3D viewing.

From a more detailed point of view, any given light cone diffusely emitting/radiating/reflecting from a given point of an object in the scene that is on the focal plane of the camera 102 reflects across the surface of the reflectors with a portion of the diffused rays reflecting off a small zone on each reflector into the aperture of the camera, and the rest of the light is either reflected away from the camera by the reflectors or misses the reflectors completely. In some embodiments, the camera 102 can have a lens, and the lens can refract the small spread of light from the original emanating point towards a single point on the surface of the camera's detector, forming the image plane. The limited zone of reflection for any given light cone, which can be controlled by the aperture and focal length of the camera (for example), ensures that even with distortion that can be introduced by the curvature of the reflector, any given point in the scene on the focal plane should remain in focus in the image plane. In some implementations, light rays arriving from points off of the focal plane are directed to multiple pixels in the image plane, and form a Gaussian blur depth of field effect. This effect, however, can be minimized when the camera lens is set to focus on infinity, which can widen the field depth, and/or the cameras aperture is relatively small (e.g., such as in a mobile phone camera).

Complex Light Path

With the incoming array of light reflecting off the inner reflector 106 and the outer reflector 104, all view-lines across the yaw angles (e.g., in the horizontal plane) can be covered over the full 360-degree surface of each of the first and second reflectors 104 and 106, creating reflection points that each correspond to a single pixel on the image plane. However, in some embodiments, these reflected view lines from the first and second reflectors 104 and 106 do not match one another in a given radial direction (as can be the case without the striations 116 or similar features) and are instead shifted around the reflectors either clockwise or counter-clockwise, depending on the directional angles of the second sides 126 (e.g., slant faces) of the striations 116. The complex light path can describe the rotation of view-lines reflected off the striations 116 in order to achieve offset parallel viewlines forming each pixel pair on the image plane.

Figure 22:
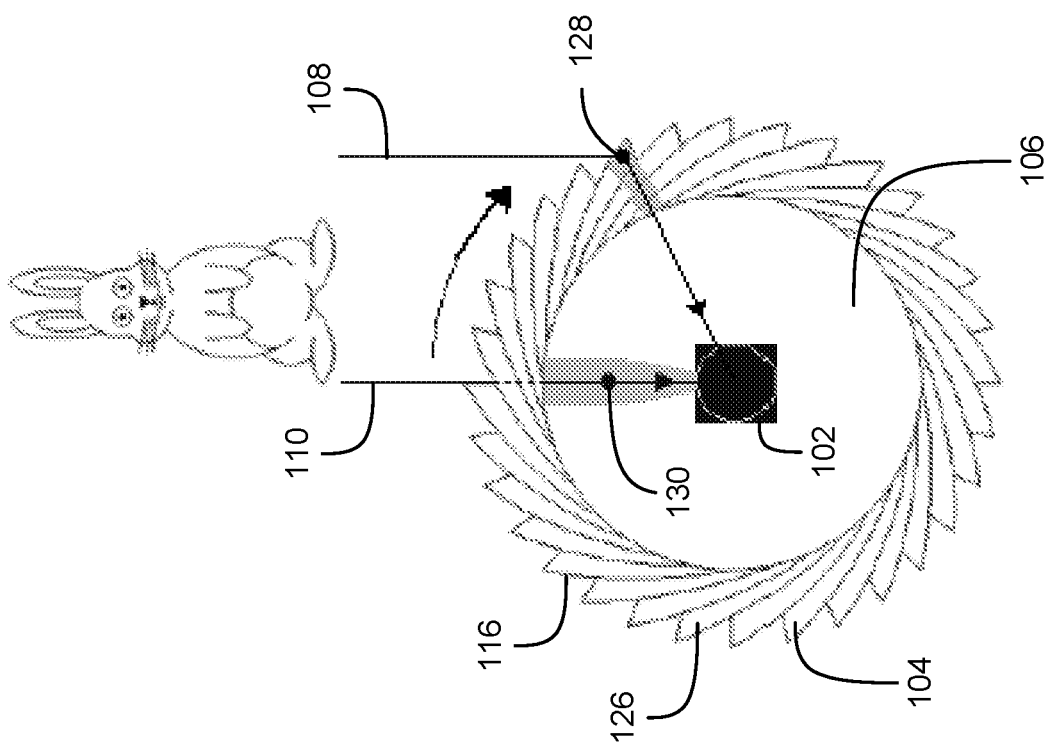
FIG. 22 shows an example embodiment in which an outer reflector is configured to turn the reflected light by a second, larger amount to produce a second, larger stereoscopic offset.
Figure 21:
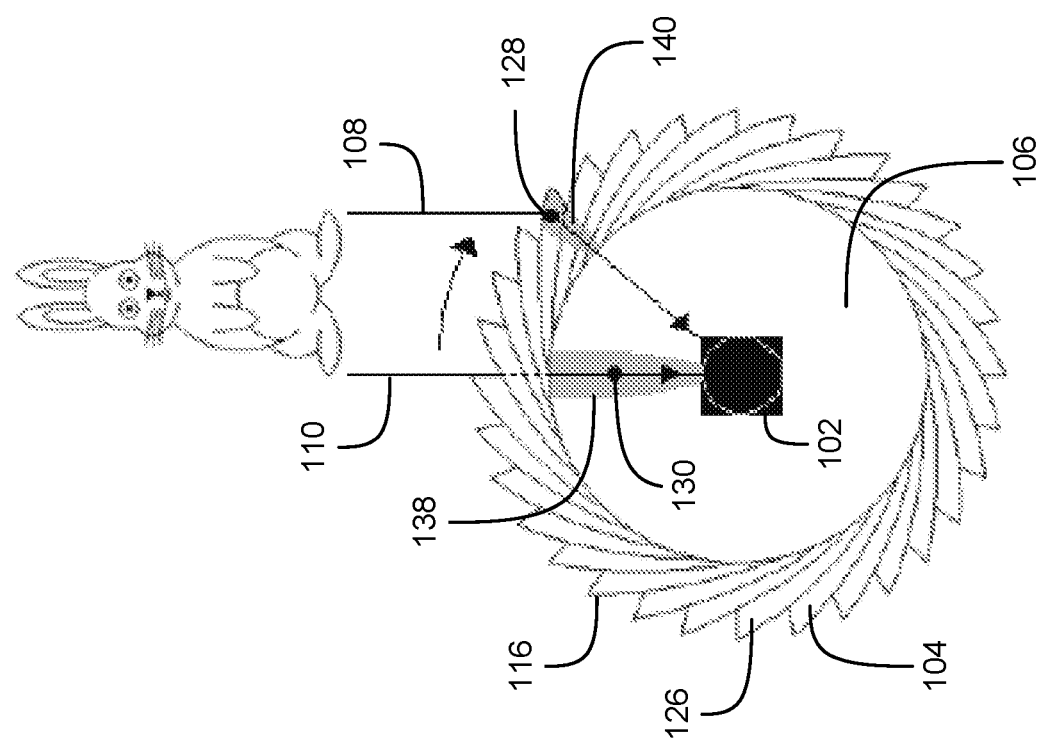
FIG. 21 shows an example embodiment in which an outer reflector is configured to turn the reflected light by a first amount to produce a first stereoscopic offset.

By controlling the given slant angle of each striation 116 (e.g., relative to the underlying curvature of the outer reflector 104), the reflection location 128 on the surface of the outer reflector 104, whose reflected view-line corresponds spectroscopically to a view line of the reflection location 130 on the inner reflector 106, can be rotated around the axis to various different positions on the outer reflector 104, as desired. Changing the angles of the striations 116 (e.g., the angle of the second surfaces 126 of the striations 116), can alter the position of the reflection location 128 relative to the corresponding reflection location 130 on the inner reflector 106. For example, the more the striations 116 are angled to turn the light more in the horizontal plane (e.g., across yaw angles), the more the reflection location 128 on the outer reflector 104 is offset from the corresponding reflection location 130 on the inner reflector 106. Thus, in some cases changing the angles of the striations 116 can, in effect, rotate the position of the reflection location 128 on the outer reflector 104 with respect to the corresponding reflection location 130 on the inner reflector 106. FIG. 21 shows an example embodiment in which the striations 116 are angled to turn the reflected light (e.g., in the yaw direction) by a first amount, thereby effectively rotating the reflection location 128 by a first amount relative to the reflection location 130, and thereby producing a first amount of offset for the pixel pair. FIG. 22 shows an example embodiment in which the striations 116 are angled to turn the reflected light (e.g., in the yaw direction) by a second amount that is larger than the first amount, thereby effectively rotating the reflection location 128 relative to the reflection location 130 by a second amount that is larger than the first amount, and thereby producing a second amount of offset for the pixel pair that is larger than the first amount of offset. The striations 116 (or similar features) on the outer reflector 104 can be configured to turn the light by the right degree and to position the reflection location 128 at a position such that the view-lines for locations 128 and 130 are separated by a constant distance (e.g., parallel, offset view-lines), that constitutes a stereoscopic separation, from which stereoscopic triangulation is attainable.

With the proper application of reflection adjustment (e.g., by the striations 116 or similar features), every viewable direction reflected on the inner reflector 106 (which can cover the complete 360 degrees in the horizontal plane) can have a corresponding viewable image line (e.g., from the outer reflector 104) in the same direction that is stereoscopically separated and accurate. Thus, with the two images (e.g., produced by the inner reflector 106 and the outer reflector 104) one can extract stereoscopic images that form a contiguous global panorama, that can maintain an accurate and consistent parallax separation in all radial directions (e.g., across the horizontal plane).

Figure 20:
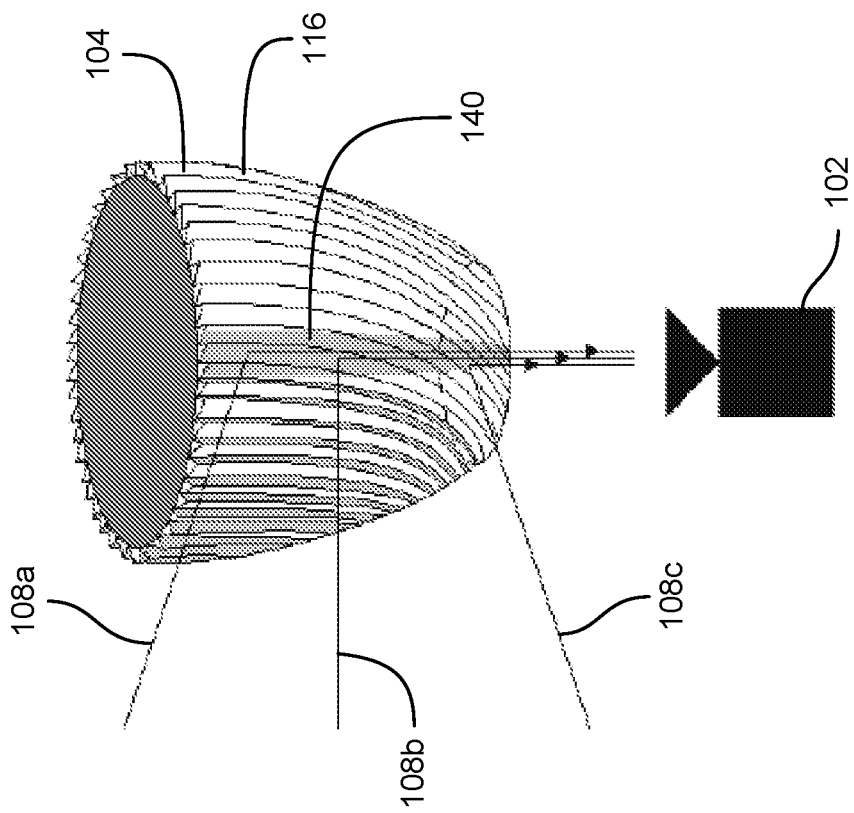
FIG. 20 shows an example of light being reflected from different vertical locations on an outer reflector to a camera.
Figure 19:
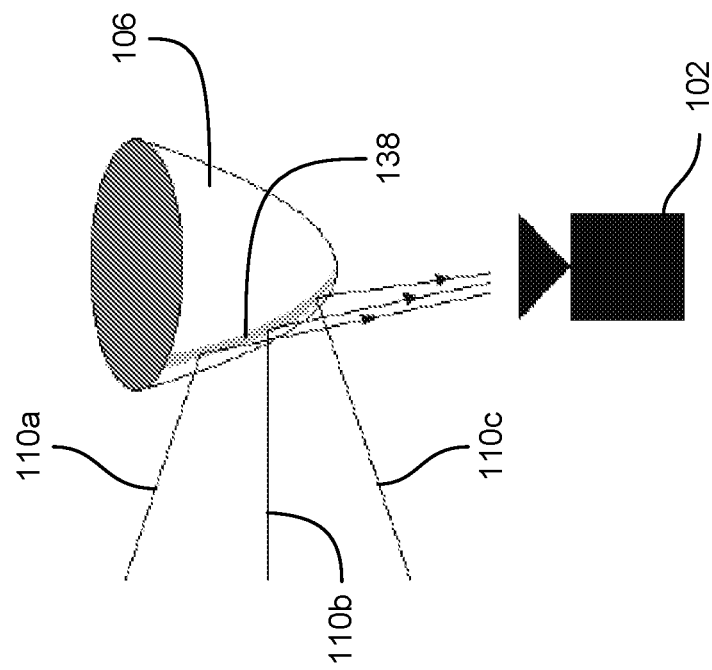
FIG. 19 shows an example of light being reflected from different vertical locations on an inner reflector to a camera.

FIG. 19 shows an example embodiment of the second (e.g., inner) reflector 106 reflecting light to the camera 102. FIG. 20 shows an example embodiment of the first (e.g., outer) reflector 104 reflecting light to the camera 102. The outer reflector 104 is omitted from view in FIG. 19, and the inner reflector 106 is omitted from view in FIG. 20, for illustrative purposes. In FIG. 19, three example rays of light 110a, 110b, and 110c are shown being reflected from different angles in the vertical plane (e.g., different pitch angles) toward the camera 102. The light rays 110a, 110b, and 110c can be on-axis light that approaches the system 100 along paths that intersects the longitudinal axis 122. The light rays 110a, 110b, and 110c can be reflected by the inner reflector 106 to the camera without turning the light rays 110a, 110b, and 110c across the yaw direction.

In FIG. 20, three example rays of light 108a, 108b, and 108c are shown being reflected from different angles in the vertical plane (e.g., different pitch angles) toward the camera 102. The light rays 108a, 108b, and 108c can be off-axis light that approaches the system 100 along paths that do not intersect the longitudinal axis 122. The light rays 108a, 108b, and 108c can be reflected by the outer reflector 104 to the camera 102. The outer reflector 104 can turn the light (e.g., in the yaw direction) to travel towards the camera along paths that intersects the longitudinal axis 122. In FIG. 19, the stripe 138 indicates the reflected view area on the inner reflector 106 that corresponds to portion 137 of the image sensor of the camera 102 shown in FIG. 4. In FIG. 20, the stripe 140 indicates the reflected view area on the outer reflector 104 at a rotated angle across multiple curving striations 116. The stripe 140 of the outer reflector 104 can reflect light onto the camera 102 corresponding to the portion 139 of the image sensor of the camera 102 as shown in FIG. 4.

As can be seen in FIGS. 19 and 20, view lines from higher portions of the outer reflector 104 and/or inner reflector 106 can be reflected at larger obtuse angles, view lines from middle areas of the outer reflector 104 and/or the inner reflector 106 can be reflected at smaller obtuse angles, and view lines from lower portions of the outer reflector 104 and/or the inner reflector 106 can be reflected at acute angles. Accordingly light across a wide range of pitch angles can be captured by the camera 102.

With reference to FIG. 2, the viewing range can extend across a full 360 degrees in the horizontal plane (e.g., across yaw angles), and the viewing range can have a pitch angle range 142 that is less than 180 degrees (which would provide full viewing range in any direction. In some embodiments, the optical system 100 is configured to not image the area directly above the system 100. For example, in some implementations, the optical system 100 is configured to not image the area within a frustoconical area above the system 100, e.g., having a pitch angle range 144 of about 15 degrees to about 120 degrees. The pitch angle range 144 of the non viewing area above the system 100 can be less than about 180 degree, less than about 120 degrees, less than about 90 degrees, less than about 60 degrees, less than about 45 degrees, less than about 30 degrees, or less, or any other values therebetween, or within any ranges bounded by any combination of the above-identified values. As discussed herein, in some embodiments, the system can image across a full range of downward directions (e.g., even including imaging the camera 102 itself), while in other embodiments an area around the camera can be omitted from the imaging area. The viewing range can have a pitch angle range 142 that is between about 45 degrees and about 165 degrees, or between about 90 degrees and about 135 degrees. The viewing range can have a pitch angle range 142 of at least about 45 degrees, at least about 90 degrees, at least about 135 degrees, at least about 165 degrees, or any other values therebetween, or within any ranges bounded by any combination of the above-identified values.

With reference again to FIGS. 19 and 20, if the light rays 108a, 108b, and 108c are parallel (but offset from) the light rays 110a, 110b, and 110c respectively, and if the striations 116 were configured to reflect the light rays 108a, 108b, and 108c at the different vertical locations on the radial strip 140 as shown in FIG. 20 to the camera 102 (e.g., by adjusting the striations 116, such as so that the striations 116 are not twisted, as shown in FIG. 5), then the lateral offset between light rays 110b and 108b could be smaller than the lateral offset between light rays 110a and 108a, and the lateral offset between light rays 110c and 108c could be smaller still. This is because the outer reflector 104 can be tapered inwardly in the downward direction so that the distance between light 108c and 110c is less than the distance between light 108a and 110a, for example.

FIG. 23 shows an example embodiment of an optical system 100 having striations 116 that are configured to reflect light from various different vertical positions on the outer reflector 104 such that the light reflected at the different vertical positions have consistent lateral displacement relative to corresponding parallel light that is reflected by the inner reflector 106. FIG. 24 is a view from below the camera 102 showing an example optical system 100 similar to that of FIG. 23. In FIG. 23, the inner reflector 106 is omitted for ease of illustration. The inner reflector 106 of the system of FIG. 23 can reflect light rays 110a, 110b, and 110c similar to FIG. 19. The inner reflector 106 can reflect light rays 110a, 110b, and 110c at respective reflection locations 130a, 130b, and 130c to the camera 102. The outer reflector 104 can reflect the light rays 108a, 108b, and 108c at respective reflection locations 128a, 128b, and 128c to the camera 102. The lateral offset between the light rays 108a and 110a can be the same as the lateral offset between light rays 108b and 110b and/or can be the same as the lateral offset between the light rays 108c and 110c. Accordingly, the outer reflector 104 can be configured to reflect light from various different vertical positions on the outer reflector 104 to the camera 102 such that the light to be reflected at the different vertical positions have consistent lateral offset relative to corresponding parallel light that is to be reflected by the inner reflector 106 to the camera 102. This can provide a consistent stereoscopic separation between the right-eye image and the left-eye image (e.g., across various pitch angles).

Along any given radial slice (e.g., stripe 138 in FIG. 24) of the inner reflector 106 (e.g., from the center to its outer rim), there is a corresponding slice (e.g., stripe 146 in FIGS. 23 and 24) on the outer reflector 104, which can extend across a partial chord parallel to the radial slice 138 of the inner reflector 106 when viewed from the from the bottom (e.g., from the camera's perspective). The points on the slice 146 can give corresponding stereo-separated viewlines to corresponding points on the slice 138 of the inner reflector 106, separated, for example, by an interocular distance to give an accurate stereo image. The system 100 (e.g., including the striations 116 or other similar features) can be configured for image capture wherein the corresponding projected viewlines reflected from the inner reflector 106 and the outer reflector 104 should not only point in the same pitch and yaw directions with a consistent stereoseparation, but can also be aligned at the same height. Furthermore, the total path distance from the camera 102 to the scene via reflection can match along both light paths, and the extra Pythagorean length from the point on the outer reflector 104 with the corresponding viewline compared to the length from the camera to the point on the inner reflector 106 can be offset by increasing the radial width of the outer reflector 104 to bring it closer to the subjects in the scene by the same length.

Making the reflected viewlines of the outer reflector 104 correspond to those of the inner reflector 106 (e.g., to be parallel with stereoscopic offset) is enabled by adjusting the pitch and/or yaw rotation that the outer reflector 104 imparts on the light that it reflects (e.g., by Fresnel micro-structures, the striations 116, or other similar features) to achieve the appropriate reflection. In some embodiments, to achieve the combination of not just yaw adjustments, but also pitch adjustments to the light reflected by the first reflector 104, the Fresnel micro-structures, striations 116, etc. can be formed circumferentially as well as radially (e.g., forming a grid). The micro-structures can break the continuity of the surface of the outer reflector 104 in both directions, which can reducing ease of manufacturing as compared to striations 116 that are continuous in one direction (e.g., top to bottom).

Figure 25:
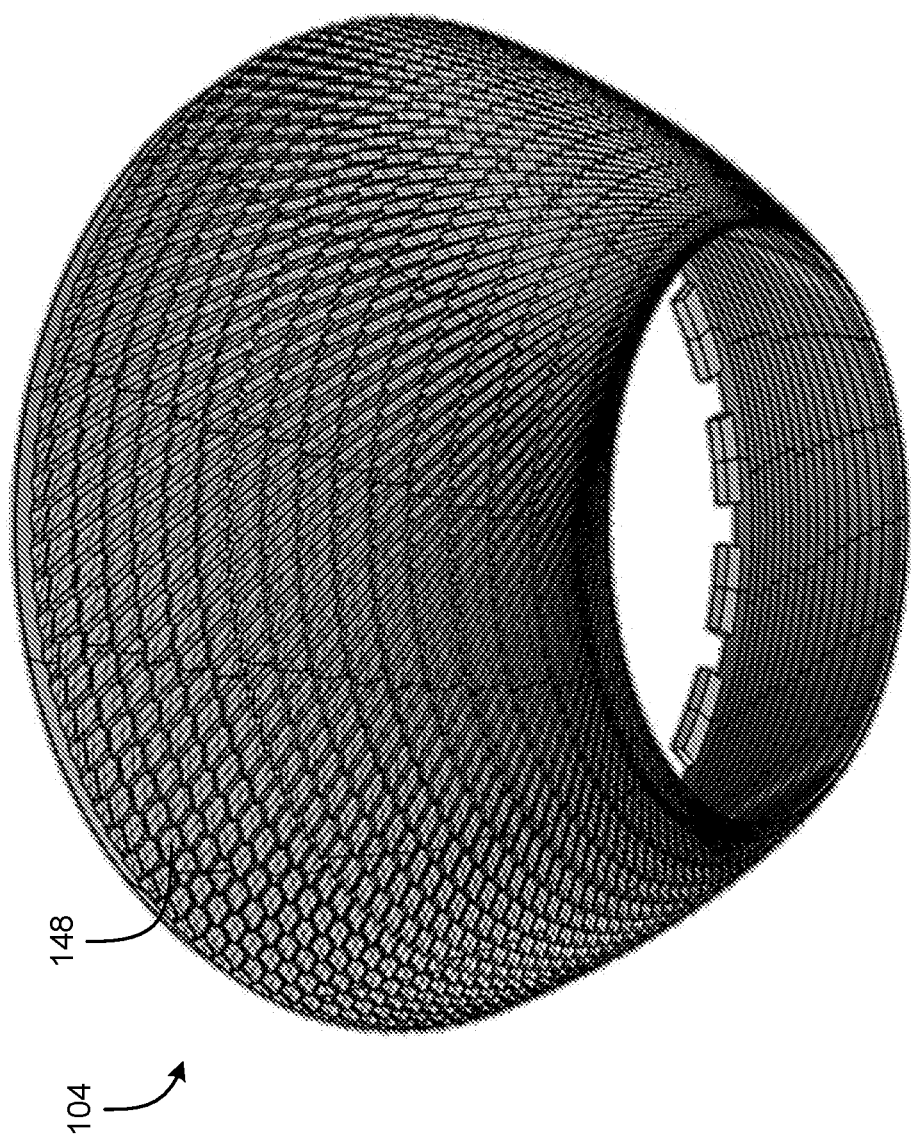
FIG. 25 shows an example embodiment of an outer reflector having reflection elements that are discontinuous in the vertical and horizontal directions.

FIG. 25 is an example embodiment of a first (e.g., outer) reflector 104 having a number of reflection elements 148, which can be discontinuous (e.g., in the circumferential direction and/or in the vertical direction). The reflection elements 148 can perform different reflective operations to achieve the desired reflection, as discussed herein. The reflection elements 148 can be micro-structures. The reflection elements 148 can be a micro-mirror array. In some embodiments, the system 100 can use at least about 50 reflection elements, at least about 100 reflection elements, at least about 250 reflection elements, at least about 500 reflection elements, at least about 750 reflection elements, at least about 1000 reflection elements, at least about 1500 reflection elements, at least about 2000 reflection elements, at least about 5000 reflection elements, at least about 10,000 reflection elements, at least about 50,000 reflection elements, at least about 100,000 reflection elements, at least about 500,000 reflection elements, at least about 1,000,000 reflection elements, at least about 2,000,000 reflection elements, at least about 5,000,000 reflection elements, at least about 10,000,000 reflection elements, at least about 20,000,000 reflection elements, at least about 30,000,000 reflection elements, at least about 50,000,000 reflection elements, at least about 75,000,000 reflection elements, at least about 100,000,000 reflection elements, or more, or any other values between the above-listed values, or any ranges bounded by any combination of the above-listed values. The number of reflection elements can approach the resolution of the camera so that they become effectively invisible and continuous to the camera.

The first (e.g., outer) reflector 104 of FIG. 25 can operate similar to the other outer reflectors 104 disclosed herein, and the first reflector 104 of FIG. 25 can be incorporated into the various embodiments disclosed herein in place of other first reflectors 104. Accordingly, much of the discussion herein relating to striations 116 can also apply to the other reflection elements 148 disclosed herein (e.g., of FIG. 25). The outer reflector 104 that reflects incoming environmental light may not need to be formed into long contiguous striations, and can in fact be composed of a 2 dimensional array of separate mirrored faces that are non-contiguous across the surface.

Since the optical requirement of any given concentric radius of the outer reflector 104 is the same all the way around, it may be rotated to any desired position, such that the set of Fresnel micro-structures, striations 116, etc. of one concentric ring can best match the striations in the neighbouring rings, and the striations can join to form a single strip, that would naturally adopt a gradual twist. In some embodiments, these twisted striations running the length of the device would neither conform to a radial line or the slice described earlier. Nevertheless a radial slice from the inner reflector 106 can match to a parallel partial chord slice of the outer reflector 104, bisecting many twisting Fresnel strips the form a radial spiral.

Reflectivity

Figure 27:
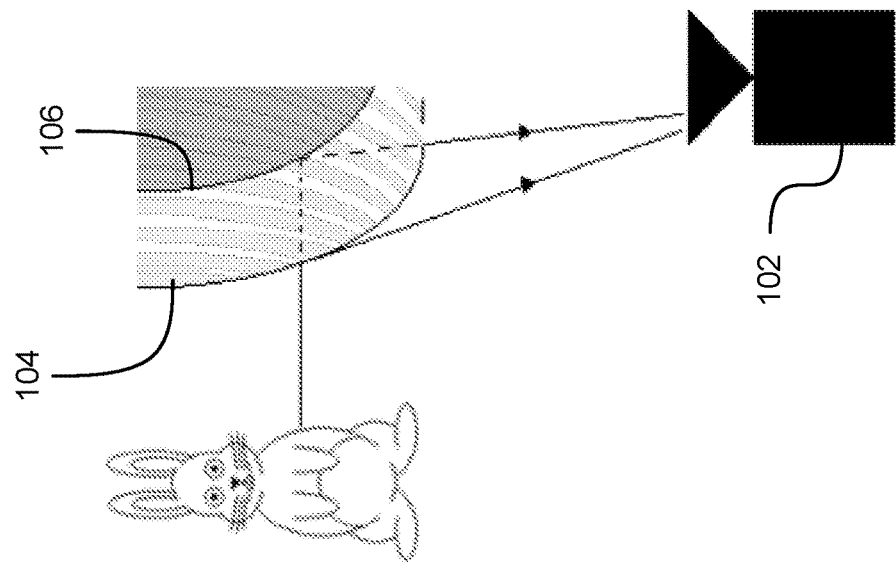
FIG. 27 shows an example of light being partially reflected and partially transmitted by an outer reflector, and the transmitted light being reflected by an inner reflector to a camera.
Figure 26:
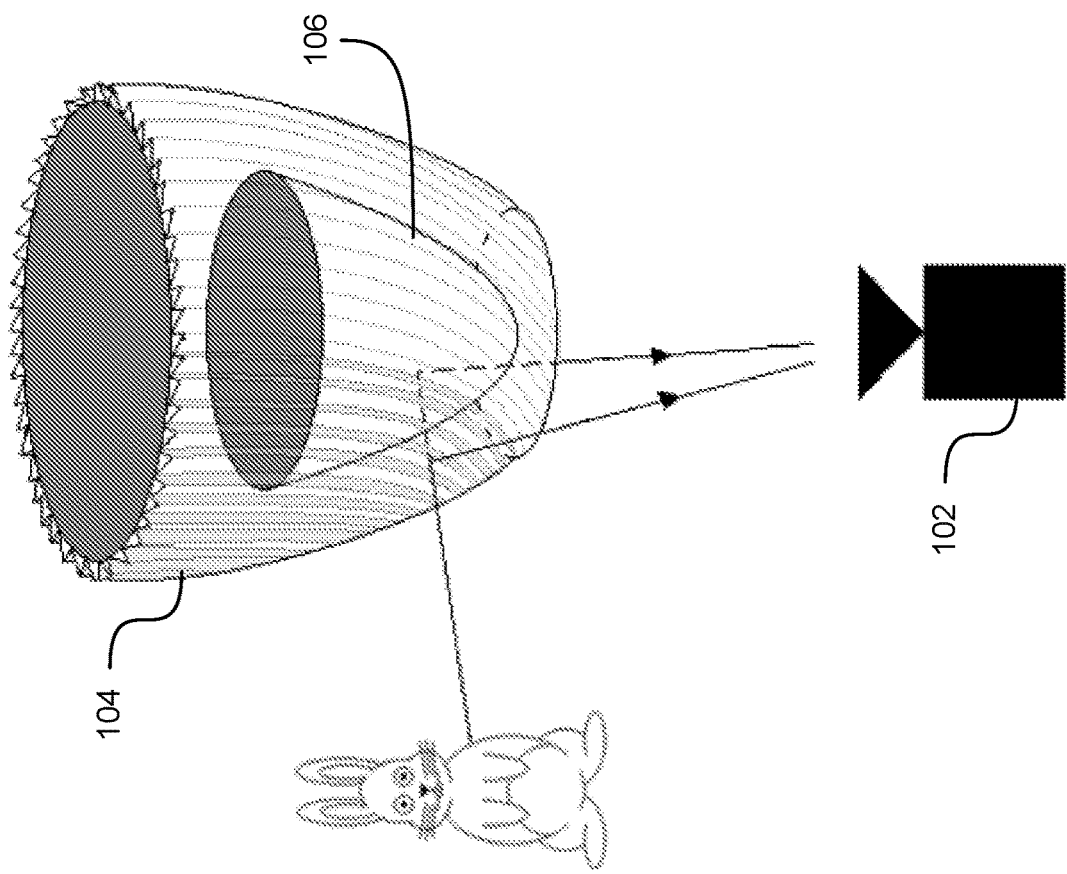
FIG. 26 shows an example of light being partially reflected and partially transmitted by an outer reflector, and the transmitted light being reflected by an inner reflector to a camera.

While the inner reflector 106 can be comprised of a fully-reflective material, the outer reflector 104 must be partially-reflective and partially-transmissive (PRPT), thereby allowing a portion of light to pass through the outer reflector 104, uninterrupted, and reflect off the inner reflector 106, as can be seen for example in FIGS. 26 and 27. In some implementations, an optimal material would split the light evenly, although various other allocations of transmission and reflection can be used. PRPT may be achieved through a mix of material selection and manufacturing processes. For instance, a silver or aluminium thin coat deposited by vacuum vapor deposition or sputtering onto a thin transparent substrate like persepex or acrylic) can be used. In some embodiments, a thin enough layer of metal can allow some light through and while reflecting some light. In some embodiments (e.g., using sputtered) the mirroring can be evenly speckled, like swiss cheese, with microscopic gaps where light goes through, and the mirror material between the gaps can reflect light. Alternatively, two transparent materials with different refractive indicies (e.g. two different plastic polymers) can be used to partially reflect and partially transmit light at the interface. The outer reflector 104 can provide uninterrupted and/or an equally refracted transmittance of light through the outer reflector 104, onto the inner reflector 106, and into the camera 102 (e.g., see the Simple Light Path section herein). The outer reflector 104 can provide an adjusted reflection of light off striations 116 (or other reflective elements) along the outer reflector 104 and into the camera 102 successfully (see the Complex Light Path section herein).

Housing

Figure 29:
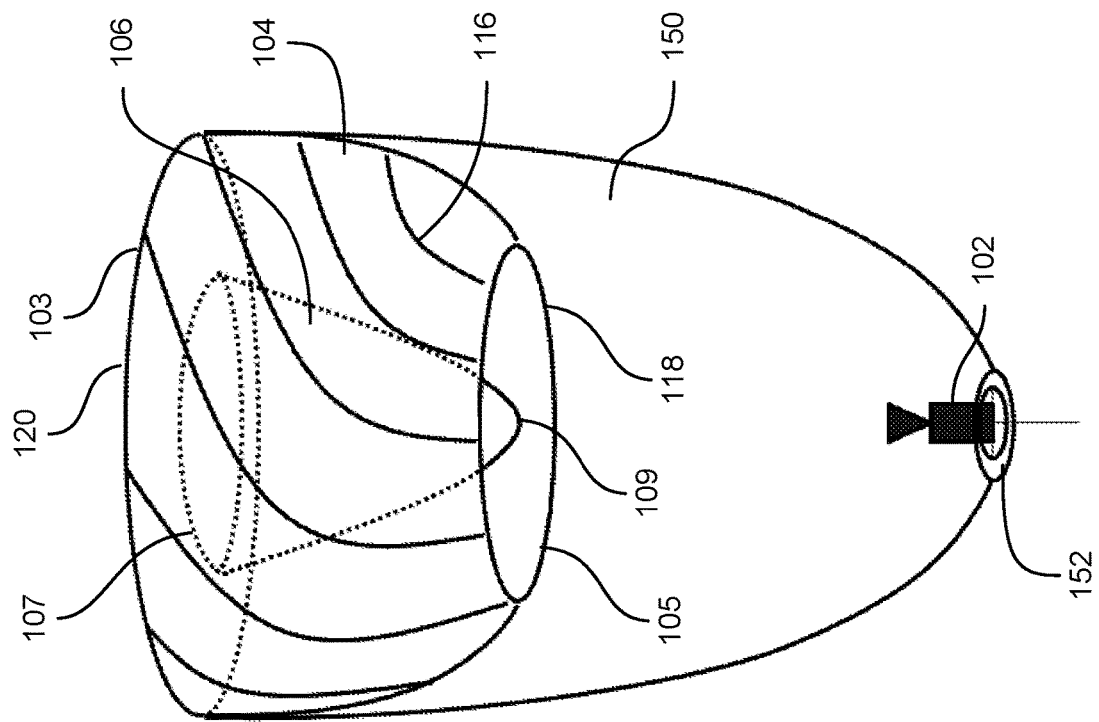
FIG. 29 shows an example embodiment of housing supporting an optical system.
Figure 28:
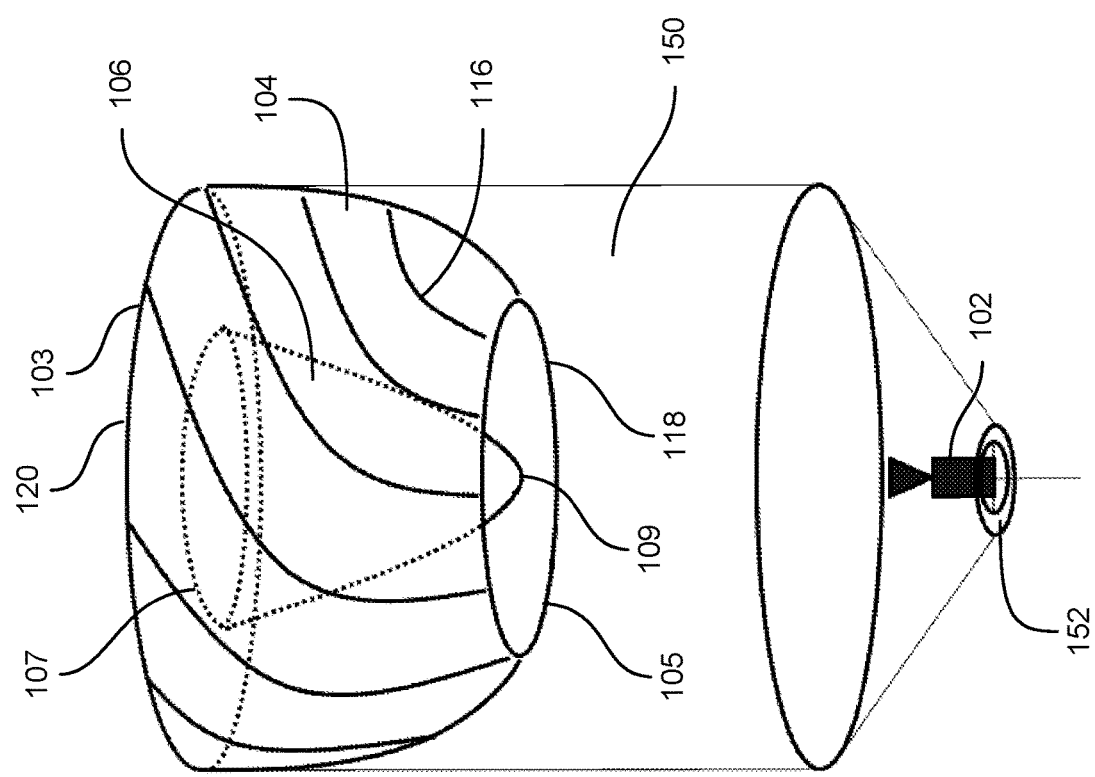
FIG. 28 shows an example embodiment of housing supporting an optical system.

With reference to FIGS. 28 and 29, the first reflector 104 and/or the second reflector 106 can be supported by an exterior housing 150 that can attach at the outer rim 120 (e.g., at the wide circular first end 103) of the first (e.g., outer) reflector 104 and can extend to the camera 102, to thereby couple the outer reflector 104 to the camera 102. The housing 150 can have transparent side walls that can be seamless in all directions in the yaw plane, and are therefore not visible to the camera 102. The housing 150 can include a top portion that extends inward from the outer rim 120 of the outer reflector 104. The top of the inner reflector 106 (e.g., the circular first end 107 or outer rim of the inner reflector 106) can be attached to the top portion of the housing 150 to support the inner reflector 106 in position (e.g., inside the outer reflector 104). The inner reflector 106 can extend downward from the top portion of the housing 150 into the interior cavity inside the outer reflector 104. In some embodiments, the lower end of the inner reflector 106 (e.g., having the apex) can extend downward beyond the opening in the bottom of the outer reflector 106.

In various embodiments, the inner reflector 106 can have a height that is the same as the height of the outer reflector 104. In some embodiments, the inner reflector 106 can have a height that is less than the height of the outer reflector 104. The height of the inner reflector 106 can be about 20%, about 30%, about 40%, about 50%, about 60%, about 70%, about 80%, about 90%, or about 100% of the height of the outer reflector 104, or any values therebetween, or within any range bounded by any combination of the above-identified values. In some embodiments, the housing 150 can include a support element that extends from the upper portion of the housing 150 down into the interior cavity of the outer reflector 104 to couple to the inner reflector 106 to support the inner reflector 106 in the appropriate position. In some embodiments, the second end 109 of the inner reflector 106 can be inside the interior cavity of the outer reflector 104 (e.g., positioned at the same height or above the inner rim 118, or at the same height or above the second end 105 of the outer reflector 104).

The housing 150 may be mounted to the camera 102 which is in turn mounted to an appropriate external support such as a stand or tripod or steady camera rig, or both may be attached directly to the external support. For example, the housing can include a mount 152 for mounting the housing 150 to the camera 102 and/or to an external support (not shown). The housing 150 can have side walls that extend straight down from the outer reflector 104 at an upper portion and taper in towards the mount 152 at a lower portion (e.g., see FIG. 28). Or the housing 150 can have side walls that curve inward from the outer reflector 104 to the mount 152 (e.g., having a generally parabolic shape) (see FIG. 29). The housing 150 may extend with a single continuous curved surface from the outer reflector 104 to the mount 152, for example to eliminate seams in its shape and to reduce or eliminate visual artifacts that the camera may record. Various other shapes can be used for the housing 150, and various other mechanical mechanisms and systems can be used to position the components of the optical system 100 relative to each other.

In embodiments having moving components (e.g., rotating versions of the device), the housing 150 and the first reflector 104 and/or the second reflector 10 may be mounted to a ring bearing to allow free rotation, while allowing the camera to remain stationary, and the camera either observes through the hole in the bearing, or suspended through it by an appropriate support arm.

The optical system 100 can be made in various different sizes, which can impact the offset distance for the stereoscopic effect. For example, the outer reflector 104 can have a diameter between about 50 mm and about 1000 mm, or between about 200 mm and about 500 mm. Various different sizes can be used for the system 100, such as by using some of the feature discussed herein that are designed to reduce the size of the system. In some embodiments, the optical system can have a size well outside the values discussed above, for example to produce a distorted stereoscopic effect by changing the offset distance.

Outer Reflector Substrate

The outer reflector 104 can be supported by a substrate 154, which can be a transparent material. For example, the substrate 154 can reside on the inner or outer surface of the outer reflector 104. However, since the transparent substrate 154 can have a higher refractive index then the medium of the surrounding environment (such as air), if the substrate is corrugated (or otherwise angled) on one surface (e.g., the surface contacting the reflective material of the outer reflector 104 having striations 116), the refractive index of the substrate material combined with the angular rotation introduced by the striations may induce unwanted rotational distortion into the light reaching the inner reflector 106. For example, the light that is transmitted through the outer reflector 104 and the substrate 154 can be refracted (e.g., when entering the substrate 154 and/or when exiting the substrate 154). If one side of the substrate 154 is angled relative to the other side of the substrate 154, the substrate 154 can refract the light to produce unwanted turning of the light before it reaches the inner reflector 106.

Figure 30:
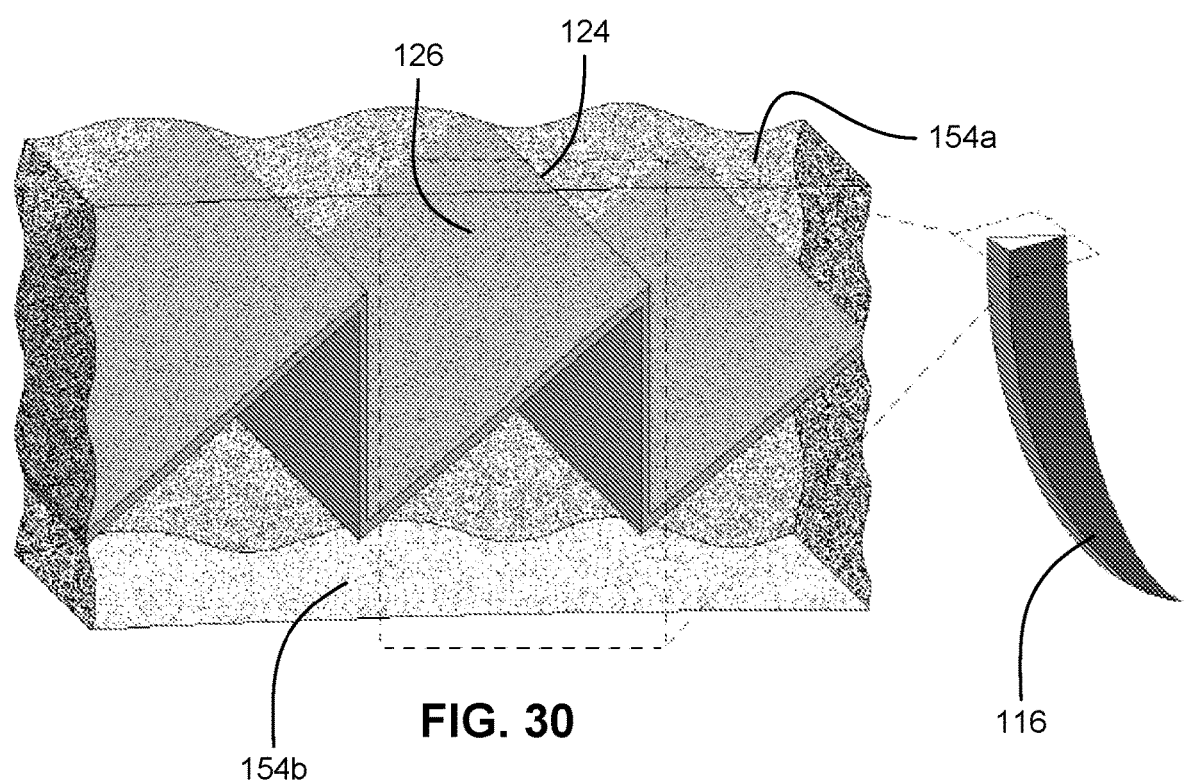
FIG. 30 shows an example embodiment of a substrate supporting an outer reflector.

With reference to FIG. 30, in some embodiments, unwanted refraction can be counteracted to some extent by positioning the substrate 154 material on both the inner surface and the outer surface of the outer reflector 104 rather than on only one side. FIG. 30 is a partial cross-sectional view showing a portion of the first reflector 104 (e.g., extending across about three striations 116). The first reflector 104 can include a thin material that is partially transparent and partially transmissive (as discussed herein), and can be corrugated, or otherwise angled to provide the striations 116, micro-structure, or other reflection elements, as disclosed herein. An outer substrate material 154a can be disposed on or over the outer surface of the first reflector 104. An inner substrate material 154b can be disposed on or over the inner surface of the first reflector 104. The outer reflector 104 can be embedded within the substrate 154.

The outer surface of the outer substrate material 154a can have a shape that corresponds to the shape of the inner surface of the inner substrate material 154b so as to impede turning of the light by refraction as the light passes through the substrate 154 and first reflector 104. For example, the outer surface of the outer substrate material 154a can be a smooth surface that tracks the major curvature of the outer reflector 104 (e.g., the generally paraboloidal shape), and the inner surface of inner substrate material 154b can be a smooth surface that also tracks the major curvature of the outer reflector 104 (e.g., the generally paraboloidal shape), only smaller that the outer surface of the outer substrate material 154a and nested inside thereof. Light that is refracted upon entering the outer surface of the outer substrate material 154a can be refracted back in the other direction (e.g., by the same degree) upon exiting the inner surface of the inner substrate material 154b.

The inner surface of the outer substrate material 154a can be corrugated (or otherwise angled) according to the shape of the outer reflector 104, and the outer surface of the inner substrate material 154b can be corrugated (or otherwise angled) according to the shape of the outer reflector 104. If light is refracted by the transition out of the inner surface of the outer substrate material 154a, the light can be refracted back in the other direction (e.g. by the same degree) upon entering the angled outer surface of the inner substrate material 154b. If the corrugations are properly aligned, and the substrate 154 is thin, the traversing light being refracted upon entering the outer reflector assembly will be refracted back by the same degree upon exiting the outer reflector assembly.

Some embodiments can involve layering smooth substrates on the inner and outer surfaces over top of the reflective material. With the reflective material residing on the appropriate striations of the outer surface of the inner substrate material 154a, a second transparent substrate 154b can be deposited on top to form an exterior smooth shell, which can result in a fused interface between the thin-film reflective deposit on the first layer and a smooth surface on the second layer. The inner substrate material 154a ca be made out of a transparent material (e.g., plastic, such as through a molding technique) with a smooth finish on that inner surface and the striated shaping on the outer surface. The reflective layer 154 can be applied on the outer surface of the inner substrate 154a (e.g., having the corrugated shape). It can be then coated (e.g., with a spin coat or in another mold, which can house the whole unit) with a second transparent (e.g., plastic) layer 154b that fills in the gaps between striations 116, and ends up with a smooth finish on the outer side. The two transparent (e.g., plastic) layers can be index matched (e.g., at least when they are set) so that the refraction of light propagating through the layers 154a and 154b cancel. By selecting two substrates for the first (reflective) and second (smooth) layer of the outer surface that consist of matching refractive indexes while remaining thin, relative to the overall diameter of the outer reflector assembly, then their refractions can cancel, resulting in traversing light being minimally refracted by the smooth outer surface without rotation.

Figure 31:
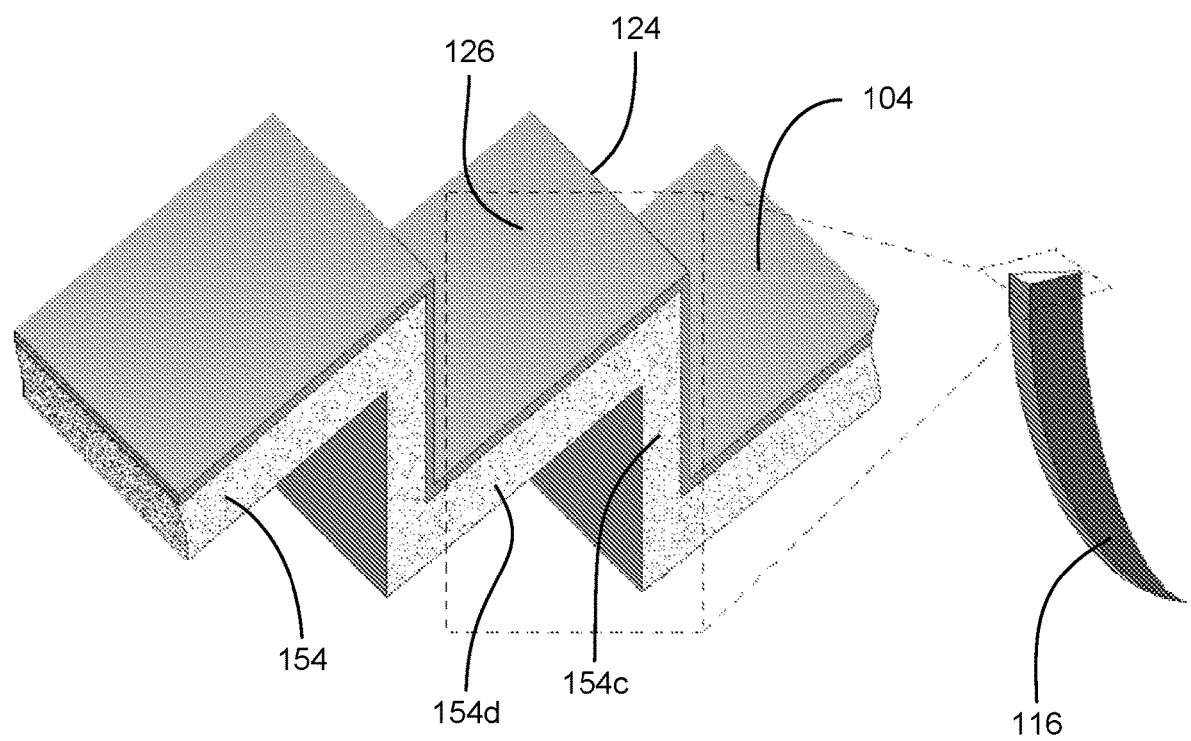
FIG. 31 shows another example embodiment of a substrate supporting an outer reflector.

With reference to FIG. 31, in some embodiments, the substrate 154 can track the shape of the outer reflector 104 (e.g., following the corrugations or striations 116) on both the outer surface of the substrate 154 and the inner surface of the substrate 154. Accordingly, light can be refracted when entering the outer surface of the substrate 154, and the light can be refracted back in the opposite direction (e.g., by the same degree) when exiting the inner surface of the substrate 154. The inner surface of the substrate 154 can be parallel to the outer surface of the substrate 154 along corresponding portions. The inner surface and/or the outer surface of the substrate 154 can be parallel to the outer reflector 104 at corresponding portions. For example, for a striation having a first side 124 and a second side 126, the substrate 154 can have a corresponding first portion 154c that extends in the same direction as the first side 124, and the substrate 154 can have a corresponding second portion 154d that extends in the same direction as the second side 126. FIG. 31 shows the substrate 154 that tracks the shape of the outer reflector 104 disposed on an inner side of the outer reflector 154. In some embodiments, the substrate 154 can be disposed on the outer side of the outer reflector 104 and can track the shape of the outer reflector 104 (e.g., similar to FIG. 31 only with the substrate 154 disposed on the opposite side of the outer reflector 104). In some embodiments, substrate material that tracks the shape of the outer reflector 104 can be disposed on both sides of the outer reflector 104.

Having an exterior surface positioned outside the outer reflector 104 can protect the outer reflector 104, such as from abrasion and dirt. The partial reflective surface for the outer reflector 104 may be achieved via other techniques, including the use of dichroic coatings, or also through a thin film optical resin sandwiched between an aforementioned pair of substrates. In some embodiments, a simpler construction for the outer reflector assembly can be achieved using a single ordinary metallic mirrored surface that may be on a simple plastic or metallic substrate. In some embodiments, any exposed metallic substrates may be protected from corrosion and oxidation by a thin plastic film.

Manufacturing

Manufacturing of the device structures disclosed herein may be achieved by a single selection or combination of the following techniques: injection molding, subtractive molding, extrusion, vacuum and thermoforming, thin film deposition processes, thermal/photo/chemical additive manufacturing techniques, milling, spin coating, indentation, electroplating, thermal, electric, or vacuum vapor deposition, sputtering, microscopic partial coating, stamping, etc.

Image Capture and Processing

Figure 32:
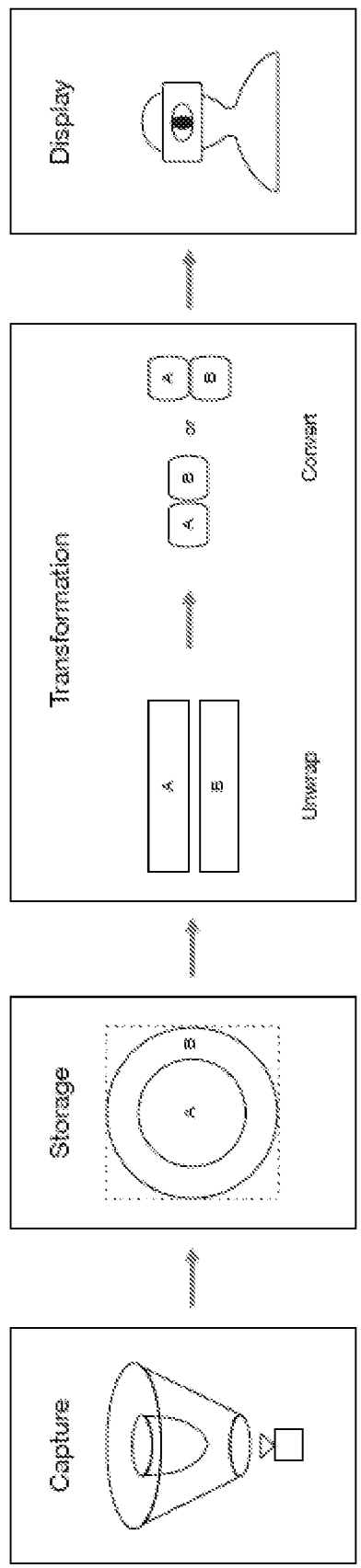
FIG. 32 shows a flow chart of a process for capturing, storing, transforming, and displaying a stereoscopic panoramic image.

With reference to FIG. 32, the capture of a real-world scene leveraging the defined structural design components can follow a process involving capture, storage, transformation, and display.

A. Capture

Figure 33:
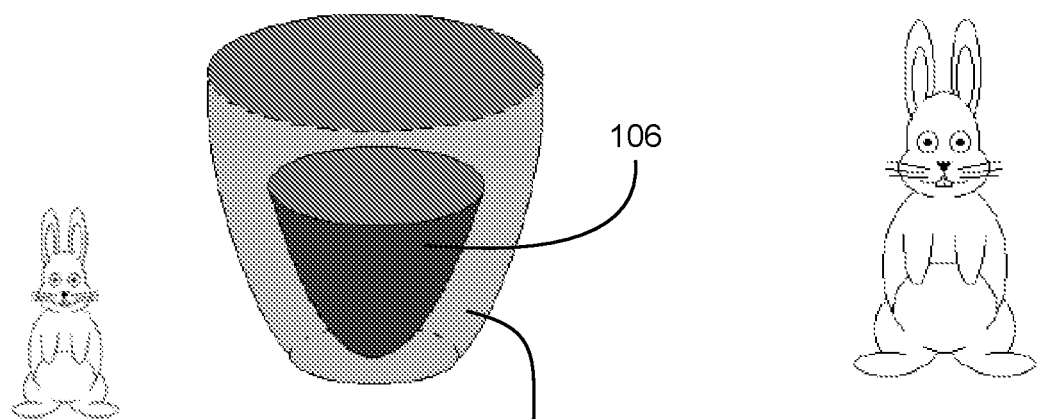
FIG. 33 shows an example embodiment of an optical system for stereoscopic panoramic imaging.
Figure 34:
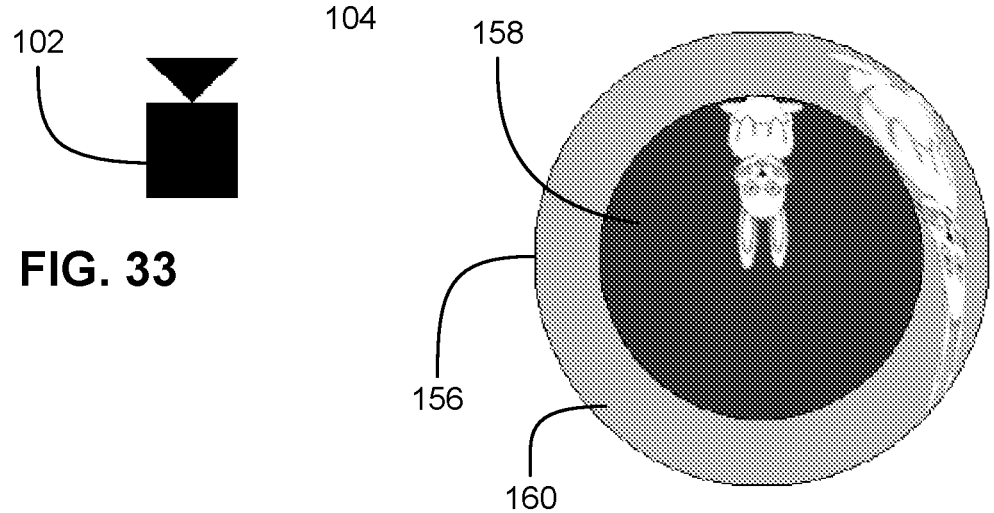
FIG. 34 shows an example embodiment of an image produced by the optical system of FIG. 33.
Figure 35:
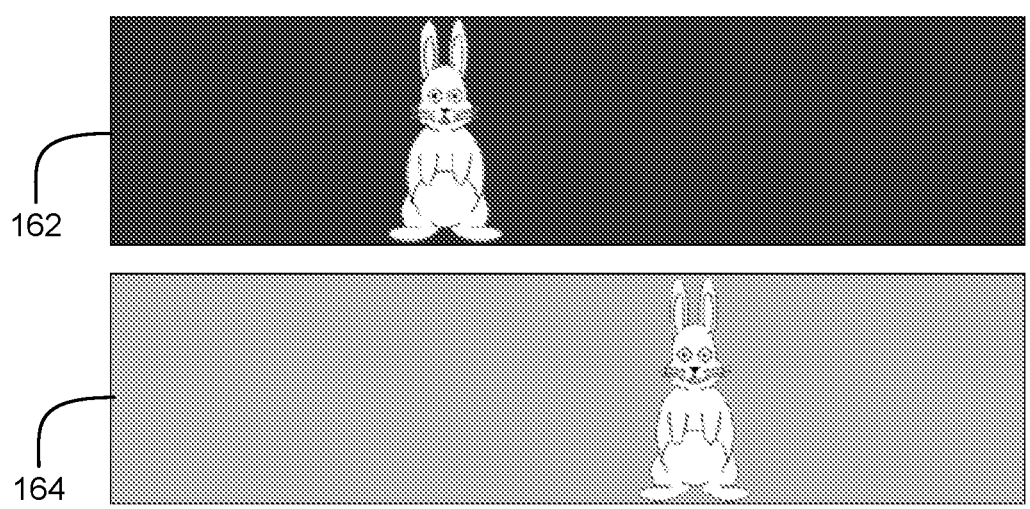
FIG. 35 shows an example embodiment of right-eye and left-eye images produced from the image of FIG. 34.

A real-world scene or environment can produce a field of light having streams of photons travelling in a multitude of directions. Portions of this light can be incident on the reflective surfaces of the device. Portions of the reflected light are reflected towards the camera, as discussed herein. The camera can have a lens apparatus for focuses this light onto an image sensor of the camera, which can be a flat surface with detectors that convert and amplify the photons into electrical signals, which can be measured. In a single image 156 the camera 102 can capture the reflection points from the inner and outer reflectors 104 and 106 of the system, which resembles a circle within a ring, fitting together into the camera's image frame. The circle portion 158 of the image 156 can be a panorama equivalent to one stereo perspective, and the ring portion 160 of the image 156 can be a panorama equivalent to the other stereo perspective, as can be seen in FIGS. 33 and 34. The circle portion 158 of the image 156 can be transformed to provide the image 162 of FIG. 35 to be used as the right-eye image or left-eye image in stereoscopic viewing. The ring portion 160 of the image 156 can be transformed to provide the image 164 of FIG. 35 to be used as the other of the right-eye image or left-eye image in stereoscopic viewing.

B. Storage

The image that the camera sensor captures through its measurements can be encoded, stored onto the camera or other device, and/or converted directly into a data stream. Taking advantage of spatial and temporal redundancy, the single image and/or contiguous sequence of images can be compressed by an encoder to reduce overall file size. The data can be parsed into a file that may be multiplexed with other information such as metadata, camera settings, audio recordings, motion sensor readings and more. The resulting data file may be stored and/or transmitted over any suitable data delivery vehicle, to be used in real time or at a later date.

C. Transformation

A suitable decoder can extract the compressed or uncompressed image data from the file and can decode it to reform the single image or contiguous sequence of images, containing a facsimile of the real-world scene captured from the device. A suitable hardware or software renderer program (or even a suitable set of optical apparatus) can transform the two sub-views representing the reflection from the inner and outer reflectors 104 and 106 and can apply a 2-dimensional vector field warping transformation (for example). The renderer can appropriately crop, differentially stretch, squash, and/or cut-out portions of the two images such that the uneven angular distribution introduced by the reflector's major curvatures can be cancelled. An additional image warping transformation can be applied to each sub-image (e.g., one for each eye), to provide the appropriate angular distribution for a viewer via a given display device, as can be seen for example in FIG. 35.

D. Rendering/Display

Active rendering can be used. With the transformed single image or contiguous sequence of images, a rendering device/display can manipulate and adjust the stereoscopic view-plane at the discretion of the user. The warp and crop can be actively adjusted to appropriately display the corresponding viewpoints for the user's expected view direction. This adjustment can be based on motion control information about the user's head and eye movements supplied to the rendering device/display using a variety of sensor technologies, such as physical hand controller, panoramic heads-up-display apparatus with head & eye motion tracking, and/or motion tracking sensors.

The renderer may also apply a dynamic crop and/or appropriate warping to account for rapid, fine, or off-horizon motions in the recorded image, thereby helping to counteract vibrations or unintended motion introduced during capture. Dynamic cropping and/or warping can be achieved through the capture and analysis of motion variables by sensors, enriching the associated data stream either in real-time or through later examination.

Passive rendering can be used. The recorded images may follow the same capture, store, and transform procedures, as discussed herein, to then be decoded and appropriately warped and/or transformed into another image form (e.g., from the circle in ring format of FIG. 34 to the rectangular images of FIG. 35), re-encoded to account for unintended motion, and/or translated into a more convenient file type to be processed by a rendering device/display at a later point in time. This workflow can occur as a pre-process such that these steps are not necessary at the point of decoding by the final decoder and renderer used by the viewer.

In some setups the decoder and renderer can be combined, allowing only that portion of the image space which is to be viewed to be decoded at any given time before being sent to the renderer to apply appropriate transformations, thus the decoder does not have to decode and submit the entire image space for every frame, which reduces its workload. The images can be sent to the displays, emitting light which is focused and captured by the viewer's eyes. By supplying stereoscopic pairs of images to the user's two eyes, their brain is able to reconstruct a 3D perception of the original recorded environment in the same way as they would in the real scene.

EXAMPLE STRUCTURES

This section describes certain example embodiments and assembly options for systems for 360-degree stereoscopic scene capture (e.g., through a single viewpoint). In various embodiments, a portion of the reflectors can be used in order to provide less than 360 degrees of viewing range in the horizontal direction. For example, using half the reflectors (e.g., cut down the longitudinal axis) the imaging can be performed across 180 degrees (not 360 degrees)

A. Example 1

Figure 37:
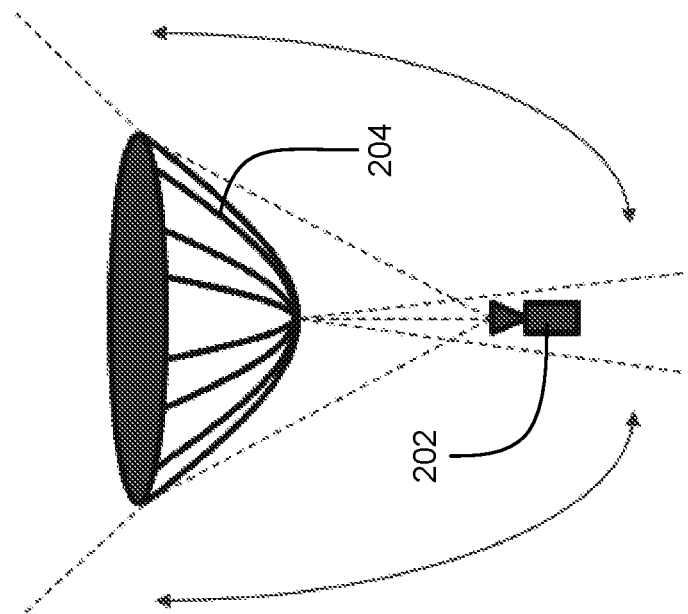
FIG. 37 shows an example embodiment of an optical system for stereoscopic panoramic imaging using the reflector of FIG. 36.
Figure 36:
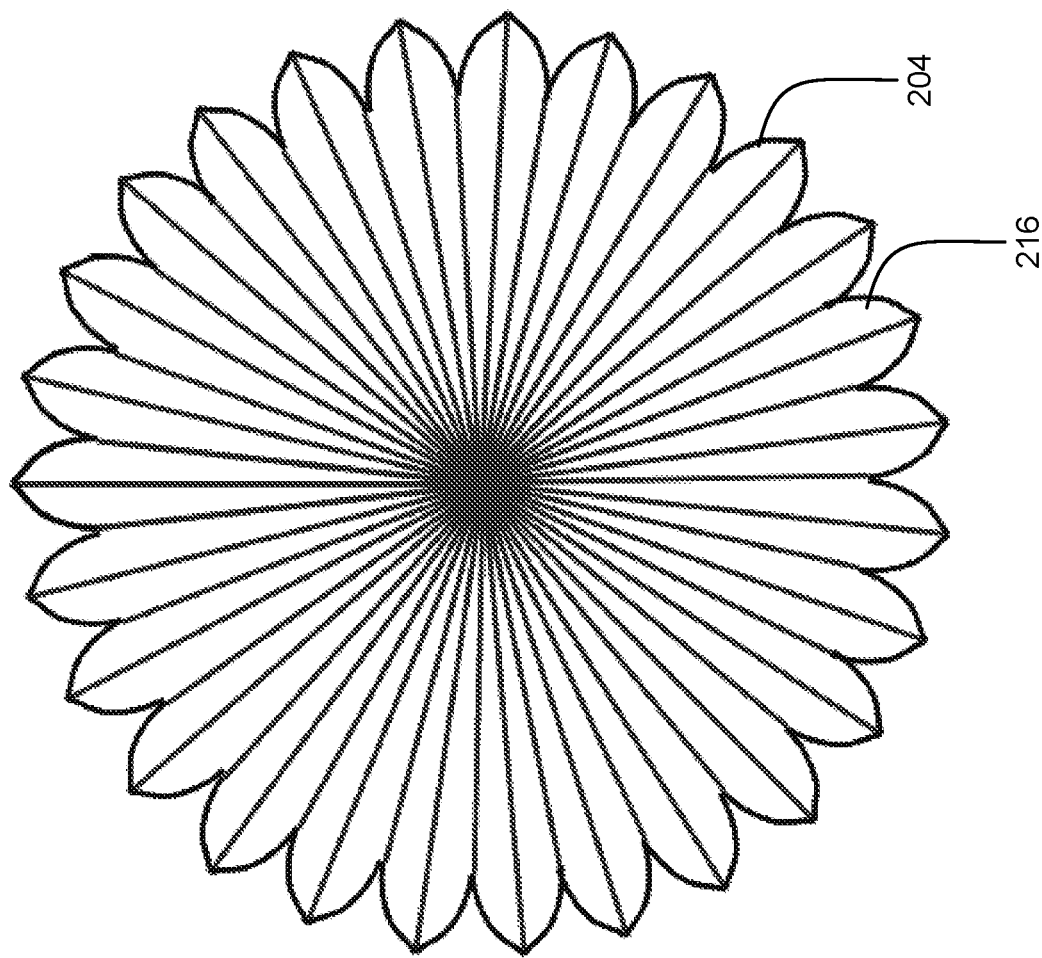
FIG. 36 shows an example embodiment of a reflector for an optical system for stereoscopic panoramic imaging.
Figure 39:
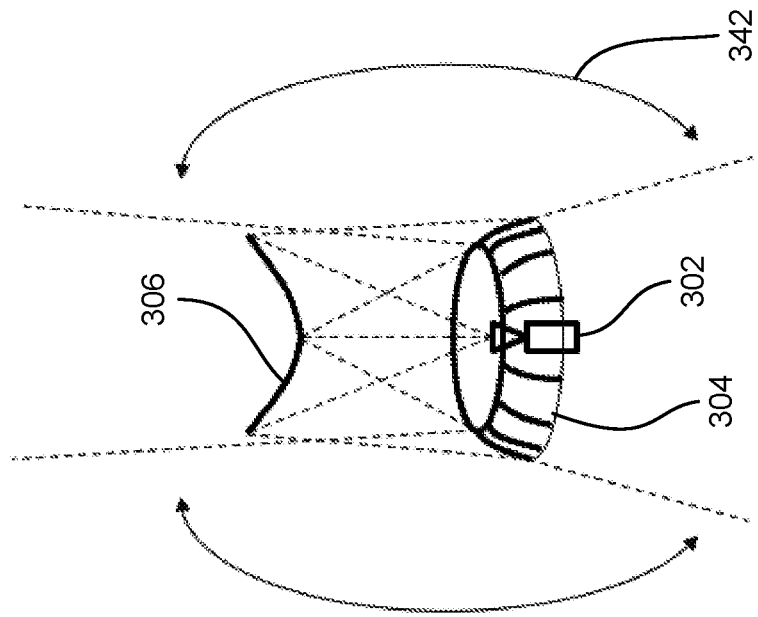
FIG. 39 shows an example embodiment of an optical system for stereoscopic panoramic imaging using the reflector of FIG. 38.
Figure 38:
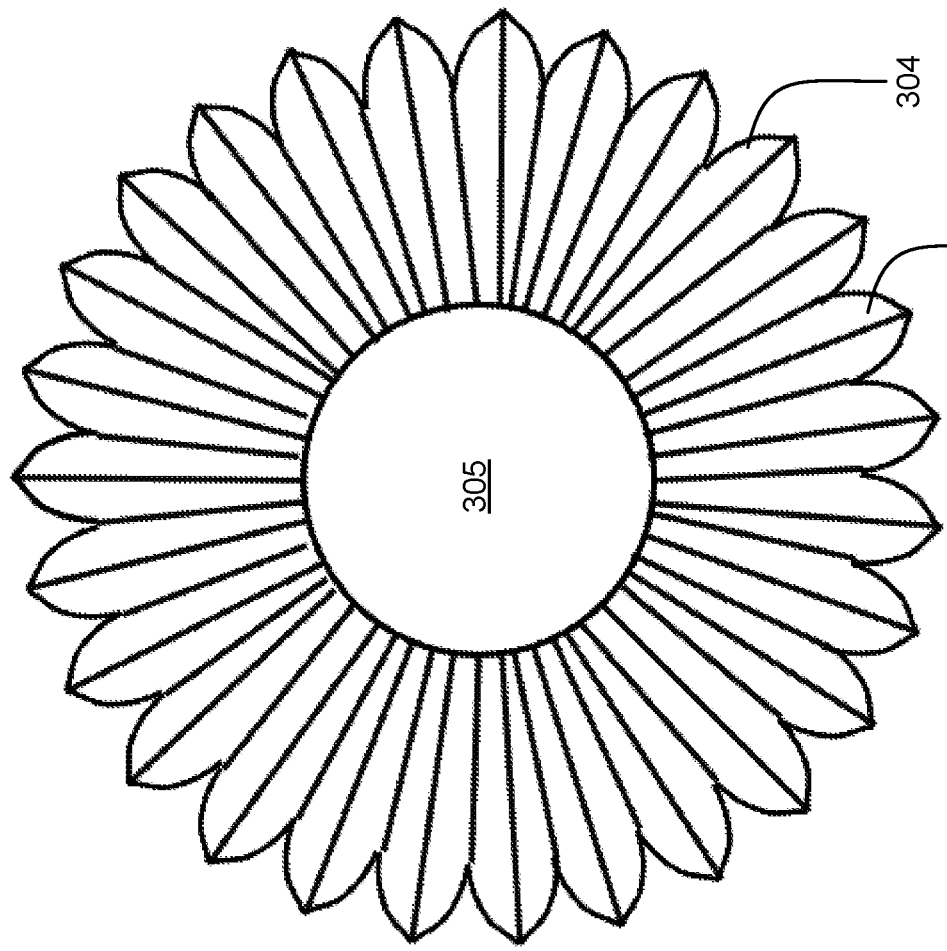
FIG. 38 shows another example embodiment of a reflector for an optical system for stereoscopic panoramic imaging.

FIGS. 36 and 37 show an example construction having matching "slant" and "hidden" face striations covering a single corrugated paraboloid-like (or dome-shaped) reflector 204, forming a symmetrical reflector 204. FIG. 36 shows the reflector 204 from the view of the camera 202. Each alternate face of the striations 216 can rotate the reflected viewlines either clockwise or counter clockwise respectively, as viewed from the central axis. With each odd or even face on the surface composited together, the odd faces would effectively form a first panoramic viewpoint rotated about the tangent in one direction, and the even faces would effectively form a second panoramic viewpoint rotated about the tangent in the other direction. The corresponding viewlines of each viewpoint therefore become separated in space in much the same way as in other embodiments discussed herein, but with both interleaved on one major surface, and with a common centerline point of rotation about the center of the device. Since the stereo separation is not relying upon an inner-outer reflector relationship but instead from two reflection points on a single reflector 204, as long as there is sufficient angular rotation of each striation creating polar opposite sides, a similar level of separation may now be achieved through a smaller device as compared to systems that use inner and outer reflectors.

Furthermore, with only one reflector 204 to capture from, the reflective surface can be made entirely reflective (e.g., similar to the inner reflector 106 discussed herein) instead of partially reflective, while still covering exactly correspondent reflected angular ranges and densities for both the left and right eye viewpoints. However, by interleaving both sets of images into one surface, new challenges can be introduced in separating the two images from each other. One approach is for software to digitally cut the alternating slices from each other, either discretely, or with a frequency analysis. However, by increasing the density of striations in order to maximize resolution, there is a chance for each of the alternating surfaces to become adjoined in the camera's vision, making them difficult or impossible to digitally separate. This may be solved by applying alternating absorptive and reflective polarizing layers and pairing them with corresponding polarizing camera filters at the point of scene-capture. The corresponding filters would then allow both rotated and non-rotated image reflections to be viewed separately, allowing for further deconstruction and storage. In such a case where relatively large striations are used and the alternate image strips from each surface must be interleaved, adding additional convex curvature to each surface slightly broadens the imaged yaw range, creating an overlap aiding in the stitching process and improving consistency.

B. Example 2

A variation of the embodiment of Example 1 of the device can incorporate a hole 305 in the center of the reflector 304 (e.g., Which can be a Fresnel reflector), through which a primary curved reflector 306 can be seen by the camera 302. The reflector 304 can reflect the world view onto the primary reflector 306 which then can reflect the view through the hole 308 and into the camera 302. This has the advantage of extending the viewable pitch range 342 of the device, and/or reducing the necessary density of striation microstructures 316 at its inner radius, as the smaller features no longer converge at a point at the axis. Furthermore in this configuration corresponding viewlines can be constructed with a consistent stereoseparation across the Fresnel reflector, that are then compressed into the camera's view range by the primary reflector without a physical restriction as can be the case using the single reflector 204 on its own.

C. Example 3

As described above in the use of reflective surfaces (e.g., Fresnel reflective surface), by incorporating appropriate spiral curvature and slant face angles adjusted along the striation's length, reflected viewlines can not only be rotated arbitrarily in the yaw plane but when replicated in the full circular array can also provide arbitrary rotation in the corresponding viewlines for the pitch plane, and thus also allows partially arbitrary placement in space (which allows correction of the subject distance as above). The ability to produce arbitrary reflection curvature in the pitch plane, which is itself equivalent to allowing arbitrary positioning along a viewline, means that the curvature of the underlying structure can be compensated for and thus be made somewhat arbitrary itself. In this fashion, instead of having a convex underlying structure with a paraboloid-like shape when extended 360 degrees into its 3d form, it can instead have a planar shape, forming a cone (or frustum cone) when extended 360 degrees into its 3D form. A planar surface may allow simpler and less expensive manufacture as flat sheets that are then bent into the appropriate conic shape without a convex distortion, and may improve release of inserts from molds in injection molding processes for manufacturing.

FIG. 40 shows an example embodiment where the inner reflector 406 has a generally paraboloidal or dome shape and can reflect light from the environment to the camera 402 (e.g., as discussed in connection with FIG. 19). The outer reflector 404 can have a generally paraboloidal or dome shape and can reflect light from the environment to the camera 402 (e.g., as discussed in connection with FIGS. 23 and 24).

FIG. 41 shows an example embodiment where the inner reflector 506 has a generally paraboloidal or dome shape and can reflect light from the environment to the camera 502 (e.g., as discussed in connection with FIG. 19). The outer reflector 504 can have a frustoconical major shape, and the side walls can extend generally straight from the top of the outer reflector 504 to the bottom of the outer reflector 504. The angling of the striations 516 (or similar reflection elements) can be adjusted relative to the embodiment of FIG. 40 to account for the frustoconical (as opposed to generally paraboloidal) shape of the outer reflector 504.

D. Example 4

Another version of the device may incorporate the striation (e.g., Fresnel striations) or other reflection elements the inner reflector instead of on the outer reflector, or on both the inner and outer reflectors. Including the striations or other minor reflection elements on both the inner reflector 606 and the outer reflector 604 can provide rotation of the corresponding viewlines of the inner reflector 606 as well as rotation of the corresponding viewlines of the outer reflector 604. By rotating the corresponding viewline of the inner reflector 606 around the surface in the opposite direction to the rotation of the viewline on the outer reflector 604, the two viewlines can be closer to being evenly positioned around the central axis (as compared to a system in which only one reflector has striations), which can partially correct for an axial offset in the perceived position of the end user as they rotate their viewing direction. This also has the effect of reducing the minimum size of the device, for example because the separation distance can now stretch between a chord on far sides of the inner and outer reflectors instead of between the radial line of the inner reflector the surface on the outer reflector far away from it.

FIG. 42 shows an example embodiment in which the inner reflector 606 includes striations 617 or other minor reflection elements which can operate similar to those discussed here for other embodiments. The outer reflector 604 can include striations 616 similar to those discussed in connection with other embodiments. The striations 617 can turn light in a first direction in the horizontal plane to the camera 602, and the striations 616 can turn light in a second, opposite direction in the horizontal plane to the camera 602. In FIG. 42, the inner reflector 606 has a generally paraboloidal shape and the outer reflector 604 has a frustoconical shape. In some embodiments, the inner reflector 606 and the outer reflector 604 can have generally paraboloidal shapes for their major shapes (e.g., as discussed in connection with FIGS. 1 and 10). In FIG. 43, the inner reflector 706 has a major shape that is conical and the outer reflector 704 has a major shape that is frustoconical. The striations 717 can turn light in a first direction in the horizontal plane to the camera 702, and the striations 716 can turn light in a second, opposite direction in the horizontal plane to the camera 702.

E. Example 5

Figure 46:
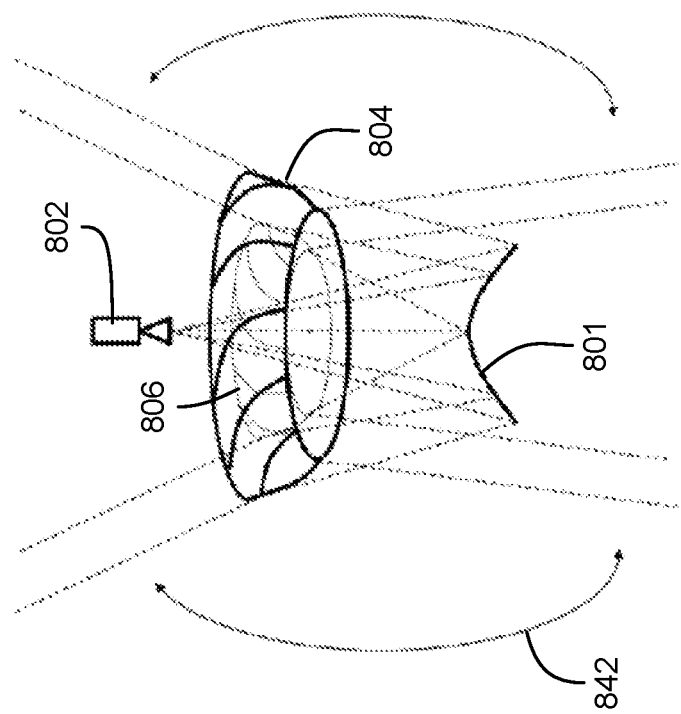
FIG. 46 shows the optical system of FIG. 45 with select light rays showing light reflected to the camera.
Figure 45:
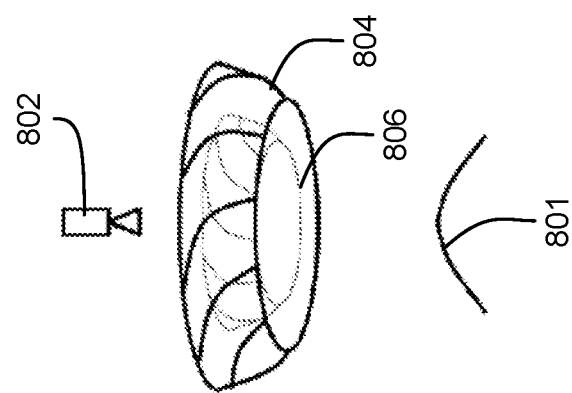
FIG. 45 shows a non-exploded view of the optical system of FIG. 44.
Figure 44:
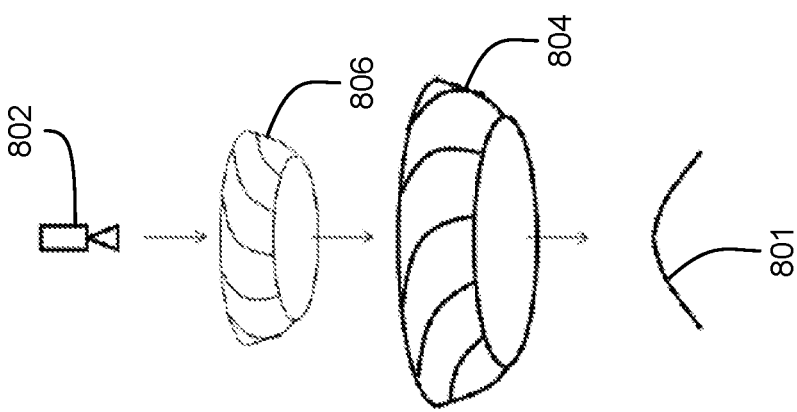
FIG. 44 shows an exploded view of an example embodiment of an optical system for stereoscopic panoramic imaging having a primary reflector, an outer reflector, and an inner reflector.
Figure 48:
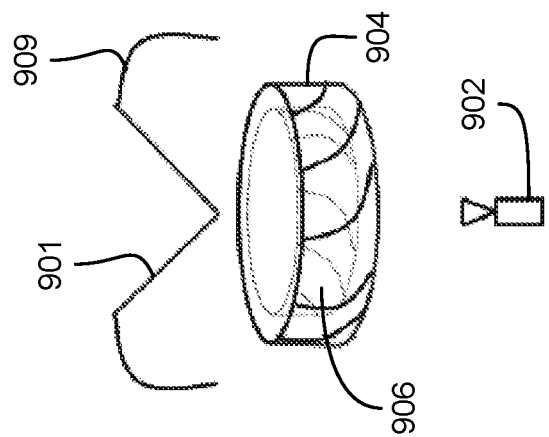
FIG. 48 shows a non-exploded view of the optical system of FIG. 47.
Figure 47:
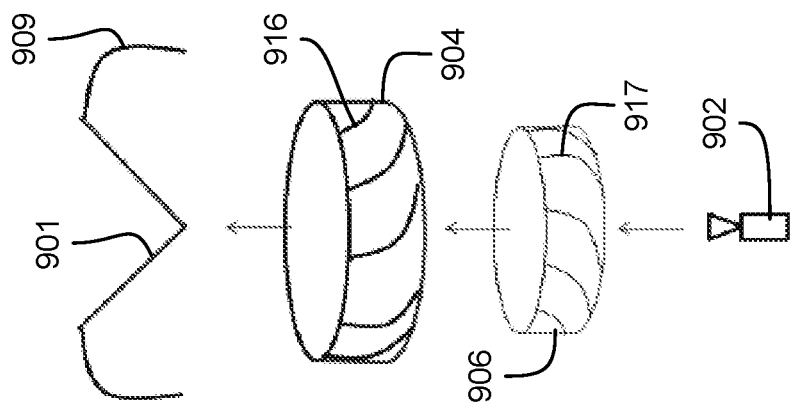
FIG. 47 shows an exploded view of an example embodiment of an optical system for stereoscopic panoramic imaging having a primary reflector, a secondary reflector, an outer reflector, and an inner reflector.
Figure 50:
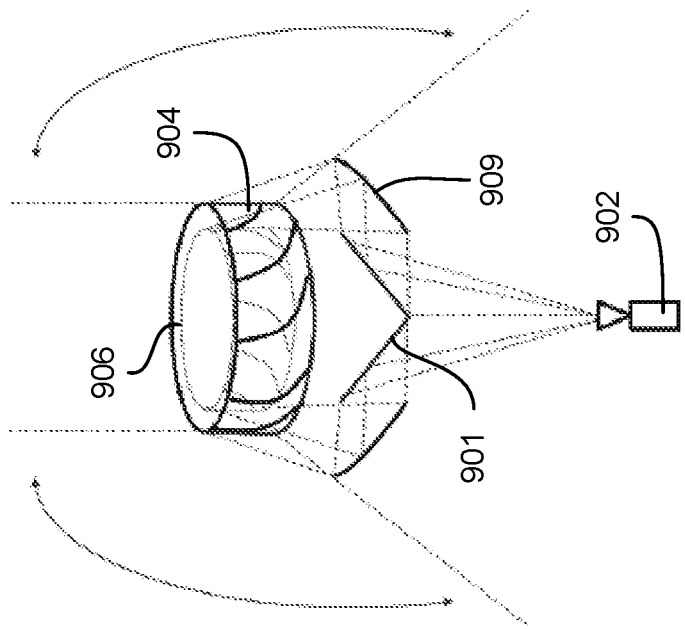
FIG. 50 shows another example embodiment of an optical system for stereoscopic panoramic imaging having a primary reflector, a secondary reflector, an outer reflector, and an inner reflector.
Figure 49:
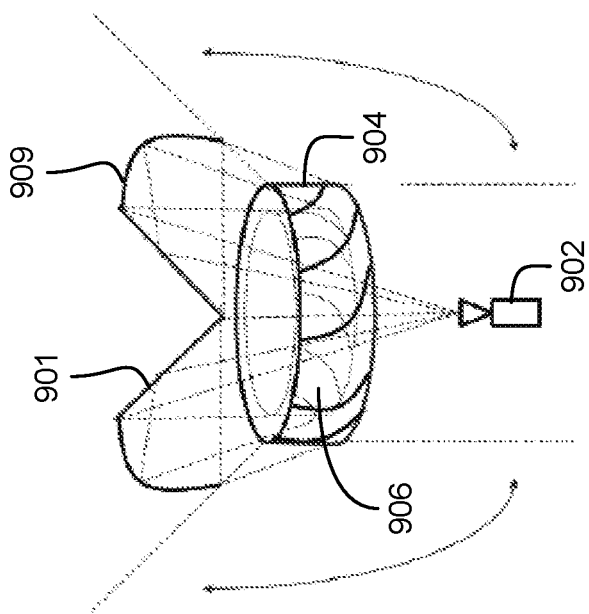
FIG. 49 shows the optical system of FIG. 48 with select light rays showing light reflected to the camera.

With reference to FIG. 44-46, another example embodiment of the device may incorporate an additional primary curved reflector 701, which in some implementations can take up the entire field of view of the camera 702, peering through a hole in a sawn-off conic arrangement of the inner reflector 806 and outer reflector 804 (e.g., one or both with Fresnel striations), and which then reflects the camera's view onto the two reflectors 804 and 806. This has the advantage of potentially extending the range 842 of available pitch angles, and can reduce the size of the device as the inner and outer reflectors 806 and 804 may sit with a minimal clearance through which the camera 802 can observe as a result of the additional primary reflector 801, which, in some embodiments, can also has the effect of further reducing the axial offset observed as a user rotates their viewing direction. It can also have the effect of ensuring a more even distribution of striations per solid angle of the camera, so variation in the manufacturing process of the striations and their density produce less imaging artifacts, particularly for the inner reflector near the axis center. The inner reflector 806 and the outer reflector 804 can be similar to those of the various different embodiments disclosed herein (except that the inner reflector 806 can have a hole in the center to accommodate the camera 802 viewing the primary reflector 801 through the hole.

F. Example 6

With reference to FIGS. 47-50, another embodiment of the device can have a primary reflector 901, which then reflects onto a secondary curved reflector 909, which then reflects either up or down onto either sawn-off conic arrangements of the inner and outer reflectors as above, or alternatively onto cylindrical inner and outer reflectors 906 and 904, one or both of which can have striations 917 and 916 other minor reflection features).

G. Example 7

Figure 51:
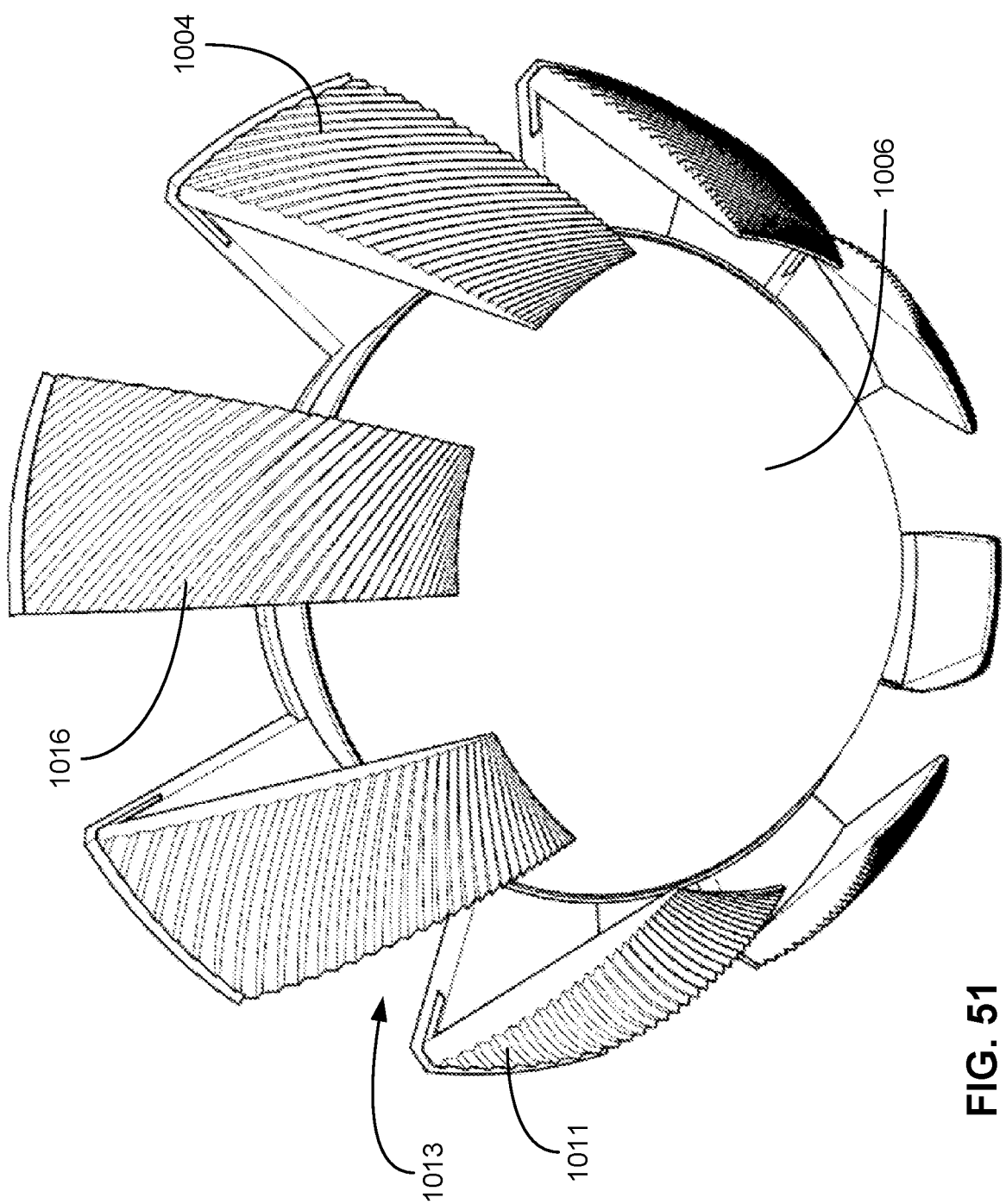
FIG. 51 shows an example embodiment of an inner reflector and an outer reflector having panels separated by gaps.

FIG. 51 shows an example embodiment having an outer reflector 1004 and an inner reflector 1006. The inner reflector 1006 can be the same as or similar to the inner reflector 106 disclosed herein. The outer reflector 1004 can be similar to the outer reflector 1004 disclosed herein, except as discussed below. The outer reflector 1004 can include rotating, non-contiguous, and/or fully reflective panels 1011. The rather than constructing the outer reflector 1004 as one contiguous surface with partially reflective, partially transmissive (PRPT) properties as discussed in connection with the reflector 104, the outer reflector 1004 can be fully reflective (e.g., similar to the inner reflector 106 discussed herein). For example the outer reflector 1004 can be coated with a fully reflective material. The outer reflector 1004 and inner reflector 1006 can be configured to provide for the required light paths to a camera (not shown in FIG. 51) to achieve corresponding stereo viewlines (e.g., parallel offset viewlines) similar to other embodiments disclosed herein.

Because the outer reflector 1004 is covered with a fully reflective coating (or otherwise made to be fully reflective instead of partially reflective), the outer reflector 1004 can block light that would pass through and reach the inner reflector in the embodiments having the PRPT outer reflector 104. The opaque outer reflector 1004 can include a plurality of panels 1011 that are spaced apart from each other forming a plurality of gaps 1013 between the panels 1011. Light from the environment being imaged can pass through the gaps 1013 between the panels 1011 to reach the inner reflector 1006, which can reflect the light to the camera as discussed in connection with other embodiments. Light arriving from the external environment will alternately either hit the outer reflector panels 1011 and reflect into the camera (e.g., similar to the Complex Light Path discussed herein) or pass through the gaps 1013 between the panels 1011 and reflect off the inner reflector 1006 and into the camera (e.g., similar to the Simple Light Path discussed herein).

The outer reflector 1004 can be rotated about the central axis, which can allow for the accumulated average over time between each panel to be captured by the camera. Controlling the angular ratio of the panel sizes to the gap sizes can proportionally control the amount of light being reflected off the outer reflector 1004 versus reaching the inner reflector 1006, thus an even 50:50 ratio of panel size to gap size can allow for an evenly distributed amount of light to reach the inner reflector 1006 and outer reflector 1004. In some embodiments, during rotation, the corresponding stereo viewlines (e.g., offset parallel viewlines) from the inner and outer reflectors 1006 and 1004 can be resolved. The exposure length of the camera and/or the speed of rotation for the outer reflector 1004 can selected such that the exposure length of time for the camera is equal to or greater than the time required for an entire panel 1011 and one entire gap 1013 to pass a given point. For example, for an exposure rate of 24 frames per second, the outer reflector shown in FIG. 51 having 8 panels 1011 and eight gaps 1013 can rotate at a speed of three revolutions per second. Accordingly during the 1/24 of a second for the exposure of the image, the outer reflector can complete 1/8 of a revolution, so that any give light path would intersect one full panel 1011 and one full gap 1013 during the exposure time. By having a large number of thin panels 1011 or by rotating the array of panels 1011 quickly the system can be compatible with quick exposures such as for moving video recording by the camera. Following this method, the camera can capture a similar image using the outer reflector 1004 of FIG. 51 as it would using a contiguous PRPT outer reflector 104. Spinning the outer reflector 1004 also can have the aforementioned effect of temporally smoothing "stair-stepping" distortions in the image of the outer reflector 1004 caused by the striations 1016.

Various different numbers of panels 1011 and gaps 1013 can be used, such as 1 panel and gap, 2 panels and gaps, 4 panels and gaps, 8 panels and gaps (as shown in FIG. 51), 12 panels and gaps, 16 panels and gaps, 24 panels and gaps, 32 panels and gaps, 64 panels and gaps, 128 panels and gaps, or any values therebetween or any ranges bounded by the above-identified values.

The system can include a motor (not shown) which can drive rotation of the outer reflector 1004. In some embodiments, the outer reflector 1004 can rotate relative to the inner reflector 1006, which can remain stationary. In some embodiments, the inner reflector 1006 and rotate with the outer reflector 1004, and the inner reflector 1006 can be rotationally symmetrical so that rotation of the inner reflector 1006 does not significantly affect the image.

In some instances, unwanted reflections between the inner reflector 1006 and the outer reflector 1004 can be introduced, which can potentially distort the image captured by the camera. In some embodiments, the inner surface of the outer reflector 1004 (e.g., the inward facing sides of the panels 1011) can have a dark (e.g., black) coating to absorb stray light reflecting into and off of the inner reflector. An additional benefit of this feature is that sources of multiple reflections between the hidden and slant faces of the striations onto the inner reflector can be eliminated.

Still Imaging

With a single-camera setup, a single still image may be captured using the systems disclosed herein that provides a freeze-frame image of an environment that may be re-examined as a still life, in stereoscopic 3D and global panorama using an appropriate display (virtual reality head-mounted displays, planetarium type projected imagery, etc.).

Image Sequences

With a short video sequence covering several successive frames captured using a video imaging device or a camera operated in burst capture mode, a loop of these images can display a true-to-life depiction with subtle temporal nuance with the same display setups as mentioned above.

Full Video Recording and Broadcast

With a video recording device, events may be captured from a given perspective and then reimaged as sequences into a continuous piece of footage. A live feed may also be broadcast in one location and viewed in another remote location in real time (e.g., transmitted over any suitable information channel). In still imaging, short image sequences, or full video imaging, multiple points of capture can allow viewers to switch between viewpoints while maintaining the ability to look in any direction, and multiple users can access the same viewpoints simultaneously and yet each independently look in any desired within the panoramic range.

Video Pathway Capture

A video recording from a capture point in motion through a scene may allow a viewer to move arbitrarily along the path of motion by fast-forwarding or rewinding the video to the point corresponding to their position of motion. This can be matched with data taken from motion tracking devices on the capture rig, or deduced from the imagery itself, and combined with corresponding motion detection at the point of viewing to allow the viewer to experience true-to-life positions along the path.

Telepresence and Telemetry

Operated with a live feed the device may be used to relay a live situation to a remote location. This data may be coupled with measurements taken from additional sensors that provide further useful information for viewing and analysis from a remote location. Furthermore, if the device is coupled to suitable actuation, information fed back from controllers at a remote location could alter the view in real time by moving the device and/or operate associated equipment. This can be used on remote telepresence robots including drones, and to provide remote views for local or remote drive-by-wire vehicles.

Auto Stabilization

In some embodiments, the wide angular range available in all yaw directions, coupled with the stereoscopic measurement means that absolute rotation and acceleration can be determined from the image data alone in virtually all environments. Comparing the pixel values in the sequence of images in a video recorded with the invention can allow one to match the same aggregate pixel features in the image in one frame with those of another recorded at a later time, and calculate their displacement across the image plane in that region which in turn correlates to the movement of the camera. As the device rotates in space the recorded images will therefore show a consistent displacement which can be used to calculate that rotation. Similarly a translational movement of the device in space while recording will result in displacement in the image plane in those parts of the image that are perpendicular to the direction of motion, and an enlargement of features in the direction the device moves in, and a shrinkage of features in the direction the device moves away from, which, taken together, can allow one to calculate the motion and rotation of the device as it recorded over time without additional sensors. The calculated rotational data may then also be used in real time or as a post process to counter rotate the displayed image space to compensate for the recorded rotation of the device in physical space to create a stable viewpoint from the perspective of an observer of the image data even when the original recording was unstable.

Multi Device Arrays

Several copies of the devices may be arranged in an array to provide additional available perspectives and potentially holographic data to allow for future positional composition of the captured imagery. The multiple copies of the device in multiple nearby locations within the same environment can allow for an end-user observing the captured imagery to select which of the devices to observe from and thereby select which perspective they prefer at any given time. Furthermore if the multiple copies of the device are suitably arranged then the matching pixel data and aggregate pixel features captured from one device and another may be mathematically interpolated to generate synthetic perspectives that correspond to positions in-between the devices, thus allowing an end user to move their perspective arbitrarily within the space of the collection of devices. Furthermore, since accurate stereo image pairs are captured directly by the device, stereo imagery need not be synthesized from the same displaced imagesets and may instead be individually interpolated directly from the separate left and right viewpoints. Thus the small differences in the left and right imagery will be preserved and give accurate parallax views even as interpolation in displacement produces pixel artifacts, and will remain computationally simple compared to synthetic generation from non-stereo pair sources.

Light-Field/Holographic Capture

Used in combination with light-field capturing techniques including but not limited to lenticular lenslet arrays, coded apertures or structured illumination, a camera or camera array or other such 4 to 6 dimensional capture technology (simultaneously recording light across 2 or 3 angular dimensions across 2 or 3 spatial dimensions) can capture or reconstruct its viewpoint of the device from many different locations spatially offset from the position where the camera is normally located, and constitutes a holographic capture system that can detect and record the light field passing through it i.e. the placement and direction of light arriving at the array. In some embodiments, an array of cameras can be used. In some embodiments, an array of synthetic cameras can be used. For example, an plurality of apertures can be used with a single image sensor to provide synthetic cameras.

Figure 53:
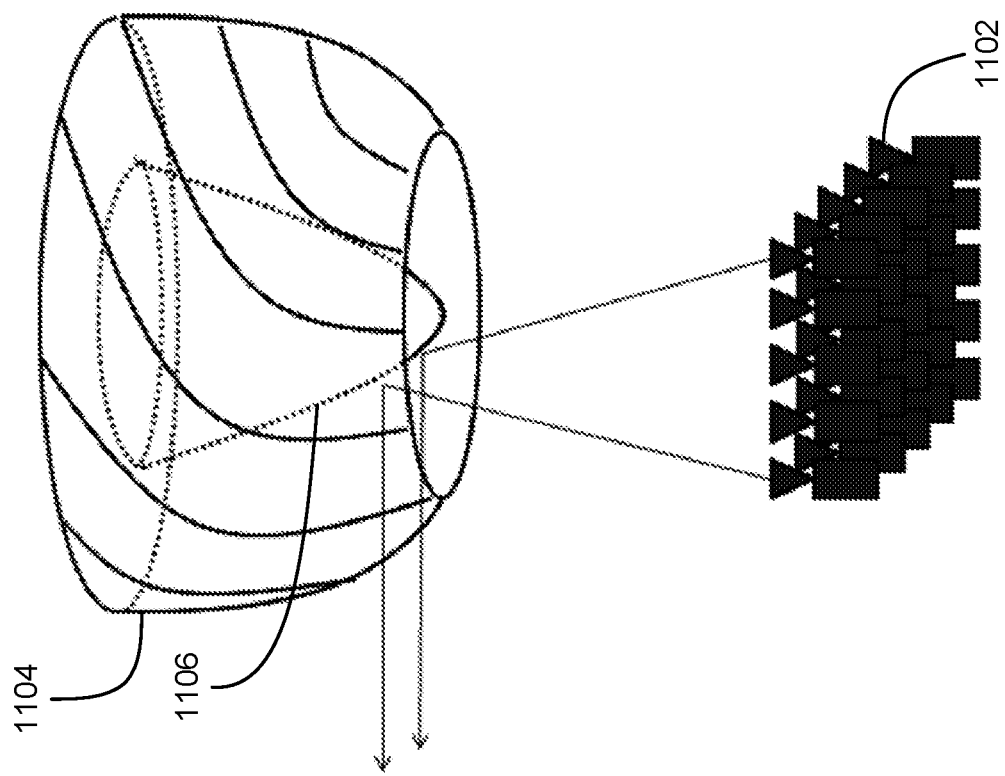
FIG. 53 shows an example embodiment of an optical system for stereoscopic panoramic imaging that includes an array of cameras.
Figure 52:
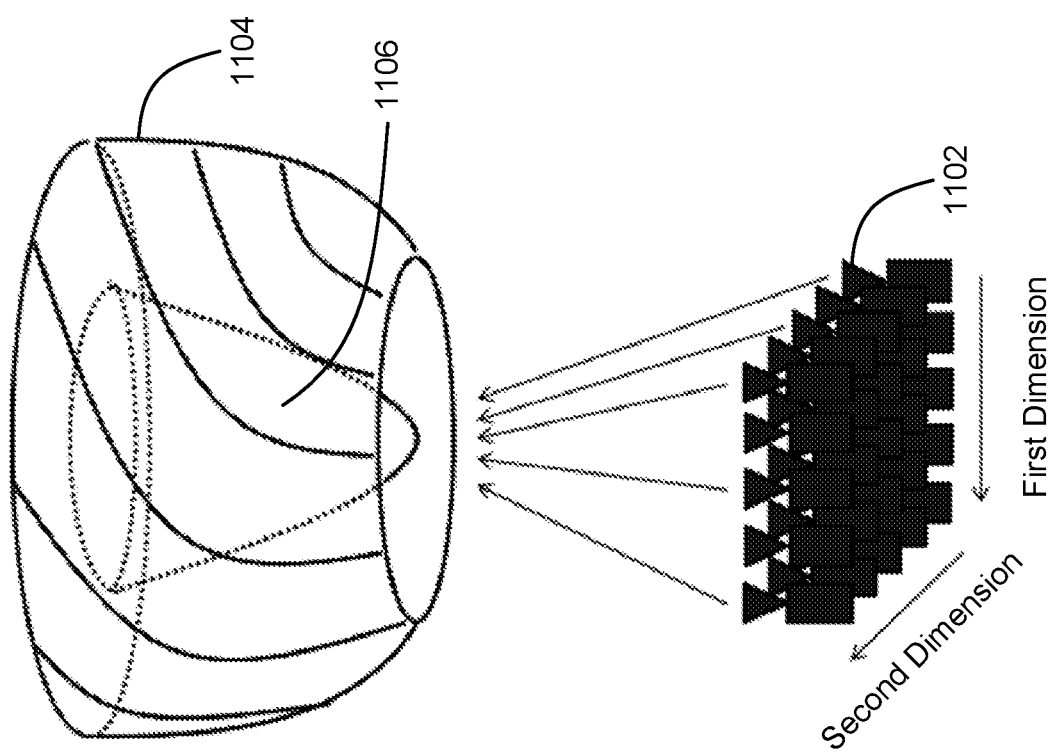
FIG. 52 shows an example embodiment of an optical system for stereoscopic panoramic imaging that includes an array of cameras.

With reference to FIGS. 52 and 53, example embodiments of this arrangement can take the form of an array of cameras 1102 or synthetic array of cameras placed approximately on the horizontal plane where the camera normally is located in other embodiments disclosed herein, or across a concave surface with an approximate focal point at the center of the device reflectors 1104 and 1106, and with the camera array's multi-viewpoints pointed at the reflectors 1104 and 1106, thus capturing the reflected light from the outer and inner reflectors 1104 and 1106 as the single camera 102 does in other embodiments but from multiple perspectives each offset differently from the central axis. Depending on its position, an image captured from a sub-camera or synthetic aperture camera perspective that is offset from the center and therefore closer to one side of the device than the other can be arranged such that it has a reduced total distance or shifted angular perspective in that direction to subjects in the exterior environment reflected via both the inner reflector 1106 and the outer reflector 1104, and thus produce corresponding stereo images from this position in that direction in the image space that is in effect closer to the subject compared to the imagery in the same direction captured from the central camera. Correspondingly, imagery captured from that same offset camera but in the reverse direction will consequently be further away from subjects in that reverse direction, and imagery captured from the side positions in between will be spatially shifted in the direction of the sub camera relative to the center. Thus, the captured image from this offset location can be arranged such that it produces an imagespace that is spatially shifted in the direction of its offset from the center. Therefore the collection of many cameras in the array each with different offsets would allow an end user to select which camera's stereo-imagery to display and thereby shift the end user's observed position within the range of the cameras on the plane or convex surface, and additional interpolation of pixels or image features between these separate image pairs to reconstruct arbitrary positions within the captured space approximately corresponding to the horizontal plane (if the device's central axis is oriented vertically). With this dataset, which is holographic in nature, one may not only construct accurate global stereoscopic panoramas of the scene with full rotational freedom, but also reproduce it with some degree of available translational freedom, that, displayed for instance via a virtual reality headset, would allow a viewer to not only rotate their perspective, but move it slightly from the relative point of capture, allowing shifts of perspective potentially controlled by motion capture of the viewer, creating a fully immersive experience.

The array of cameras 1102 or synthetic cameras can be positioned on a plane perpendicular to the central axis of the device approximately where the camera is positioned in other embodiments, and can be pointed to observe both the outer reflector 1104 and the inner reflector 1106 similar to the other cameras disclosed herein. The array of cameras 1102 may alternatively be mounted on a curved surface as opposed to a flat plane, thus changing the distance from each camera in the array to the reflectors 1104 and 1106. The array may capture reflected images from the reflectors 1104 and 1106 from angular perspectives that are offset from the center in different perpendicular dimensions, with two shown in FIG. 53. Depending on the position in the array and the surface angle of the reflector at any given point, the length or position of viewlines reflecting a subject in surrounding environment may be shifted and so the array of camera viewpoints allows a user to observe the scene from alternative perspectives, allowing the end user to some free movement within the captured scene with freedom of movement limited by the size of the camera array.

Photogrammetry Surveying

Capturing the scene using the described optical systems can give an image of the environment objects and lighting that may be used as references for computational reconstruction of the scene in a 3D simulation. The stereoscopic nature of the capture allows for depth tracking and absolute position references with only a single captured stereo image pair in one location, rather than multiple captures in multiple locations to triangulate objects. The correct scene lighting may be deduced through analysis of lighting across matched objects in the stereo pair, and so simulated computer rendered objects can be introduced into renderings of the scene with accurate derived lighting calculations applied. Full computational triangulation of object features and texture data in a scene can be used to gain an accurate 3D model of the scene's environment and its contents and its optical properties rapidly and in a single image. Such a render can be computationally manipulated arbitrarily and displayed in any way with arbitrary viewpoints via computational rendering, with the limitation that occluded image spaces inaccessible in the original dataset would not be available in raw form. This occluded imagery may be rapidly supplemented if multiple devices record the same scene or if the device is moved through the scene and records multiple images or video, so that multiple perspectives are obtained from which to observe previously occluded spaces.

Augmented Reality/Mixed Reality Recording

A virtual-reality recreation of a given environment using a global stereoimage space captured by the device may be augmented with synthetically rendered computer generated elements, also called augmented reality. In this way, artificial objects and visages may be placed into the scene that a viewer using the appropriate display, may observe, and using the appropriate human interface device (physical hand controller, motion tracking sensors, etc.) may interact with. Thus in a pre-recorded-background scene which enables viewing in all directions in stereoscopy but limited-to-no interactivity, interactive elements may be inserted and synthetically created and modified in real-time at the point of use. This may be combined with the viewer's changing perspective and the motion data captured from external motion sensors at the point of capture, or computed from the temporal motion in video image data as mentioned above, or from feature analysis for still images. The right combination will allow for the geometric re-computation of the artificially rendered augmenting elements such that they realistically track the environment, and through intelligent analysis of the image spaces' elements, may potentially allow for such elements to obey, or conversely subvert, expected structural, physical and conventional rules of an observed environment in a directed manner (gravity, occlusion, distance scaling, physical motion, identification of persons, viewlines, signposts, character recognition, etc.). Such artificial elements may have interactive characteristics such as opening web-links when the viewer commands, providing visual and auditory reactions, etc.

Furthermore, this may be augmented with the analytical results of the captured imagery, such that photogrammetry of the scene may be used to provide correct light and shadow calculations, supporting a triangulated surface-depth analysis of the scene for the artificial elements to obey. This allows the display device/viewer to translate the users' point of view to a synthetically rendered perspective of the real scene beyond the point or line of capture with additional artificial elements also rendered and correctly translated to match the new synthetically rendered perspective.

This would also apply to positioning artificial elements in a virtual scene while supporting a moving viewpoint/point-of-view captured by the optical system using video pathway capture, or light-field array mapping. Each artificial element can be matched in space to the moving viewpoint, and through data interpretation, allow for active positioning without synthetic rendering.

Such artificial elements can also be rastered onto a real-world scene capture and displayed in real-time, allowing for enhancements to real-world environments either in-person or through telepresence/telemetry. Such artificial elements can be informative (infographics, web links, signposts, building profiles person profiles, etc.), decorative (synthetic sculptures, paintings, animations etc.), interactive (games, targets, virtual displays etc.), or a myriad other potential forms.

Compared to other stereoscopic interactive virtual reality experiences, capturing real environments in controlled or uncontrolled recordings, and then augmenting them with interactive elements may prove advantageous in the creation process, as real world locals or actors may be pre-existing or easy to construct when compared to the effort required to design and populate equivalent environments characters in a completely simulated 3D model. They also benefit from an added level of physical and optical realism as artificial equivalents may be too complex to create or render with the same level of quality or accuracy. Furthermore, since the computational cost of the full rendering processes is restricted to decoding and transforming a pre-recorded video plus any sparsely populated artificial elements that are added, the computational costs may be significantly lower than rastering the lighting, texture, and geometry calculations of a completely synthetic simulation from scratch. The described capability can result in lower required power demands and increased battery life, while still achieving higher frame rates and more accurate scene & element positioning. This amounts to an improved level of immersion with potentially cheaper and more compact computational hardware components.

Mixed Environment Splicing and Composites

As well as mixing synthetic computer generated imagery of objects and backgrounds with the captured image data, image spaces of multiple captured environment images may also be mixed and/or composited to produce abnormally connected spaces in the final imagery, such as connecting a beach surface in one hemisphere to a building rooftop in another hemisphere. Furthermore, the stereoscopic data in each set of images would provide useful depth cues for detecting object edges and object distances from the device allowing accurate splicing and compositing of objects from different images based on position. For example this would allow splicing a foreground scene such as falling snow into another background scene, such as a desert.

First Person/Helmet Configuration

The reflectors can be sized to fit a range of different applications including making them hollow such that they can be worn as a helmet, giving a suitable first person viewpoint from a wearer. In such a case, since the Fresnel striations allow an arbitrary level of radial offset of the recorded imagery, a large hollow interior in the inner surface need not affect the stereo separation of the outer reflector as its sizing may be adjusted to always provide the suitable stereo spacing while the reflected viewlines are always corrected to match.

Stereo Selection

In addition to offering multiple sizing of the interior space of the device without changing stereoseparation, the level of stereo separation may be intentionally adjusted to provide unusual stereo-experiences. A wider spacing can extend the stereo sensitivity, which would make environments appear smaller, and smaller separation can reduce the sensitivity, making environments appear bigger. This could for instance be used in flight applications, giving pilots an enhanced sense of depth to large scale geography such as mountains which would normally have a convergence that's not visible, or could be used in micro-surgical applications, where surgeons require encompassing views with an accurate sense of depth of very small viscera. Furthermore, additional shells of the partially transmissive/partially reflective outer surface may provide simultaneous capture from multiple different stereoseparation widths in a single captured image, allowing the viewer to select this depth sensitivity, and also provides additional perspective data for holographic analysis. For optimal distribution of optical intensity, the ratio of the reflectivity of each shell layer would have to be adjusted such that each shell image receives the same amount of overall light.

The embodiments discussed herein are provided by way of example, and various modifications can be made to the embodiments described herein. Certain features that are described in this disclosure in the context of separate embodiments can also be implemented in combination in a single embodiment. Conversely, various features that are described in the context of a single embodiment can be implemented in multiple embodiments separately or in various suitable subcombinations. Also, features described in connection with one combination can be excised from that combination and can be combined with other features in various combinations and subcombinations. Various features can be added to the example embodiments disclosed herein. Also, various features can be omitted from the example embodiments disclosed herein. For example, the embodiment of FIG. 51 can be modified to include various features from other embodiments, such as a grid of micromirrors instead of striations, flat surfaces for the outer reflector, a hole through the center and a primary reflector, striations on the inner reflector, etc.

Various example claims are provided below reciting various different combinations of features. Various additional combinations of features are also contemplated, as described herein and as would be understood to those of skill in the art.

The following is claimed:

1. An optical system for panoramic stereoscopic imaging, the optical system comprising:
   a camera;
   a hollow outer reflector comprising:
   a generally paraboloidal major structure having a wide end and a narrow end, the narrow end facing toward the camera;
   a hole at the narrow end;
   a plurality of striations extending from the wide end to the narrow end;
   wherein the outer reflector is partially reflective and partially transmissive, and wherein the outer reflector is configured to reflect light to the camera; and
   an inner reflector comprising a generally paraboloidal reflective surface having a wide end and a narrow end, the narrow end facing towards the camera;

wherein the inner reflector is inside the outer reflector, wherein the inner reflector is configured to reflect light that is transmitted through the outer reflector, and wherein the inner reflector is configured to reflect the light through the hole at the narrow end of the outer reflector to the camera.

2. The optical system of claim 1, wherein the inner reflector is configured to reflect light to provide a circular inner image portion to the camera, and wherein the outer reflector is configured to reflect light to provide an outer image portion to the camera as a ring around the inner image portion.

3. The optical system of claim 1, wherein the striations include visible faces that are configured to reflect the light to the camera and hidden faces that are not visible to the camera.

4. The optical system of claim 1, wherein the striations are twisted around the outer reflector as a spiral.

5. The optical system of claim 1, wherein the striations are configured to receive off-axis light traveling along a path that does not intersect a longitudinal axis of the optical system, and to turn the light by reflection to have an on-axis path to the camera that intersects the longitudinal axis.

6. The optical system of claim 1, wherein the inner reflector is configure to receive first light traveling along a first light path, and to reflect the first light to the camera, wherein the outer reflector is configured to receive second light traveling along a second light path that is parallel to the first light path and spaced apart from the first light path by an offset distance, and wherein the outer reflector is configured to reflect the second light to the camera.

7. The optical system of claim 6, wherein the inner reflector is configured to receive third light traveling along a third light path that is lower than the first light path, and to reflect the third light to the camera, wherein the outer reflector is configured to receive fourth light traveling along a fourth light path that is lower than the second light path, wherein the fourth light path is parallel to the third light path and spaced apart from the third path by the same offset distance, and wherein the outer reflector is configured to reflect the fourth light to the camera.

8. The optical system of claim 7, wherein the light path length of the first light from an object, to the inner reflector, and to the camera is the same distance as the light path length of the second light from the object, to the outer reflector, and to the camera.

9. The optical system of claim 1, further comprising:
an outer substrate material on an outer side of the outer reflector, the outer substrate material configured to refract light transmitted through the outer reflector, wherein the outer substrate material is configured to refract the light in a first direction; and
an inner substrate material on an inner side of the outer reflector, the inner substrate material configured to refract the light transmitted through the outer reflector, wherein the inner substrate material is configured to refract the light in a second direction that is opposite the first direction.

10. The optical system of claim 1, further comprising a substrate on an outer or inner side of the outer reflector, wherein the substrate has an inner surface and an outer surface that both follow the shape of the striations, wherein the substrate is configured to refract light traveling through the outer reflector, wherein the outer surface of the substrate refracts the light in a first direction, and wherein the inner surface of the substrate refracts the light in a second direction that is opposite the first direction.

11. The optical system of claim 1, further comprising a housing configured to support the outer reflector, the inner reflector, and the camera.

12. The optical system of claim 1, wherein the outer reflector is rotatable relative to the camera, and wherein the outer reflector is configured to rotate about a longitudinal axis.

13. The optical system of claim 12, further comprising a motor or actuator for driving rotation of the outer reflector.

14. The optical system of claim 1, wherein the inner reflector comprises a hole at the center of the inner reflector, and wherein the optical system further comprises a primary reflector configured to receive light that is reflected from the inner reflector and the outer reflector, and to reflect the received light through the hole in the outer reflector, and through the hole in the inner reflector, to the camera.

15. An optical system comprising:
a camera;
a hollow outer reflector configured to reflect light to the camera; and
an inner reflector disposed inside the outer reflector and configured to reflect light to the camera;
wherein one or both of the outer reflector and the inner reflector are configured to receive off-axis light traveling along a path that does not intersect a longitudinal axis of the optical system, and to turn the light by reflection to have an on-axis path to the camera that intersects the longitudinal axis; wherein one or both of the outer reflector and the inner reflector comprise a plurality of striations that are angled to turn the light reflected by one or both of the outer reflector and the inner reflector to have an on-axis path to the camera.

16. The optical system of claim 15, wherein the outer reflector comprises a plurality of striations that are angled to turn the light reflected by the outer reflector in a first direction to have an on-axis path to the camera.

17. The optical system of claim 16, wherein the inner reflector comprises a plurality of striations that are angled to turn the light reflected by the inner reflector in a second direction to have an on-axis path to the camera.

18. The optical system of claim 17, wherein the inner reflector is configure to receive first light traveling along a first light path, and to reflect the first light to the camera, wherein the outer reflector is configured to receive second light traveling along a second light path that is parallel to the first light path and spaced apart from the first light path by an offset distance, and wherein the outer reflector is configured to reflect the second light to the camera.

19. The optical system of claim 18, wherein the inner reflector is configured to receive third light traveling along a third light path that is lower than the first light path, and to reflect the third light to the camera, wherein the outer reflector is configured to receive fourth light traveling along a fourth light path that is lower than the second light path, wherein the fourth light path is parallel to the third light path and spaced apart from the third path by the same offset distance, and wherein the outer reflector is configured to reflect the fourth light to the camera.

20. The optical system of claim 19, wherein the light path length of the first light from an object, to the inner reflector, and to the camera is the same distance as the light path length of the second light from the object, to the outer reflector, and to the camera.

21. The optical system of claim 20, wherein the outer reflector comprises a plurality of reflective panels that are spaced apart from each other with gaps between the reflective panels.

22. The optical system of claim 21, wherein the outer reflector is rotatable relative to the camera, and wherein the outer reflector is configured to rotate about a longitudinal axis.

23. The optical system of claim 22, further comprising a motor or actuator to for driving rotation of the outer reflector.

24. The optical system of claim 23, wherein the reflective panels have dark back sides configured to absorb light reflected from the inner reflector.

25. The optical system of claim 24, wherein the outer reflector has a generally paraboloidal major structure.

26. The optical system of claim 24, wherein the outer reflector has a frustoconical major structure.

27. The optical system of claim 15, wherein the inner reflector has a generally paraboloidal major structure.

28. The optical system of claim 15, wherein the inner reflector has a conical major structure.

29. The optical system of claim 15, wherein the outer reflector comprises a hole at the center.

30. The optical system of claim 29, wherein the inner reflector comprises a hole at the center.

31. The optical system of claim 30, further comprising a primary reflector configured to receive light that is reflected from the inner reflector and the outer reflector, and to reflect the received light through the hole in the outer reflector, and through the hole in the inner reflector, to the camera.

32. The optical system of claim 15, wherein one or both of the outer reflector and the inner reflector includes a grid of discontinuous reflection elements that are configured to turn the reflected light.

33. The optical system of claim 15, wherein the inner reflector is configured to reflect light to provide a circular inner image portion to the camera, and wherein the outer reflector is configured to reflect light to provide an outer image portion to the camera as a ring around the inner image portion.

34. The optical system of claim 15, wherein the outer reflector is partially reflective and partially transmissive.

35. The optical system of claim 34, further comprising:
an outer substrate material on an outer side of the outer reflector, the outer substrate material configured to refract light transmitted through the outer reflector, wherein the outer substrate material is configured to refract the light in a first direction;
an inner substrate material on an inner side of the outer reflector, the inner substrate material configured to refract the light transmitted through the outer reflector, wherein the inner substrate material is configured to refract the light in a second direction that is opposite the first direction.

36. The optical system of claim 34, further comprising a substrate on an outer or inner side of the outer reflector, wherein the substrate has an inner surface and an outer surface that both follow the shape of striations on the outer reflector, wherein the substrate is configured to refract light traveling through the outer reflector, wherein the outer surface of the substrate refracts the light in a first direction, and wherein the inner surface of the substrate refracts the light in a second direction that is opposite the first direction.

37. The optical system of claim 15, comprising an array of cameras each configured to receive light reflected by the inner reflector and the outer reflector to capture images from multiple positions.

38. The optical system of claim 15, comprising an array of synthetic cameras each configured to receive light reflected by the inner reflector and the outer reflector to capture images from multiple positions, wherein the synthetic cameras include a plurality of apertures for a single image sensor.

39. The optical system of claim 15, wherein a narrow end of the inner reflector is configured to omit the camera from images produced by the camera.

40. The optical system of claim 15, wherein a narrow end of the inner reflector has a shallow tip to prevent light from the camera from being reflected back to the camera.

41. The optical system of claim 15, wherein an inner rim of the outer reflector is curved inward to extend back into an interior of the outer reflector.

42. The optical system of claim 15, wherein an inner rim of the outer reflector is curved inward to reflect light from the camera back to the camera for imaging.

43. The optical system of claim 15, wherein an inner rim of the outer reflector is curved inward to reflect light from behind the camera to the camera for imaging.

44. An optical system for panoramic stereoscopic imaging, the optical system comprising:
a camera;
an outer reflector comprising:
a generally paraboloidal major structure having a wide end and a narrow end, the narrow end facing toward the camera;
a hole at the narrow end;
a plurality of striations extending from the wide end to the narrow end, wherein the striations are twisted around the outer reflector as a spiral;
wherein the outer reflector is partially reflective and partially transmissive, and wherein the outer reflector is configured to reflect light to the camera; and
an inner reflector comprising a generally paraboloidal reflective surface having a wide end and a narrow end, the narrow end facing towards the camera;
wherein the inner reflector is inside the outer reflector, wherein the inner reflector is configured to reflect light that is transmitted through the outer reflector, and wherein the inner reflector is configured to reflect the light through the hole at the narrow end of the outer reflector to the camera.

45. An optical system for panoramic stereoscopic imaging, the optical system comprising:
a camera; and
a reflector having striations that include right-side faces and left-side faces;
wherein the right-side faces are configured to receive first off-axis light traveling along a first path that does not intersect a longitudinal axis of the optical system, and to turn the first light in a first direction, as viewed from the longitudinal axis, by reflection to have an on-axis path to the camera that intersects the longitudinal axis;
wherein the left-side faces are configured to receive second off-axis light traveling along a second path that does not intersect a longitudinal axis of the optical system, and to turn the second light in a second direction opposite the first direction, as viewed from the longitudinal axis, by reflection to have an on-axis path to the camera that intersects the longitudinal axis, wherein the reflector is hollow.

46. The optical system of claim 45, wherein the reflector has a generally paraboloidal major structure.

47. The optical system of claim 45, wherein the reflector has a hole in the center thereof, and further comprising a primary reflector for receiving light reflected from the reflector and for reflecting the received light to the camera.

48. The optical system of claim 45, wherein the right-side faces and the left-side faces are symmetrical to each other across respective planes extending along respective centers of the striations.

* * * * *